United States Patent
Kiss et al.

(10) Patent No.: US 7,994,237 B2
(45) Date of Patent: *Aug. 9, 2011

(54) IN-LINE PROCESS TO PRODUCE PELLET-STABLE POLYOLEFINS

(75) Inventors: Gabor Kiss, Hampton, NJ (US); Alan Anthony Galuska, Glen Gardner, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 244 days.

This patent is subject to a terminal disclaimer.

(21) Appl. No.: 12/317,062

(22) Filed: Dec. 18, 2008

(65) Prior Publication Data

US 2009/0163642 A1 Jun. 25, 2009

Related U.S. Application Data

(60) Provisional application No. 61/008,494, filed on Dec. 20, 2007.

(51) Int. Cl.
B29C 47/10 (2006.01)
(52) U.S. Cl. ..................................... 523/348
(58) Field of Classification Search .................. 523/348
See application file for complete search history.

(56) References Cited

U.S. PATENT DOCUMENTS

| | | | |
|---|---|---|---|
| 2,153,553 A | 4/1939 | Fawcett et al. |
| 2,852,501 A | 9/1958 | Richard, Jr. et al. |
| 3,294,772 A | 12/1966 | Cottle |
| 3,725,378 A | 4/1973 | Chamberlin |
| 4,135,044 A | 1/1979 | Beals |
| 4,153,774 A | 5/1979 | Boettcher et al. |
| 4,337,142 A | 6/1982 | Knudsen et al. |
| 4,530,914 A | 7/1985 | Ewen et al. |
| 4,794,004 A | 12/1988 | Pfleger et al. |
| 4,962,262 A | 10/1990 | Winter et al. |
| 5,026,798 A | 6/1991 | Canich |
| 5,081,322 A | 1/1992 | Winter et al. |
| 5,084,534 A | 1/1992 | Wellborn, Jr. et al. |
| 5,096,867 A | 3/1992 | Canich |
| 5,236,998 A | 8/1993 | Lundeen et al. |
| 5,272,236 A | 12/1993 | Lai et al. |
| 5,324,799 A | 6/1994 | Yano et al. |
| 5,324,800 A | 6/1994 | Wellborn, Jr. et al. |
| 5,326,835 A | 7/1994 | Ahvenainen et al. |
| 5,382,630 A | 1/1995 | Stehling et al. |
| 5,391,654 A | 2/1995 | Ahvenainen et al. |
| 5,408,017 A | 4/1995 | Turner et al. |
| 5,416,153 A | 5/1995 | Winter et al. |
| 5,652,308 A | 7/1997 | Merrill et al. |
| 5,693,730 A | 12/1997 | Kuber et al. |
| 5,723,560 A | 3/1998 | Canich |
| 5,723,705 A | 3/1998 | Herrmann et al. |
| 5,756,608 A | 5/1998 | Langhauser et al. |
| 5,840,644 A | 11/1998 | Kuber et al. |
| 5,866,663 A | 2/1999 | Brookhart et al. |
| 5,882,750 A | 3/1999 | Mink et al. |
| 5,936,053 A | 8/1999 | Fukuoka et al. |
| 5,962,719 A | 10/1999 | Winter et al. |
| 5,965,674 A | 10/1999 | Moen et al. |
| 5,969,062 A | 10/1999 | Moll et al. |
| 5,998,547 A | 12/1999 | Hohner |
| 6,084,041 A | 7/2000 | Andtsjo et al. |
| 6,124,231 A | 9/2000 | Fritze et al. |
| 6,143,682 A | 11/2000 | Fisher |
| 6,160,072 A | 12/2000 | Ewen |
| 6,207,756 B1 | 3/2001 | Datta et al. |
| 6,218,488 B1 | 4/2001 | Schiffino et al. |
| 6,225,432 B1 | 5/2001 | Weng et al. |
| 6,300,451 B1 | 10/2001 | Mehta et al. |
| 6,355,741 B1 | 3/2002 | Marechal |
| 6,372,847 B1 | 4/2002 | Wouters |
| 6,455,638 B2 | 9/2002 | Laughner et al. |
| 6,469,188 B1 | 10/2002 | Miller et al. |
| 6,562,914 B1 | 5/2003 | Andtsjo et al. |
| 6,562,920 B2 | 5/2003 | Brant |
| 6,642,316 B1 | 11/2003 | Datta et al. |
| 6,749,912 B2 | 6/2004 | Delius et al. |
| 6,770,714 B2 | 8/2004 | Ommundsen et al. |
| 7,265,193 B2 | 9/2007 | Weng et al. |
| 7,279,536 B2 | 10/2007 | Brant et al. |

(Continued)

FOREIGN PATENT DOCUMENTS

CA 2118711 3/1993

(Continued)

OTHER PUBLICATIONS

U.S. Appl. No. 12/283,045, filed Sep. 9, 2008.*
U.S. Appl. No. 12/283,046, filed Sep. 9, 2008.*
U.S. Appl. No. 12/002,509, filed Dec. 17, 2007.
U.S. Appl. No. 12/074,496, filed Mar. 4, 2008.
U.S. Appl. No. 60/993,647, filed Sep. 13, 2007.
U.S. Appl. No. 60/993,646, filed Sep. 13, 2007.
U.S. Appl. No. 61/008,495, filed Dec. 20, 2007.
U.S. Appl. No. 61/008,484, filed Dec. 20, 2007.
Lehmus, P. et al., Abstract, "Metallocene-PP produced under supercritical polymerization conditions", and list of posters, $1^{st}$ BlueSky Conference on Catalytic Olefin Polymerization, Jun. 17-20, 2002, Sorrento, Italy.

(Continued)

Primary Examiner — Edward J Cain
(74) Attorney, Agent, or Firm — Robert A. Migliorini

(57) ABSTRACT

An in-line fluid phase process for blending low crystallinity polymer components (LCPCs) and high crystallinity polymer components (HCPCs) to form pellet-stable polyolefin pellets is provided. The in-line process for producing the blend includes providing two or more parallel reactor trains and one or more separators for product blending and product-feed separation; wherein the two or more reactor trains producting the LCPC and HCPC blend components operate under fluid phase bulk homogeneous conditions, and at least one of the reactor trains operates under supercritical conditions. The HCPC blend component is a high crystallinity polypropylene-based polymer. The LCPC blend component is a low crystallinity ethylene-based or propylene-based polymer. The resultant blend pellets exhibit a reduced tendency or an eliminated tendency to agglomerate during shipping, handling and storage.

25 Claims, 10 Drawing Sheets

U.S. PATENT DOCUMENTS

| | | | |
|---|---|---|---|
| 7,319,125 | B2 | 1/2008 | Arjunan et al. |
| 2002/0013440 | A1 | 1/2002 | Argawal et al. |
| 2002/0016415 | A1 | 2/2002 | Laughner et al. |
| 2002/0096797 | A1 | 7/2002 | Stoffelsma et al. |
| 2002/0176974 | A1 | 11/2002 | Hanyu et al. |
| 2003/0088021 | A1 | 5/2003 | Van Dun et al. |
| 2004/0110910 | A1 | 6/2004 | Arjunan |
| 2004/0122191 | A1 | 6/2004 | Arjunan et al. |
| 2004/0158010 | A1 | 8/2004 | Lehmus et al. |
| 2004/0242734 | A1 | 12/2004 | Lakeman et al. |
| 2005/0042294 | A1 | 2/2005 | Thanoo et al. |
| 2005/0043489 | A1 | 2/2005 | Datta et al. |
| 2005/0113522 | A1 | 5/2005 | Datta et al. |
| 2005/0119184 | A1 | 6/2005 | Khan et al. |
| 2005/0228155 | A1 | 10/2005 | Kawai et al. |
| 2006/0025545 | A1 | 2/2006 | Brant et al. |
| 2006/0096175 | A1 | 5/2006 | Russell et al. |
| 2006/0135699 | A1 | 6/2006 | Li et al. |
| 2006/0178491 | A1 | 8/2006 | Canich |
| 2006/0183861 | A1 | 8/2006 | Harrington et al. |
| 2006/0183881 | A1 | 8/2006 | Ibar |
| 2006/0281868 | A1 | 12/2006 | Sudhin et al. |

FOREIGN PATENT DOCUMENTS

| | | | |
|---|---|---|---|
| CA | 2103694 | | 2/1994 |
| DE | 41 30 299 | A1 | 3/1993 |
| EP | 0 480 190 | B1 | 4/1992 |
| EP | 0 603 232 | B1 | 9/1992 |
| EP | 0 667 359 | | 8/1995 |
| EP | 0 718 324 | | 6/1996 |
| EP | 0 806 436 | | 11/1997 |
| EP | 0 846 696 | A1 | 6/1998 |
| EP | 0 887 379 | | 12/1998 |
| EP | 0 887 380 | | 12/1998 |
| EP | 0 942 017 | | 9/1999 |
| EP | 0 987 279 | A1 | 3/2000 |
| EP | 0 129 368 | B2 | 4/2002 |
| EP | 1 195 391 | A1 | 4/2002 |
| EP | 1 231 226 | | 8/2002 |
| EP | 1 008 607 | B1 | 12/2003 |
| GB | 1443394 | | 7/1976 |
| JP | 6-25357 | | 2/1994 |
| JP | 9216916 | A | 9/1997 |
| JP | 96-208535 | | 2/1998 |
| JP | 10045834 | | 2/1998 |
| JP | 342 1202 | | 4/1998 |
| JP | 1998-110003 | A | 4/1998 |
| JP | 1998176023 | | 6/1998 |
| JP | 2001206914 | | 7/2001 |
| WO | WO 88/04672 | A1 | 6/1988 |
| WO | WO 92/14766 | A1 | 9/1992 |
| WO | WO 93/05082 | A1 | 6/1993 |
| WO | WO 93/11171 | A1 | 6/1993 |
| WO | WO 94/00500 | | 1/1994 |
| WO | WO 94/14856 | A1 | 7/1994 |
| WO | WO 96/00246 | A1 | 1/1996 |
| WO | WO 97/44391 | | 11/1997 |
| WO | WO 97/48737 | | 12/1997 |
| WO | WO 98/49229 | | 11/1998 |
| WO | WO 99/11680 | | 3/1999 |
| WO | WO 00/06621 | | 2/2000 |
| WO | WO 00/37514 | A1 | 6/2000 |
| WO | WO 00/40625 | A1 | 7/2000 |
| WO | WO 00/50475 | A1 | 8/2000 |
| WO | WO 00/64952 | A2 | 11/2000 |
| WO | WO 01/44318 | A1 | 6/2001 |
| WO | WO 01/46273 | A1 | 6/2001 |
| WO | WO 02/34795 | | 5/2002 |
| WO | WO 02/38628 | A2 | 5/2002 |
| WO | WO 02/50145 | A1 | 6/2002 |
| WO | WO 02/070572 | A2 | 9/2002 |
| WO | WO 02/090399 | A1 | 11/2002 |
| WO | WO 03/040095 | A2 | 5/2003 |
| WO | WO 03/040201 | A1 | 5/2003 |
| WO | WO 03/040202 | | 5/2003 |
| WO | WO 03/040233 | A2 | 5/2003 |
| WO | WO 03/040442 | A1 | 5/2003 |
| WO | WO 2004/026921 | | 4/2004 |
| WO | WO 2006/009976 | A1 | 1/2006 |
| WO | WO 2006/009981 | | 1/2006 |
| WO | WO 2006/044149 | A1 | 4/2006 |
| WO | WO 2006/120177 | A2 | 11/2006 |
| WO | WO 2007/037944 | | 4/2007 |
| WO | 2008082511 | A1 | 7/2008 |

OTHER PUBLICATIONS

Lofgren et al., Abstract, Borealis Publications, "Metallocene-PP produced under supercritical conditions", 1$^{st}$ BlueSky Conference on Catalytic Olefin Polymerization, Jun. 17-20, 2002, Sorrento, Italy (2002).

Zowade et al., Abstract, PL 159518, "Manufacturing Low-molecular-weight Isotactic Polypropylene", Sep. 10, 1989.

Alt, H.G. et al., "Effect of the Nature of Metallocene Complexes of Group IV Metals on Their Performance in Catalytic Ethylene and Propylene Polymerization", Chem. Rev. 100, 2000, pp. 1205-1221.

Akimoto, A. et al., "New Developments in the Production of Metallocene LLDPE by High Pressure Polymerization", Tosoh Corp., Metallocene-Based Polyolefins 2000 (conference proceedings), pp. 287-308 (John Wiley & Sons Ltd.).

Barnhart, R. W. et al., "Synthesis of Branched Polyolefins Using a Combination of Homogeneous Metallocene Mimics", J. Am. Chem. Soc. 1998, vol. 120, pp. 1082-1083.

Bergemann, C. R. et al., "Copolymerization of Ethylene and 1,5-Hexadiene under High Pressure Catalyzed by a Metallocene", J. Mol. Catal. A: Chemical 116, 1997, pp. 317-322 (Elsevier).

Bergemann, C. R. et al., "Copolymerization of Ethylene and Linear α-Olefins with a Metallocene Catalyst System under High Pressure, Part II. Comparison of Propene, 1-Butene, 1-Hexene and 1-Decene", J. Mol. Catal. A: Chemical 105, 1996, pp. 87-91 (Elsevier).

Britovsek, G. J. P. et al., "The Search for New-Generation Olefin Polymerization Catalysts: Life Beyond Metallocenes", Chemie Intl. Edn., 1999, vol. 38, pp. 428-447.

Bujadoux, G. K., "Use of Bridged and Non-Bridged Metallocene Catalysts in High Pressure/High Temperature Ethylene/α-Olefin Copolymerization", Metallocenes 95 Intl. Congr., Metallocene Polym. 1995, pp. 375-402, Schotland Bus. Rsrch. Publ.

Chen, E. Y.-X, et al., "Cocatalysts for Metal-Catalyzed Olefin Polymerization: Activators, Activation Processes, and Structure-Activity Relationships", Chem. Rev. 2000, vol. 100, pp. 1391-1434.

Coates, G. W., "Precise Control of Polyolefin Stereochemistry Using Single Site Metal Catalysis", Chem. Rev. 100, 2000, pp. 1223-1252.

Cottom, W. P., "Waxes", in Encyclo. Chem. Tech., vol. 25, pp. 614-626, Fourth edition, 1998.

Eckstein, A. et al., "Determination of Plateau Moduli and Entanglement Molecular Weights of Isotactic, Syndiotactic, and Atactic Polypropylenes Synthesized with Metallocene Catalysts", Macromolecules 31, 1998, pp. 1335-1340.

Ewen, J. A. et al., "Syndiospecific Propylene Polymerizations with Group 4 Metallocenes", J. Am. Chem. Soc., 1988, vol. 110, pp. 6255-6256.

Gotz, C. et al., "MAO-Free Metallocene Based Catalysts in High Pressure Polymerisation of Ethylene and 1-Hexene", Chem. Eng. Technol., 21, 1998, pp. 954-957 (Wiley-VCH Verlag GmbH).

Hauptman, E. et al., "Stereoblock Polypropylene: Ligand Effects on the stereospecificity of 2-Arylindene Zirconocene Catalysts", J. Am. Chem. Soc. 1995, vol. 117, pp. 11586-11587.

Ittel, S. D. et al., "Late Metal Catalysts for Ethylene Homo- and Copolymerization", Chem. Rev. 2000, vol. 100, pp. 1169-1203.

Janiak, C., "Metallocene Catalysts for Olefin Polymerization", Metallocenes, Synthesis, Reactivity and Applications, vol. 2, Wiley-VCH, 1998, pp. 547-614, A. Togni and R. L. Halterman, editors.

Luft, G., "Development of Metallocene Catalysts and Their Application in the High Pressure Polymerisation Process" (Darmstadt University of Technology), PE 99, World Congress Global Technology Update Forum, Mar. 15, 16, 1999, Zurich, Switzerland.

Resconi, L. et al., "Selectivity in Propene Polymerization with Metallocene Catalysts", Chem. Rev. 2000, vol. 100, pp. 1253-1345.

Schaverien, C. J. et al., "Ethylene Bis(2-indenyl) Zirconocenes: A New Class of Diastereomeric Metallocenes for the (Co)Polymerization of α-Olefins", Organometallics 2001, vol. 20, No. 16, pp. 3436-3452 (ACI, Columbus, Ohio), Aug. 2001.

Scollard, J. D. et al., "Polymerization of α-Olefins by Chelating Diamide Complexes of Titanium", Macromolecules, 1996, vol. 29, p. 5241-5243.

Smith, B. D. et al., "Thermodynamic Data for Pure Compounds Part A, Hydrocarbons and Ketones Physical Sciences Data", vol. 25, Elsevier, New York, 1986, pp. 308-309.

Stephenson et al., "Handbook of the Thermodynamics of Organic Compounds", Elsevier Science Publ. NY, p. 75, 1987.

Stratton, A. W., "Waxes", in Encyclo. Polymer Science and Eng., vol. 17, pp. 784-795, Second Edition, 1985.

Suzuki, N. et al., "Olefin Polymerization Using Highly Congested Ansa-Metallocenes Under High Pressure: Formation of Superhigh Molecular Weight Polyolefins", Macromolecules, 2000, vol. 33, No. 3, pp. 754-759.

Yano., A. et al., "Homo- and Copolymerization of Ethylene at High Temperature with Cationic Zirconocene Catalysts", Macromol. Chem. Phys. 200, No. 4, pp. 917-923 (Wiley-VCH Verlag GmbH) (1999).

Yano, A. et al., Homo- and Copolymerization of Ethylene by Cationic Hafnocene Catalysts based on Tetrakis(pentafluorophenyl), Macromol. Chem. Phys. 200, No. 4, 1999, pp. 924-932 (Wiley-VCH Verlag Gmb).

Yano, A. et al., "Novel Zirconocene Catalysts for the Production of High Molecular Weight LLDPE in High Temperature Polymerization", Macromol. Chem. Phys. 200, No. 4, 1999, pp. 933-941 (Wiley-VCH Verlag GmbH).

Hackmann et al., "Functional Olefin Copolymers: Uniform Architectures of Propene/7-Methyl-1,6-Octadiene Copolymers by ATR-FTIR Spectroscopy Control of Monomer Composition", Macromolecules, American Chemical Society, Easton, US, vol. 33, No. 5, Mar. 7, 2000, pp. 1524-1529 (Germany).

Hackmann, M. et al., "Zirconocene-MAO Catalyzed Homo- and Copolymerizations of Linear Assymetrically Substituted Dienes with Propene: A Novel Strategy of Functional (co)poly(α-olefin)s", Macromol. Chem. Phys., pp. 1511-1517, 1998 (Germany).

Lee et al., "Copolymerizations of Olefins and Dienes with Homogeneous and Heterogeneous Catalysts", Eur. Polym. J., vol. 33(4), pp. 447-451, 1997 (Great Britain).

Dassaud, J. P. et al., "Copolymerization of Propene-Nonconjugated Dienes: Derivatization Through Hydroboration and Epoxydation", Polym. Adv. Technol., 4(7), pp. 457-464, 1993 (France).

Resconi, L. et al., "Effect of Monomer Concentration on Propene Polymerization with the rac-[Ethylenebis(1-indenyl)]zirconium Dichloride/Methylaluminoxane Catalyst", Macromol. 1995, 28, pp. 6667-6676.

Spalek, W. et al., "The Influence of Aromatic Substituents on the Polymerization Behavior of Bridged Zirconocene Catalysts", Organometallics 1994, 13, pp. 954-963.

Resconi, L. et al., "Highly Regiospecific Zirconocene Catalysts for the Isospecific Polymerization of Propene", J. Amer. Chem. Soc. 1998, 120, pp. 2308-2321.

Resconi, L. et al., "rac-[Methylene(3-tert-butyl-1-indenyl)$_2$]ZrCl$_2$: A Simple, High-Performance Zirconocene Catalyst for Isotactic Polypropene", Organometallics 2000, 19, pp. 420-429.

Kirby, C. F. et al., "Phase Behavior of Polymers in Supercritical Fluid Solvents", Chem. Rev. 1999, 99, pp. 565-602.

Lahelin et al., Propylene Polymerization with rac-SiMe$_2$(2-ME-4-PhInd)$_2$ZrMe$_2$/MAO: Polymer Characterization and Kinetic Models, Macromol. Chem. Phys., 2003, vol. 204, pp. 1323-1337.

Seraidaris, T. et al., Copolymerization of Propane with Low Amounts of Ethene in Propene Bulk Phase, Polymer (2006), 47(1), 107-112.

\* cited by examiner

Production of polymer blends in two-stage series reactor configuration (Prior Art)

In-line polymer blending process with single separation vessel

In-line polymer blending process schematic with multiple separation vessels

In-line polymer blending with product effluent buffer tanks for improved blend ratio control and a single separation vessel In-line polymer blending with product effluent buffer tanks that also serve as monomer/product separators for improved blend ratio control In-line polymer blending with one slurry reactor train In-line polymer blending with buffer tanks for improved blend ratio control and with the option for additive/polymer blending component Operating regime with process disclosed for a reactor operating in a fluid-fluid phase Operating regime with process disclosed herein for a gravity separator ions in the cost of producing useful goods. Recognizing the importance of delivering polymers in stable, industry-standard pellet form, petrochemical companies have been developing methods for stabilizing otherwise unstable low crystallinity polyolefins. These methods include dusting the freshly-produced pellets with inorganic compounds, like talc, or by blending a small quantity of off-line-produced, more crystalline component with the base soft polyolefin that "hardens" the pellets to withstand shipping and storage without clumping together. These methods have several drawbacks. Using inorganic powders may introduce an undesired component while providing only limited increase in pellet stability. Melt-blending of off-line-produced stabilizer components tends to be expensive due to the complexity of blending two highly viscous molten polymer streams.

IN-LINE PROCESS TO PRODUCE PELLET-STABLE POLYOLEFINS

CROSS REFERENCE TO RELATED APPLICATION

This application claims the benefit of U.S. Provisional Application No. 61/008,494 filed Dec. 20, 2007, herein incorporated by reference in its entirety.

FIELD

The present invention relates to the field of processes to produce pellet-stable polyolefins. It more particularly relates to an in-line fluid phase blending process to produce pellet-stable polyolefins including one or more low-crytallinity components.

BACKGROUND

Polyolefins with low crystallinity are commercially significant products due to their toughness and flexibility. Since these products are often copolymers of propylene with ethylene and (less frequently) other olefins, such as $C_4$-$C_{12}$ alpha olefins, styrene, etc., they also have extended low-temperature application range due to the reduced glass transition temperature imparted by the comonomer, especially ethylene. These low-crystallinity polyolefins are often used in combination with crystalline components, such as polypropylene or polyethylene, to fine-tune the stiffness-toughness balance and to extend the high-temperature application range. Changing blend compositions and blend ratios can yield a virtually infinite number of polyolefin blends with a wide range of properties enabling the fine-tuning of those blends to fit the desired application demands while also allowing the production of those finished goods at low cost. These blends are mostly made by compounders, often small operations, that purchase the copolymer and homopolymer components from large petrochemical companies. These compounders prefer using pelletized polymer blend components because they are easy to store, move, and dose.

While these low crystallinity polyolefin products are valued for their ability to increase elasticity, toughness and flexibility, they tend to have both a low melting onset and a low peak melting temperature. They are often nearly or completely amorphous. In addition, these products are often quite soft and exhibit low moduli. These low-crystallinity polyolefins are often difficult to pelletize and the resultant pellets tend to stick together rendering them unusable in compounding operations set up for pelletized feed stocks.

The property capturing the ability of polymer pellets to stay free-flowing during shipping and storage is referred to as "pellet stability". Pellet stability is an important attribute of polyolefins since good pellet stability affords low-cost shipping, storage, and dosage in the production of polymer blends with tailored stiffness-toughness balance ultimately lowering the cost of producing useful goods. Recognizing the importance of delivering polymers in stable, industry-standard pellet form, petrochemical companies have been developing methods for stabilizing otherwise unstable low crystallinity polyolefins. These methods include dusting the freshly-produced pellets with inorganic compounds, like talc, or by blending a small quantity of off-line-produced, more crystalline component with the base soft polyolefin that "hardens" the pellets to withstand shipping and storage without clumping together. These methods have several drawbacks. Using inorganic powders may introduce an undesired component while providing only limited increase in pellet stability. Melt-blending of off-line-produced stabilizer components tends to be expensive due to the complexity of blending two highly viscous molten polymer streams.

In-line blending through the use of series reactors producing a low crystallinity and high crystallinity component is also known in the art. Utilizing a series reactor configuration, product blending may be accomplished in the solution polymerization reactor itself when the effluent of the first solution polymerization reactor is fed into the second reactor operating at different conditions with optionally different catalyst and monomer feed composition. Referring to the two-stage series reactor configuration of FIG. 1 (prior art), the two different polymers made in the first and second reactor stages are blended in the second stage yielding a blended polymer product leaving the second reactor. Such reactor series configuration may be further expanded into more than a two-stage series configuration (three or more reactors in series). While mixing in the downstream reactor(s) provides good product mixing, particularly when the reactors are equipped with mixing devices, e.g., mechanical stirrers, such series reactor configuration and operation presents a number of practical process and product quality control problems due to the close coupling of the reactors in the cascade. One of the most important difficulties in commercial practice in producing pellet-stable blends is ensuring proper blend and monomer ratios of the soft polymer component and the more stable highly crystalline polymer component to deliver consistent blend quality. Additional complications arise when the blend components have different monomer compositions, particularly when they have different monomer pools, such as in the case of blending different copolymers or in the case of blending homo- and copolymers. Since the monomer streams are blended, there is no option for their separate recovery and recycle mandating costly monomer separations in the monomer recycle lines.

Applying parallel reactors can overcome the disadvantages related to the direct coupling of the polymerization reactors in an in-line polymer blending applying series reactors. While production flexibility is increased, a parallel reactor arrangment necessitates the installation of blending vessels increasing the cost of the process. U.S. Patent Publication No. 2006/0183861 discloses blends of at least two polymers incorporating propylene-derived units and processes for producing such blends wherein one polymer of the blend is a low-crystallinity polymer including propylene-derived units and the second polymer is a high-crystallinity polymer including propylene-derived units. The processes for producing such blends include both series polymerization and parallel polymerizations under solution polymerization conditions. The polymer blends exhibit a reduced tendency for the polymer pellets to agglomerate while maintaining the desirable physical properties, such as elastomeric properties, exhibited by low crystallinity propylene polymers. The solution polymerization processes have limitations in producing highly crystalline, high molecular weight (high MW) products with higher melting point. In particular, the solution process cannot typically produce high MW products that also have high melting point. This limitation makes it less than optimal for making pellet-stable polyolefin blends wherein incorporating highly crystalline (high melting point, i.e., >145° C., or >150° C., or >152° C., or >154° C., or >155° C., or >156° C.) high MW (>75 kg/mol, or >100 kg/mol), or >125 kg/mol, or >135 kg/mol, or >150 kg/mol) polymer component is advantageous. U.S. Patent Publication No. 2006/0183861 is herein incorporated by reference in its entirety.

A need thus exists for an improved and cost-effective method of in-line blending low-crystallinity and high-crystallinity polyolefin components to make pellet-stable polyolefins. More particularly, a need exists for an improved in-line method of blending low-crystallinity and highcrystallinity polyolefin components, wherein the highly crystalline polyolefin component may be made in a homogeneous fluid state enabling in-line blending without fouling the reactor, and the residence time, monomer composition, catalyst choice, and catalyst concentration can be independently controlled in each polymer reactor prior to the in-line blending step.

SUMMARY

Provided are in-line processes for producing blends of pellet-stable polyolefins.

According to the present disclosure, an advantageous in-line blending process for producing pellet-stable polyolefin blends comprises: (a) providing two or more reactor trains configured in parallel and a high-pressure separator downstream fluidly connected to the two or more reactor trains configured in parallel, wherein one or more of the reactor trains produce one or more low crystallinity polymer components (LCPCs) and one or more of the reactor trains produce one or more high crystallinity polymer components (HCPCs); (b) contacting in the one or more of the reactor trains configured in parallel producing HCPCs: 1) propylene, 2) optional ethylene and/or $C_4$ to $C_{12}$ alpha olefins, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa, contacting in the other one or more reactor trains configured in parallel producing LCPCs: 1) ethylene or propylene, 2) one or more $C_2$ to $C_{30}$ alpha olefins and/or non-conjugated dienes, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa, wherein the polymerization system for at least one of the reactor trains configured in parallel is above its critical temperature and critical pressure, wherein the polymerization system for each reactor train is in its dense fluid state and comprises any propylene present, any ethylene present, any $C_4$ to $C_{30}$ alpha olefin present, any non-conjugated diene present, any diluent or solvent present, and the polymer product, wherein the catalyst system for each reactor train comprises one or more catalyst precursors, one or more activators, and optionally, one or more catalyst supports; wherein the polymerization system for each reactor train comprises less than 40 wt % of the optional solvent; and (c) forming a reactor effluent including a homogeneous fluid phase polymer-monomer mixture in each parallel reactor train; (d) combining the reactor effluent comprising the homogeneous fluid phase polymer-monomer mixture from each parallel reactor train to form a combined reactor effluent; (e) passing the combined reactor effluent through the high-pressure separator for product blending and product-feed separation; (f) maintaining the temperature and pressure within the high-pressure separator above the solid-fluid phase transition point but below the cloud point pressure and temperature to form a fluid-fluid two-phase system comprising a polymer-rich phase and a monomer-rich phase; (g) separating the monomer-rich phase from the polymer-rich phase to form a polymer-enriched stream comprising a blend of LCPCs and HCPCs and a separated monomer-rich stream, and (h) further processing the polymer enriched stream of (g) to further remove any solvent/diluent and/or monomer and then forming it into pellets to yield a pellet-stable product blend of LCPCs and HCPCs.

A further aspect of the present disclosure relates to an advantageous in-line blending process for producing pellet-stable polyolefins blends comprising: (a) providing two or more reactor trains configured in parallel and two or more high-pressure separators fluidly connected to the two or more reactor trains configured in parallel, wherein one or more of the reactor trains produces one or more low crystallinity polymer components (LCPCs) and one or more of the reactor trains produces one or more high crystallinity polymer components (HCPCs); (b) contacting in the one or more of the reactor trains configured in parallel producing HCPCs: 1) propylene, 2) optional ethylene and/or $C_4$ to $C_{12}$ alpha olefins, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa, contacting in the other one or more reactor trains configured in parallel producing LCPCs: 1) ethylene or propylene, 2) one or more $C_2$ to $C_{30}$ alpha olefins and/or non-conjugated dienes, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa, wherein the polymerization system for at least one of the reactor trains configured in parallel is above its critical temperature and critical pressure, wherein the polymerization system for each reactor train is in its dense fluid state and comprises any propylene present, any ethylene present, any $C_4$ to $C_{30}$ alpha olefin present, any non-conjugated diene present, any diluent or solvent present, and the polymer product, wherein the catalyst system for each reactor train comprises one or more catalyst precursors, one or more activators, and optionally, one or more catalyst supports; wherein the polymerization system for each reactor train comprises less than 40 wt % of the optional solvent; and (c) forming an unreduced reactor effluent including a homogeneous fluid phase polymer-monomer mixture in each parallel reactor train; (d) passing the unreduced reactor effluents from one or more but not from all of the parallel reactor trains through one or more high-pressure separators, maintaining the temperature and pressure within the one or more high-pressure separators above the solid-fluid phase transition point but below the cloud point pressure and temperature to form one or more fluid-fluid two-phase systems with each two-phase system comprising a polymer-enriched phase and a monomer-rich phase, and separating the monomer-rich phase from the polymer-enriched phase in each of the one or more high-pressure separators to form one or more separated monomer-rich phases and one or more polymer-enriched phases; (e) combining the one or more polymer-enriched phases from the one or more high-pressure separators of (d) with the one or more unreduced reactor effluents from one or more parallel reactor trains to form a mixture of one or more polymer-enriched phases and the one or more unreduced reactor effluents from the one or more parallel reactor trains to form a combined effluent stream that comprises the polymeric blend components from all parallel reactor trains; (f) passing the combined effluent stream of (e) into another high-pressure separator for product blending and product-feed separation; (g) maintaining the temperature and pressure within the another high pressure separator of (f) above the solid-fluid phase transition point but below the cloud point pressure and temperature to form a fluid-fluid two-phase system comprising a polymer-rich blend phase and a monomer-rich phase; (h) separating the monomer-rich phase from the polymer-rich blend phase to form a polymer-enriched stream comprising a blend of LCPCs and HCPCs and a separated monomer-rich stream, and (i) further processing the polymer-enriched stream of (h) to further remove any solvent/diluent and/or monomer and then forming it into pellets to yield a pellet-stable product blend of LCPCs and HCPCs.

These and other features and attributes of the disclosed in-line processes for producing pellet-stable polyolefin blends and their advantageous applications and/or uses will be apparent from the detailed description that follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

Figure 1:
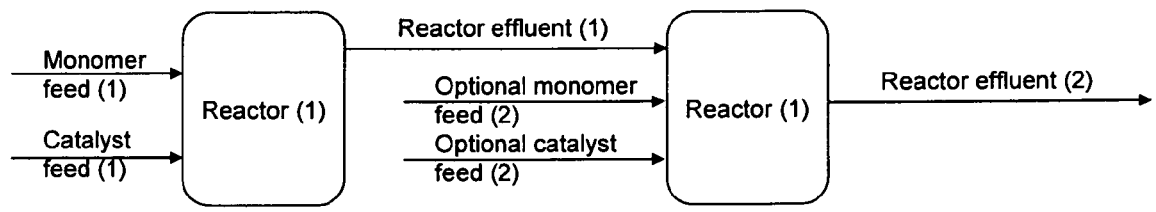
FIG. 1 presents the process for the production of polymer blends in a two-stage series reactor configuration (prior art)

For the purposes of this invention and the claims thereto:

A catalyst system is defined to be the combination of one or more catalyst precursor compounds and one or more activators. Any part of the catalyst system can be optionally supported on solid particles, in which case the support is also part of the catalyst system.

Fluids are defined as materials in their liquid or supercritical fluid states. Dense fluids are defined as fluid media in their liquid or supercritical state with densities greater than 300 $kg/m^3$.

Solid-fluid phase transition temperature is defined as the temperature at which a solid polymer phase separates from the polymer-containing dense fluid medium at a given pressure. The solid-fluid phase transition temperature can be determined by temperature reduction starting from temperatures at which the polymer is fully dissolved in the fluid reaction medium. Solid-fluid phase transition temperature can be measured by turbidity in addition to other known measurement techniques.

Solid-fluid phase transition pressure is defined as the pressure at which a solid polymer phase separates from the polymer-containing fluid medium at a given temperature. The solid-fluid phase transition pressure can be determined by pressure reduction at constant temperature starting from pressures at which the polymer is fully dissolved in the fluid reaction medium. Solid-fluid phase transition pressure can be measured by turbidity in addition to other known measurement techniques.

The cloud point is defined as the pressure below which, at a given temperature, the polymerization system becomes turbid as described in J. Vladimir Oliveira, C. Dariva and J. C. Pinto, Ind. Eng, Chem. Res. 29 (2000) 4627. For purposes of this invention and the claims thereto, the cloud point is measured by shining a helium laser through the selected polymerization system in a cloud point cell onto a photocell and recording the pressure at the onset of rapid increase in light scattering (turbidity) for a given temperature. The cloud point typically corresponds to the transition from a single fluid phase to two fluid phases (a polymer-rich and a polymer-lean fluid phase).

A higher α-olefin is defined as an alpha-olefin having 4 or more carbon atoms.

Use of the term "polymerization" encompasses any polymerization reaction such as homopolymerization and copolymerization. Copolymerization encompasses any polymerization reaction of two or more monomers.

The new numbering scheme for the Periodic Table Groups is used as published in CHEMICAL AND ENGINEERING NEWS, 63(5), 27 (1985).

When a polymer is referred to as comprising an olefin, the olefin present in the polymer is the polymerized form of the olefin.

An oligomer is defined to be compositions having 2-75 monomer units.

A polymer is defined to be compositions having 76 or more monomer units.

A series reactor cascade can include two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams. In a parallel reactor configuration, the reactor or reactors in series cascade that form a branch of the parallel reactor configuration is referred to as a reactor train.

Reactor train or reactor branch or reactor leg refers to a single polymerization reactor or to a group of polymerization reactors of the in-line blending process disclosed herein that produces a single polymer blend component. If the reactor train contains more than one reactor, the reactors are arranged in a series configuration within the train. The need for having more than one reactor in a reactor train may, for example, arise when an in-line blend component cannot be produced at the desired rate economically in a single reactor but there could be also reasons related to blend component quality, such as molecular weight or composition distribution, etc. Since a reactor train can comprise multiple reactors and/or reactor zones in series, the single blend component produced in a reactor train may itself be a polymer blend of polymeric components with varying molecular weights and/or compositions. However, in order to simplify the description of different embodiments of the in-line blending processes disclosed herein, the polymeric product of a reactor train is referred to simply as blend component or polymeric blend component regardless of its molecular weight and/or compositional dispersion. For the purpose of defining the process of the present invention, parallel reactors will be always considered as separate reactor trains even if they produce essentially the same in-line blend component. Also, spatially separated, parallel reaction zones that do not exchange or mix reaction mixtures by, for example, pump-around loops, or by other recirculation methods, will be considered as separate parallel reactor trains even when those parallel zones are present in a common shell and fall within the in-line blending process disclosed herein.

Reactor bank refers to the combination of all polymerization reactors in the polymerization section of the in-line polymer blending process disclosed herein. A reactor bank may comprise one or more reactor trains.

A parallel reactor configuration includes two or more reactors or reactor trains connected in parallel. A reactor train, branch, or leg of the parallel configuration may include one reactor or more than one reactor configured in a series configuration. The entire parallel reactor configuration of the polymerization process disclosed herein, i.e., the combination of all parallel polymerization reactor trains forms the reactor bank.

Monomer recycle ratio refers to the ratio of the amount of recycled monomer fed to the reactor divided by the total (fresh plus recycled) amount of monomer fed to the reactor.

Polymerization system is defined to be monomer(s) plus comonomer(s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. By the current definition, the mixture present in the polymerization reactor and in its effluent is composed of the polymerization system plus the catalyst system. Dense fluid polymerization systems have greater than 300 kg/m³ fluid phase density, all of their components listed above, i.e., the monomer(s) plus comonomer(s) plus polymer(s) plus optional inert solvent(s)/diluent(s) plus optional scavenger(s), are in fluid state, or stating differently, none of their components is in solid state. Note that these qualifications may be different for the catalyst system since it is not part of the polymerization system.

The polymerization system can form one single fluid phase or two fluid phases.

A homogeneous polymerization system contains all of its components dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system. In practical terms, a homogeneous polymerization system has all of its components in a single dense fluid phase. Apparently, a polymerization system is not homogeneous when it is partitioned to more than one fluid phases or to a fluid and a solid phase. The homogeneous fluid state of the polymerization system is represented by the single fluid region in its phase diagram.

A homogeneous polymerization process operates with a homogeneous polymerization system. Note that the catalyst system is not part of the polymerization system, thus it is not necessarily dissolved homogeneously in the polymerization system. A reactor in which a homogeneous polymerization process is carried out will be referred to as homogeneous polymerization reactor.

Pure substances, including all types of hydrocarbons, can exist in either a subcritical, or supercritical state, depending on their temperature and pressure. Substances in their supercritical state possess interesting physical and thermodynamic properties, which are exploited in this disclosure. In particular, as supercritical fluids undergo large changes in pressure, their density and solvency for polymers changes over a wide range. To be in the supercritical state, a substance must have a temperature above its critical temperature (Tc) and a pressure above its critical pressure (Pc). Mixtures of hydrocarbons, including mixtures of monomers, polymers, and optional solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this disclosure, the critical temperatures (Tc) and critical pressures (Pc) of certain pure substances relevant to the current invention are those that found in the HANDBOOK OF CHEMISTRY AND PHYSICS, David R. Lide, Editor-in-Chief, 82nd edition 2001-2002, CRC Press, LLC. New York, 2001. In particular, the Tc and Pc of various molecules are:

| Name | Tc (K) | Pc (MPa) | Name | Tc (K) | Pc (MPa) |
|---|---|---|---|---|---|
| Hexane | 507.6 | 3.025 | Propane | 369.8 | 4.248 |
| Isobutane | 407.8 | 3.64 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-Butene | 419.5 | 4.02 | Propylene | 364.9 | 4.6 |
| 1-pentene | 464.8 | 3.56 | Cyclopentene | 506.5 | 4.8 |
| Pentane | 469.7 | 3.37 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2 K = 0° C.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By "continuous" is meant a system that operates (or is intended to operate) without interruption or cessation. For example a continuous process to produce a polymer would be one where the reactants are continually introduced into one or more reactors and polymer product is continually withdrawn.

The term "high boiling point diluent" refers to a hydrocarbon having a boiling point of 30° C. or more, or 50° C. or more, or 70° C. or more, or 100° C. or more, or 120° C. or more, or 150° C. or more than the boiling point of propylene (−47.6° C. at 760 mmHg). High boiling diluents are also referred to as solvents herein. In olefin polymerization, solvents are typically hydrocarbons comprising five or more carbon atoms.

Slurry polymerization refers to a polymerization process in which particulate, solid polymer (e.g., granular) forms in a dense fluid or in a liquid/vapor polymerization medium. The dense fluid polymerization medium can form a single or two fluid phases, such as liquid, supercritical fluid, or liquid/liquid, or supercritical fluid/supercritical fluid, polymerization medium. In a liquid/vapor polymerization medium, the polymer resides in the liquid (dense) phase. Slurry polymerization processes typically employ heterogeneous catalyst particles, such as Ziegler-Natta catalysts or supported metallocene catalysts, and the like. The solid polymeric product typically adheres to the heterogeneous solid catalyst particles thus forming a slurry phase. Slurry polymerization processes operate below the solid-fluid phase transition temperature of the polymerization system.

Solution polymerization refers to a polymerization process in which the polymer is dissolved in a liquid polymerization system comprising substantial amounts (typically 40 wt % or more, or 50 wt % or more, or 60 wt % or more) of solvent. Note that solution polymerization comprises a liquid polymerization system. Solution polymerization may be performed at conditions where a vapor and a liquid phase are present, in which case the polymerization system comprises the liquid phase.

Advantageously, solution polymerization is performed with liquid-filled reactors, in the substantial absence of a vapor phase. Liquid-filled reactor operations are characterized by reactor pressures that are at or advantageously above the bubble point of the polymerization system. Bubble point is defined as the pressure at which a liquid starts forming vapor bubbles at a given temperature. Bubble point pressures of hydrocarbon blends can be readily determined by standard techniques known in the art of chemical engineering. Methods suitable for conducting such calculations are equation of state methods, such as Peng Robinson or Suave Redlich Kwong. The bubble point of a liquid can be conveniently determined by reducing the pressure at constant temperature of a compressed fluid until the first vapor bubble is formed. Solution polymerization is typically performed in a single homogeneous liquid phase, but solution polymerization comprising two liquid phases are also known. In the latter case, the polymerization system is below of its cloud point pressure but above of its solid-fluid phase transition pressure and temperature. In these two-phase liquid polymerizations systems, the polymerization system is typically partitioned into two liquid phases, a polymer-lean and a polymer-rich liquid phase. In a well-stirred polymerization reactor, these two phases are finely dispersed. Note, however, that these two-phase liquid polymerizations systems have none of their components in solid state.

Supercritical polymerization refers to a polymerization process in which the polymerization system is in its dense supercritical or pseudo supercritical state, i.e. when the density of the polymerization system is above 300 g/L and its temperature and pressure are above the corresponding critical or pseudo critical values. Supercritical polymerization is typically performed in a single homogeneous supercritical phase, but supercritical polymerization comprising two supercritical fluid phases is also contemplated. In the latter case, the polymerization system is below of its cloud point pressure but above of its solid-fluid phase transition pressure and temperature. In these two-phase supercritical fluid polymerizations systems, the polymerization system is typically partitioned into two fluid phases, a polymer-lean and a polymer-rich fluid phase. In a well-stirred polymerization reactor, these two phases are finely dispersed. Note, however, that these two-phase supercritical fluid polymerizations systems have none of their components in solid state.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent. The product polymer may be dissolved in the dense fluid polymerization system or may form a solid phase. In this terminology, slurry polymerization, in which solid polymer particulates form in a dense fluid polymerization system containing less than 40 wt % of inert solvent or diluent, will be referred to as a bulk slurry polymerization process or bulk heterogeneous polymerization process. The polymerization process in which the polymeric product is dissolved in a single-phase dense fluid polymerization system containing less than 40 wt % of inert solvent will be referred to as bulk homogeneous polymerization process. The polymerization process in which the polymeric product is dissolved in a liquid polymerization system containing less than 40 wt %, or less than 30 wt %, or less than 20 wt %, or less than 10 wt %, or less than 5 wt %, or less than 1 wt % of inert solvent will be referred to as bulk solution polymerization process (as distinguished from other solution polymerization processes in which the polymeric product is dissolved in a liquid polymerization system containing greater than or equal to 40 wt % solvent). The polymerization process in which the polymeric product is dissolved in a single-phase supercritical polymerization system containing less than 40 wt %, or less than 30 wt %, or less than 20 wt %, or less than 10 wt %, or less than 5 wt %, or less than 1 wt % of inert solvent will be referred to as bulk homogeneous supercritical polymerization process.

Homogeneous supercritical polymerization refers to a polymerization process in which the polymer is dissolved in a single-phase dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which are performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system. Note that by our definitions, the catalyst system should not be considered in determining whether a polymerization process is homogeneous or not.

Fouling refers to accumulation and deposition of solid polymer in the interior reactor volume and/or in its interconnected parts such as feed ports, stirrer (for stirred reactors), etc. For crystalline polymers, the polymer tends to accumulate and deposit on the reactor interior by crystallization on surfaces that are at or below the crystallization temperature of the polymer. Reactor fouling creates considerable operational costs, including reduced production rates and increased downtime for cleaning.

Reaction zone refers to the interior of a polymerization reactor where both the catalyst system and the polymerization system are present and mixed intentionally. The reaction zone is defined as the reactor interior filled with the mixed polymerization and catalyst systems between the feed ports and the effluent ports. By "where both the catalyst system and the polymerization system are present and mixed intentionally" we mean the space where the polymerization reaction is designed to take place and the polymer is designed to be present as opposed to spaces where no reaction is intended to happen and no polymer is intended to be present, such as the interior of the catalyst and monomer feed ports, stirrer assembly, etc. Although the later spaces are directly coupled to the reaction zone, no polymer is intended to enter and no polymer is intended to be polymerized in those spaces.

Pellet stability refers to the ability of polymer pellets to avoid agglomeration and remain free-flowing during shipment and storage.

A low-crystallinity polymer component (also referred to as LCPC component or LCPC) shall mean a polyolefin polymer that has a heat of fusion of less than 50 J/g and a melting peak temperature of less than 100° C. Particles made from such low crystallinity polymers are often copolymers, generally soft to the touch and may be tacky. While these properties are desirable for many end-use applications, the polymers present storage and handling problems. For example, polymer particles, commonly referred to in the industry as pellets, made from these low crystallinity polymers have a tendency to agglomerate (or exhibit restricted flow), particularly after long-term warehouse storage at ambient temperatures, and hence exhibit what is referred to as poor pellet stability.

A high-crystallinity polymer component (also referred to as HCPC component or HCPC) shall mean a polymer that is primarily crystalline and incorporating at least 90 wt % of propylene-derived units wherein the propylene-derived units have an isotactic triad fraction of greater than about 90%. HCPCs are also characterized by high melting points of >100° C., or >135° C., or >145° C., or >150° C., or >152° C., or >154° C., or >155° C., or >156° C. and high heat of fusion of at least 75 J/g. Particles made from such high-crystallinity propylene based polymers are generally hard to the touch and are not tacky. Polymer pellets made from these low crystallinity propylene based polymers do not have a tendency to agglomerate (or exhibit restricted flow), particularly after long-term warehouse storage at ambient temperatures, and hence exhibit good pellet stability.

An ethylene-propylene random copolymer (also referred to herein as RCP, EP copolymer, EP random copolymer and EP polyolefin elastomer) is defined as propylene-based polymer with random insertions of ethylene along the propylene-based polymer backbone. This is to be distinguished from ethylene-propylene block copolymers which have groups or blocks of ethylene inserted along the propylene-based polymer backbone.

An isotactic polypropylene blend component (also referred to herein as iPP, isotactic PP, and isotactic polypropylene) is defined as propylene-based polymer with all the methyl groups located on the same side of the polymer chain. Isotactic polypropylene is semicrystalline and forms a helix configuration. The equilibrium heat of fusion for 100% crystalline isotactic polypropylene is 8.7 kJ/mol or 207 J/g (single crystal measurement) reported in B. Wunderlich, "Thermal Analysis", Academic Press, 1990, Page 418.

An in-line blending process disclosed herein refers to one where the polymerization and the polymer blending processes are integrated in a single process. Although in-line blending processes typically employ polymerization trains using solution or homogeneous supercritical polymerization systems, one or more of the polymerization trains may employ slurry polymerization systems, particularly bulk slurry polymerizaton systems. When the polymerization reactor bank includes one or more slurry polymerization trains, the effluents of those slurry trains are always heated to dissolve the polymer and are optionally pressurized before mixing them with the effluents of other trains to enable fluid-phase mixing.

Polymer pellets. polyolefin pellets, or pellets are defined as polymer particles having a variety of shapes such as spheres, cylinders, eggs and disks. Polymer pellets are typically formed with melt extruders, often twin screw extruders, which function by melting a polymer or polymer blend and extruding it through a die where it is chopped into small pellets having the above shapes. In general, pellet size is measured by the total weight of 50 pellets.

The pellet-stable polyolefin blend disclosed herein refers to a mixture of one or more low-crystallinity polymer components and one or more high-crystallinity polymer components that are blended in-line in a process. One or more of the components may be produced internally in the in-line blending process and then mixed in the same process without recovering them in their solid state. Optionally, one or more of the components may be produced off-line and in-line blended with the other polymer components. Optionally, the in-line blends may also contain additives produced outside the invention process, such as plasticizers, UV stabilizers, antioxidants, etc., and off-line polymeric additives/modifiers in minor amounts, i.e., less than 50%, or less than 40%, or less than 30%, or less than 20%, or less than 10%, or less than 5%, or less than 1% by weight.

DETAILED DESCRIPTION

Disclosed herein are novel in-line processes for producing pellet-stable polyolefin blends comprising one or more low-crystallinity polymer components (LCPCs) and one or more high-crystallinity polymer components (HCPCs). The resulting polymer blends retain the softness of the LCPC while exhibiting more rapid hardening and crystallization after production as a result of the HCPC component. In particular, pelletization of the polymer blends through conventional finishing techniques provides pellets that attain a high degree of crystallization within a relatively short period of time, upon cooling of the pellets, as compared to pellets produced from the LCPC. Pellets produced from the pellet-stable polyolefin blends exhibit reduced storage and handling problems associated with low crystallinity propylene polymers.

It has been discovered that pellet-stable polyolefin blends may be advantageously produced in an in-line process consisting of two or more parallel reactor trains for polymerizing and blending one or more LCPCs and one or more HCPCs, wherein blending occurs in the fluid phase. In some advantageous embodiments, at least one of the reactor trains operates above the critical temperature and critical pressure of the polymerization system. In some other embodiments, the polymerizations to produce the LCPC and HCPC components in-line take place in homogeneous polymerization systems. In yet other embodiments, the polymerizations to produce the LCPC and HCPC components in-line take place in solution or in homogenous supercritical polymerization systems, or in combinations thereof.

LCPC pellets alone have poor pellet stability in that they have a tendency to agglomerate during shipping, handling and transport. Not bound by any theory, agglomeration of these pellets believed to result from deformation of the polymer pellets or by binding their tacky surfaces during storage and handling during the first few hours or days following production of the pellets. Specifically, upon production, polymer pellets generally have shapes that are spherical, cylindrical, disk-like, or other shapes in which the outer surface of the pellets are curved as opposed to flat surfaces. Generally, polymer pellets are free-flowing as the curved surfaces of the pellets have minimal contact surface and thus slide freely past each other. However, under certain circumstances, the curved pellet surfaces may become flattened during storage as a result of the pellets pressing against each other, especially when stored in containers with significant vertical dimensions. When this flattening of the surfaces of the polymer pellets occurs, contact area increases significantly, reducing the ability of the pellet surfaces to slide past each other, leading to agglomeration or restricted flow of the particles in subsequent processing steps. A similar restriction of flow may also result from the binding of tacky surfaces or the combination of deformation and binding.

By increasing the rate of crystallization by incorporating one or more HCPCs into the LCPC to form a blend, flattening of the surfaces of the pellets is less likely to occur and the pellets can become hard in the course of conventional polymer finishing steps to provide free-flowing pellets, even after the pellets are stored for long periods of time at high ambient temperatures. The resistance of a pellet to flattening of its surfaces is related to the level of crystallization of the polymers and may be determined by measuring the hardness of the polymer pellets. Pellets having a Shore A Hardness (ASTM 2240) of at least 50, or advantageously at least 60, or more advantageously at least 65 have a reduced tendency to agglomerate. While pellets made from many low-crystallinity polymers may achieve this level of hardness following production, it may take days before this level of hardness is attained as the pellets crystallize slowly over time, particularly for propylene-based and ethylene-based polymers and copolymers where crystallization kinetics are known to be slower. The in-line fluid phase processes for producing pellet-stable polyolefin blends described herein speed the rate of crystallization of the polymer pellets to provide a hardness, in a short period of time after production, which enables the pellets to flow freely, even after long storage periods. The high-crystallinity blend component may also form a coating over the tacky soft component that resists binding thus prevents the formation of large, agglomerated pieces.

As disclosed in U.S. Patent Application No. 60/876,193 filed on Dec. 20, 2006, herein incorporated by reference in its entirety, an improved in-line process for blending polymers has been developed to improve blend quality and reduce the capital and operating costs associated with a combined polymerization and blending plant. The present disclosure expands the scope of U.S. Patent Application No. 60/876,193 to an in-line blending process with two or more parallel reactor trains for producing pellet-stable polyolefins.

U.S. Patent Application No. 60/905,247, filed on Mar. 6, 2007, incorporated herein in its entirety by reference, discloses novel recycle methods for the unconverted monomers that emerge from the parallel reactor trains of the in-line fluid phase polymer blending processes disclosed herein, In particular, the novel recycle methods are applicable wherein each monomer component fed to a first group of one or more reactor trains of the said in-line blending processes is also present in the feed of a second group of one or more trains of the said in-line blending processes.

U.S. Patent Application No. 60/993,647, filed on Sep. 13, 2007, incorporated herein in its entirety by reference, discloses a novel process for fluid phase in-line blending of plasticized polymers, wherein one or more of the plasticizers are produced in a reactor train in parallel with the reactor train used to produce the one or more polymers.

U.S. Patent Application No. 60/993,646, filed on Sep. 13, 2007, incorporated herein in its entirety by reference, discloses a novel process for in-line blending of off-line produced plasticizers and in-line produced polymers, wherein the one or more plasticizers are fed to the process after the polymer reactor train and while the base polymer still has a substantial quantity of light components to form a plasticized polymer blend.

As previously described, U.S. Patent Publication No. 2006/0183861, herein incorporated by reference in its entirety, discloses blends of at least two polymers incorporating propylene-derived units and processes for producing such blends wherein one polymer of the blend is a low crystallinity polymer including propylene-derived units and the second polymer is a high crystallinity polymer including propylene-derived units. The processes for producing such blends include both series polymerization and parallel polymerizations under solution polymerization conditions. The polymer blends exhibit a reduced tendency for the polymer pellets to agglomerate while maintaining the desirable physical properties, such as elastomeric properties, exhibited by low crystallinity propylene polymers. Disclosed herein are improved in-line fluid phase processes for producing pellet-stable blends of one or more LCPCs and one or more HCPCs wherein at least one of the parallel reactor trains operates under supercritical conditions. The in-line fluid-phase processes disclosed herein polymerize one or more LCPCs, and one or more HCPCs, which are subsequently blended in-line to produce stable pellets that achieve a state of crystallization sufficient to provide a Shore A hardness of at least 50, more advantageously at least 52, more advantageously at least 55, more advantageously at least 57, more advantageously at least 60, and still more advantageously at least 65, in a relatively short period time (i.e., within 40 minutes after initial cooling of the pellets, more advantageously within 30 minutes, more advantageously within 20 minutes, more preferable within 15 minutes, more advantageously within 10 minutes and more advantageously within 5 minutes), as compared to pellets produced from the one or more LCPCs alone. In one embodiment, the Shore A hardness is from 50 to 120 or 55 to 120. Without being bound by theory, it is believed that the blend of LCPC and HCPC components function to accelerate crystallization of the one or more LCPCs to help reach the requisite Shore A hardness. Also, rapid crystallization of the one or more HCPCs helps achieve the requisite Shore A hardness. The HCPC component may also form a hard coating that eliminates tackiness of the pellet surfaces.

Some embodiments of the in-line fluid phase blending processes disclosed herein allow for the agglomeration tendencies of pellets made from propylene based and ethylene based LCPCs to be reduced or eliminated by in-line fluid phase blending with at least one HCPC incorporating propylene-derived units (incorporating at least 90 wt % of propylene derived units and a melt temperature of at least 100° C. and a heat of fusion of at least 75 J/g). The one or more LCPCs and one or more HCPCs are polymerized in two or more parallel reactor trains, blended in one or more high pressure separators and formed into pellets all in one continuous in-line process, wherein one or more of the parallel reactor trains operates under supercritical conditions.

In one form of the novel in-line process to produce pellet-stable polyolefin blend pellets, the process includes providing two or more reactor trains configured in parallel and a high-pressure separator downstream fluidly connected to the two or more reactor trains configured in parallel, wherein one or more of the reactor trains produces one or more low-crystallinity polymer components (LCPCs) and one or more of the reactor trains produces one or more high-crystallinity polymer components (HCPCs). For the one or more reactor trains producing HCPCs, 1) propylene, 2) optional ethylene and/or $C_4$ to $C_{12}$ alpha olefins, 3) one or more catalyst systems, and 4) optional one or more diluents or solvents are contacted, wherein the polymerization system for at least one of the reactor trains is at a temperature above the solid-fluid phase transition temperature and at a pressure no lower than 10 MPa below the cloud point pressure and less than 1500 MPa. For the one or more reactor trains producing LCPCs, 1) ethylene or propylene, 2) one or more $C_2$ to $C_{30}$ alpha olefins and/or non-conjugated dienes, 3) one or more catalyst systems, and 4) optional one or more diluents or solvents are contacted, wherein the polymerization system for at least one of the reactor trains is at a temperature above the solid-fluid phase transition temperature and at a pressure no lower than 10 MPa below the cloud point pressure and less than 1500 MPa. A reactor effluent is formed in each parallel reactor train, which includes a homogeneous fluid phase polymer-monomer mixture. These reactor effluents are then combined to form a combined reactor effluent. The combined reactor reactor effluent is then passed through the high-pressure separator for product blending and product-feed separation. The temperature and pressure within the high-pressure separator is maintained above the solid-fluid phase transition point but below the cloud point pressure and temperature to form a fluid-fluid two-phase system comprising a polymer-rich phase and a monomer-rich phase. This allows for separating the monomer-rich phase from the polymer-rich phase to form a polymer-enriched stream comprising a blend of LCPCs and HCPCs and a separated monomer-rich stream. The polymer enriched stream is then further processed to further remove any solvent/diluent and/or monomer and is then formed into pellets to yield a pellet-stable product blend of LCPCs and HCPCs.

In another form of the novel in-line process to produce pellet-stable polyolefin blends, the process includes providing two or more reactor trains configured in parallel and two or more high-pressure separators fluidly connected to the two or more reactor trains configured in parallel, wherein one or more of the reactor trains produces one or more low crystallinity polymer components (LCPCs) and one or more of the reactor trains produces one or more high crystallinity polymer components (HCPCs). One or more of the reactor trains configured in parallel produce HCPCs by contacting 1) propylene, 2) optional ethylene and/or $C_4$ to $C_{12}$ alpha olefins, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa. One or more the reactor trains produce LCPCs by contacting: 1) ethylene or propylene, 2) one or more $C_2$ to $C_{30}$ alpha olefins and/or non-conjugated dienes, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa. In each parallel reactor trains is formed an unreduced reactor effluent including a homogenous fluid phase polymer-monomer mixture. The unreduced reactor effluents from one or more but not from all of the parallel reactor trains are then passed through one or more high-pressure separators while maintaining the temperature and pressure within the one or more high-pressure separators above the solid-fluid phase transition point but below the cloud point pressure and temperature to form one or more fluid-fluid two-phase systems with each two-phase system comprising a polymer-enriched phase and a monomer-rich phase. The monomer-rich phase from the polymer-enriched phase in each of the one or more high-pressure separators are separated to form one or more separated monomer-rich phases and one or more polymer-enriched phases. The one or more polymer-enriched phases are then combined with the one or more unreduced reactor effluents from one or more parallel reactor trains to form a mixture of one or more polymer-enriched phases and the one or more unreduced reactor effluents from the one or more parallel reactor trains to form a combined effluent stream that comprises the polymeric blend components from all parallel reactor trains. The combined effluent stream is then passed into another high-pressure separator for product blending and product-feed separation where the temperature and pressure are maintained above the solid-fluid phase transition point but below the cloud point pressure and temperature to form a fluid-fluid two-phase system comprising a polymer-rich blend phase and a monomer-rich phase. The the monomer-rich phase is separate from the polymer-rich blend phase to form a polymer-enriched stream comprising a blend of LCPCs and HCPCs and a separated monomer-rich stream. The the polymer-enriched stream is further processed to further remove any solvent/diluent and/or monomer and is then formed into pellets to yield a pellet-stable product blend of LCPCs and HCPCs.

In some advantageous embodiments, the polymerization system for at least one of the reactor trains configured in parallel operates above its critical temperature and critical pressure and the polymerization system for each reactor train comprises less than 40 wt % of the optional solvent/diluent.

The above-disclosed in-line blending processes also comprehend the option for recycling the separated monomer-rich stream from the separator(s) to the one or more of the reactor trains producing the one or more LCPCs and/or one or more HCPCs, and thus eliminating the need for separating mixed monomer and optional solvent streams before recycling them to the appropriate reactor trains as disclosed in U.S. Pat. Appl. 60/905,247, filed on Mar. 6, 2007.

In essence, the in-line blending processes disclosed herein comprise a polymerization section and at least one monomer-polymer separator vessel, called the separator-blending vessel, or separator blender, or high-pressure separator. The separator-blending-vessel serves as both a separator and a blender for the polymer-containing reactor effluents of the two or more parallel reactor trains in the reactor bank in which the two reactor trains employ a dense homogeneous fluid polymerization system (i.e., defined as a homogeneous supercritical or a solution polymerization process). It is also beneficial to the proper operation of the in-line blending processes disclosed herein to bring the polymerization system in each reactor train effluent into a homogeneous state upstream of the separator-blending vessel. Therefore, when one or more in-line blending components is/are produced in a particle-forming polymerization process, such as, for example bulk propylene slurry polymerization with Ziegler-Natta or supported metallocene catalysts, the so-produced solid polymer pellets need to be homogeneously dissolved in the reactor effluent before entering the separator-blending vessel. This can be accomplished by, for example, pumping the reactor effluent slurry into a higher-temperature/higher-pressure dissolution zone that brings the reactor effluent above the solid-fluid phase transition temperature creating a stream in which the reaction product is homogeneously dissolved.

The methods of fluid phase in-line polymer blending of one or more LCPC and one or more HCPC components disclosed herein offer significant advantages relative to prior art methods of blending these polymers. One or more of the advantages of the disclosed method of in-line blending include, but are not limited to, improved polymer blend homogeneity because of molecular-level mixing of blend components, improved cost of manufacture because of savings from avoidance of the reprocessing cost associated with conventional off-line blending processes that start with the separately produced solid, pelletized polymer blend components, and because of the ease and simplicity of blending polymers at substantially reduced viscosities due to the presence of substantial amounts of mononomers and optionally solvents in the blending step; flexibility of adjusting blend ratios and therefore blend properties in-line; flexibility in adjusting production rates of the blend components; flexibility in independently controlling for each reactor the residence time, monomer composition and conversion, catalyst choice, catalyst concentration, temperature and pressure; improved blend quality; flexibility in making a broader slate of LCPC and HCPC blended products in the same plant; reduced process cost by utilizing the monomer-polymer separator(s) for product blending; the ability to produce higher MW-higher melting point HCPC components without fouling compared to solution processing; and in some embodiments, for product buffering to allow better control of blend ratio. A further improvement over the prior art also relates to enabling the in-line production and blending of highly crystalline, high MW iPP HCPC components in a homogeneous (solution or supercritical) polymerization system amenable to in-line blending without the additional cost of converting the reactor effluent from heterogeneous to homogeneous polymerization system. Prior-art processes were only able to produce such high MW, highly crystalline, high melting point isotactic polypropylenes in heterogeneous polymerization systems, such as slurry or gas phase propylene polymerization. These processes, however, are not advantageous for in-line blending of the HCPC and LCPC components, since they do not deliver the iPP component in a homogenously dissolved dense fluid state required for in-line blending.

The pellet-stable polyolefins blends disclosed herein also yield advantageous properties including, but not limited to, improved pellet stability due to improved HCPC-performance due to the ability to in-line produce and blend isotactic polypropylene HCPC components with increased melting point, MW, and crystallinity. Such HCPC components provide superior pellet stability due to their ability to create a stiffer scaffold within the LCPC matrix.

Low Crystallinity Polymer Component (LCPC)

The following is a description of low crystallinity polymer components suitable for use in the polymer blends that may be produced in the processes described herein. In one form, the LCPC is a propylene copolymer with high (>10 wt %, or >12 wt %, or >14 wt %) comonomer levels (also referred to as a propylene-based LCPC). In another form, the LCPC is an ethylene copolymer with high (>12 wt %, >14 wt %, >20 wt %) comonomer levels (also referred to as an ethylene-based LCPC). When the LCPC is either a propylene based or an ethylene based LCPC, it shall be referred to as a LCPC.

When the LCPC is a propylene copolymer, it includes propylene-derived units and exhibits low crystallinity. In this form, the propylene copolymer comprises at least 75 wt % of propylene-derived units and 10 wt % to 25 wt % of ethylene, $C_4$ to $C_{30}$ higher alpha olefins, non-conjugated dienes and combinations thereof, and wherein the propylene-derived units have an isotactic triad fraction of about 65% to about 99% and wherein the polymer has a heat of fusion of less than 50 J/g. The heat of fusion and isotactic triad fraction of a polymer, as well as methods for determination of each, are described in WO 2002/083754 A1, which is incorporated by reference herein in its entirety. Particles made from polymers of this type are generally soft to the touch and may be tacky. While these properties are desirable for many end-use applications, the polymers present storage and handling problems. For example, polymer particles, commonly referred to in the industry as pellets, made from these polymers have a tendency to agglomerate (or exhibit restricted flow), particularly after long-term warehouse storage at ambient temperatures.

When the LCPC is an ethylene copolymer, it includes ethylene-derived units and exhibits low crystallinity. In this form, the ethylene copolymer includes between 40 wt % and 88 wt % of ethylene-derived units and 60 wt % to 12 wt % $C_3$ to $C_{30}$ higher alpha olefins, non-conjugated dienes and combinations thereof, and wherein the copolymer has a melting temperature of less than 100° C.

The LCPC has crystalline regions interrupted by non-crystalline regions. The non-crystalline regions may result from regions of non-crystallizable polypropylene or polyethylene segments and/or the inclusion of comonomer units. The crystallinity and the melting point of the LCPC are reduced compared to highly isotactic polypropylene or high density polyethylene by the introduction of errors in the insertion of propylene or ethylene and/or by the presence of comonomer.

In one embodiment, the LCPC is a propylene based copolymer that incorporates from 10 to 20 wt %, or advantageously 12 to 18 wt %, or more advantageously 14 to 16 wt %, of the ethylene-derived units. In another embodiment, the LCPC is an ethylene based copolymer that incorporates from from 10 to 40 wt %, or advantageously 12 to 18 wt %, or more advantageously 14 to 16 wt %, of the propylene-derived units.

In one embodiment, the propylene based LCPC comprises at least 75 wt % of propylene-derived units. In another embodiment, the LCPC comprises from 75 wt % to 90 wt % of propylene-derived units. In still another embodiment, the LCPC comprises from 80 wt % to 90 wt % of propylene-derived units.

In another embodiment, the ethylene based LCPC comprises between 40 wt % and 90 wt % of ethylene-derived units. In another embodiment, the LCPC comprises from 50 wt % to 85 wt % of ethylene-derived units. In still another embodiment, the LCPC comprises from 60 wt % to 85 wt % of ethylene-derived units.

In one embodiment, the LCPC has a Shore A hardness of less than about 90. In another embodiment, the LCPC has a Shore A hardness of about 45 to about 90. In still another embodiment, the LCPC has a Shore A hardness of about 50 to about 75.

In one embodiment, the LCPC has a melt flow rate (MFR) of about 0.1 to about 10,000 g/10 min. In another embodiment, the LCPC has an MFR of about 0.5 to about 2,000 g/10 min. In still another embodiment, the LCPC has an MFR of about 1 to about 100 g/10 min.

The crystallinity of the propylene-based LCPC may be expressed in terms of heat of fusion. In certain embodiments, the propylene based LCPC has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 50 J/g, or 40 J/g, or 30 J/g. Without being bound by theory, it is believed that the propylene based LCPC described herein has generally isotactic crystallizable propylene sequences, and the heats of fusion described above are thought to result from melting of these crystalline segments. In one embodiment, the LCPC has a heat of fusion of less than 30 J/g. In one embodiment, the level of crystallinity of the LCPC is also reflected in a lower (less than 100° C.) melting point.

In one embodiment, the propylene based LCPC has a weight average molecular weight (Mw) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution (MWD) characterized by the ratio of weight and number average molecular weights ($M_w/M_n$), sometimes referred to as a "polydispersity index" (PDI), within the range having an upper limit of 40, or 20, or 10, or 5, or 4.5, or 3.0, or 2.5, and a lower limit of 1.5, or 1.8, or 1.9.

In one embodiment, the propylene-derived units of the propylene based LCPC have a peak melt temperature of less than 65° C. In another embodiment, the propylene-derived units of the LCPC have a peak melt temperature less than 55° C. In still another embodiment, the propylene-derived units of the LCPC have a peak melt temperature less than 50° C.

In one embodiment, the ethylene-derived units of the ethylene-based LCPC have a peak melt temperature of less than 100° C. In another embodiment, the ethylene-derived units of the LCPC have a peak melt temperature less than 80° C. In still another embodiment, the ethylene-derived units of the LCPC have a peak melt temperature less than 60° C. In still yet another embodiment, the ethylene-derived units of the LCPC have a peak melt temperature less than 50° C.

In some embodiments, the crystallinity of the propylene-based LCPC is reduced by the copolymerization of propylene with limited amounts of one or more comonomers selected from: ethylene, $C_4$ to $C_{20}$ alpha-olefins, and polyenes. In one embodiment, the LCPC comprises at least 10 wt % of the alpha-olefin comonomer units. In another embodiment, the LCPC comprises about 10 wt % to about 20 wt % of the alpha-olefin comonomer units. In another embodiment, the LCPC comprises from about 75 wt % to about 90 wt % propylene-derived units and from about 10 wt % to about 25 wt % of the ethylene-derived units. In still another embodiment, the LCPC comprises from about 80 wt % to about 90 wt % propylene-derived units and from about 10 wt % to about 20 wt % of the ethylene-derived units. In an additional embodiment, the LCPC comprises at least 70 wt % of propylene-derived units and about 10 wt % to about 30 wt % of the ethylene-derived units.

The optional polyene units may be derived from any hydrocarbon structure having at least two unsaturated bonds wherein at least one of the unsaturated bonds may be incorporated into a polymer. For example, the optional polyene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicycle-(2.2.1)-hepta-2,5-diene, alkenyl norbornenes, alkylidene norbornenes, cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, divinyl benzene, and tetracyclo(A-1,12)-5,8-dodecene.

In one embodiment, the LCPC incorporates from about 1 wt % to about 12 wt % of polyene-derived units, based on the combined weight of the propylene-derived units or ethylene-derived units and the alpha-olefin-derived units, if any. In another embodiment, the LCPC incorporates from about 1.0 wt % to about 9.0 wt % of polyene-derived units, based on the combined weight of the propylene-derived units and the alpha-olefin-derived units, if any. In another embodiment, the LCPC incorporates from about 2.0 wt % to about 7.0 wt % of polyene-derived units, based on the combined weight of the propylene-derived units and the alpha-olefin-derived units, if any. In yet another embodiment, the LCPC incorporates from about 3.0 wt % to about 5.0 wt % of polyene-derived units, based on the combined weight of the propylene-derived units and the alpha-olefin-derived units, if any.

In one embodiment, the polyene-derived units are derived from 5-ethylidene-2-norbornene. In another embodiment, the polyene-derived units are derived from 5-vinyl-2-norbornene. In still another embodiment, the polyene-derived units are derived from divinyl benzene.

Exemplary propylene based LCPC's are commercially available from ExxonMobil Chemical under the tradename Vistamaxx®.

Process conditions and catalysts for LCPC polymerization are described in detail below. For further general process condition information suitable for use in preparing the LCPC's, reference U.S. Pat. No. 5,001,205 and PCT publications WO 96/33227 and WO 97/22639, all of which are herein incorporated by reference.

High Crystallinity Polymer Component (HCPC)

The following is a description of high crystallinity polymer components ("HCPC's") suitable for use in the polymer blends and processes described herein.

The HCPC may be a propylene homopolymer or copolymer. The polypropylene used in the blends described herein may vary widely in form. For example, a substantially isotactic polypropylene homopolymer can be used or the polypropylene can be in the form of a random copolymer containing less than or equal to about 10 weight percent of other comonomer, i.e., at least about 90% by weight propylene. In one embodiment, HCPC incorporates at least about 95% by weight propylene. Further, the polypropylene can be present in the form of a graft or block copolymer, in which the blocks of polypropylene have substantially the same stereoregularity as the propylene-alpha-olefin copolymer, so long as the graft or block copolymer has a sharp melting point characteristic of the stereoregular propylene sequences that is above about 100° C. In one embodiment, and above 135° C. In another embodiment it is above 145° C., and in still another embodiment, above 150° C. The HCPC is predominately a crystalline polymer, i.e., it has a melting point generally greater than about 100° C. and a heat of fusion above 75 J/g.

In certain embodiments, the HCPC component is a highly crystalline, high MW iPP with a peak melting temperature of at least 145° C., or at least 150° C., or at least 152° C., or at least 154° C., or at least 155° C., or at least 156° C., a heat of fusion of at least 90 J/g, or at least 95 J/g, or at least 98 J/g, or at least 100 J/g, or at least 102 J/g, or at least 105 J/g, and a weight average molecular weight ($M_w$) of at least 50 kg/mol, or at least 75 kg/mol, or at least 100 kg/mol, or at least 125 kg/mol, or at least 135 kg/mol, or at least 150 kg/mol.

The propylene polymer HCPC component may be a combination of homopolypropylene, and/or random, and/or block copolymers as described herein. When the above propylene polymer component is a random copolymer, the percentage of the copolymerized alpha-olefin in the copolymer is, in general, up to about 9% by weight, advantageously about 2% to about 8% by weight, most advantageously about 2% to about 6% by weight. The advantageous alpha-olefins contain 2 or from 4 to about 12 carbon atoms. The most advantageous alpha-olefin is ethylene. One, or two or more alpha-olefins can be copolymerized with propylene.

Exemplary alpha-olefins may be selected from the group consisting of $C_4$ to $C_{12}$ olefins such as butene-1; pentene-1, 2-methylpentene-1,3-methylbutene-1, hexene-1,3-methylpentene-1, 4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

Process conditions and catalysts for HCPC polymerization are described in detail below. The catalyst system used is advantageously one which has a high isospecificity. Crystallinity of the HCPC can also be increased if necessary by using a catalyst different from that used for making the LCPC.

LCPC and HCPC Blend Proportions

The in-line produced blends of the LCPC and HCPC may include one or more LCPCs and one or more HCPCs. The one or more LCPCs may be propylene based LCPCs, ethylene based LCPCs, or a combination thereof. In one form, there may be one, or two, or three, or four LCPCs. In another form, there may be one, or two, or three, or four HCPCs. In one embodiment, the blend includes one LCPC and one HCPC. In another embodiment, the blend includes one LCPC and two HCPCs. In another embodiment, the blend includes two LCPCs and one HCPC. In yet another embodiment, the blend includes two LCPCs and two HCPCs. In yet another embodiment, the blend includes three LCPCs and two HCPCs. In still yet another embodiment, the blend includes three LCPCs and three HCPCs.

In one embodiment, in neat form, the polymer blends described herein incorporate from about 45 wt % to about 98 wt %, more advantageously from about 50 wt % to about 98 wt %, more advantageously from about 60 wt % to about 98 wt %, more advantageously about 70 wt % to about 98 wt % of the one or more LCPCs and from about 2 wt % to about 55 wt %, more advantageously from about 2 wt % to about 50 wt %, more advantageously from about 2 wt % to about 40 wt %, and more advantageously from about 2 wt % to about 30 wt % of the one or more HCPCs. In another embodiment, in neat form, the polymer blends described herein incorporate from about 80 wt % to about 95 wt % of the one or more LCPCs and from about 5 wt % to about 20 wt % of the one or more HCPCs. In other embodiments, in neat form, the polymer blends described herein incorporate from about 90 wt % to about 95 wt % of the one or more LCPCs and from about 5 wt % to about 10 wt % of the one or more HCPCs. The polymer pellets described herein may also contain the one or more LCPCs and the one or more HCPCs in the proportions based on the combined weight of the LCPC and HCPC components.

Blend Additives

Figure 7:
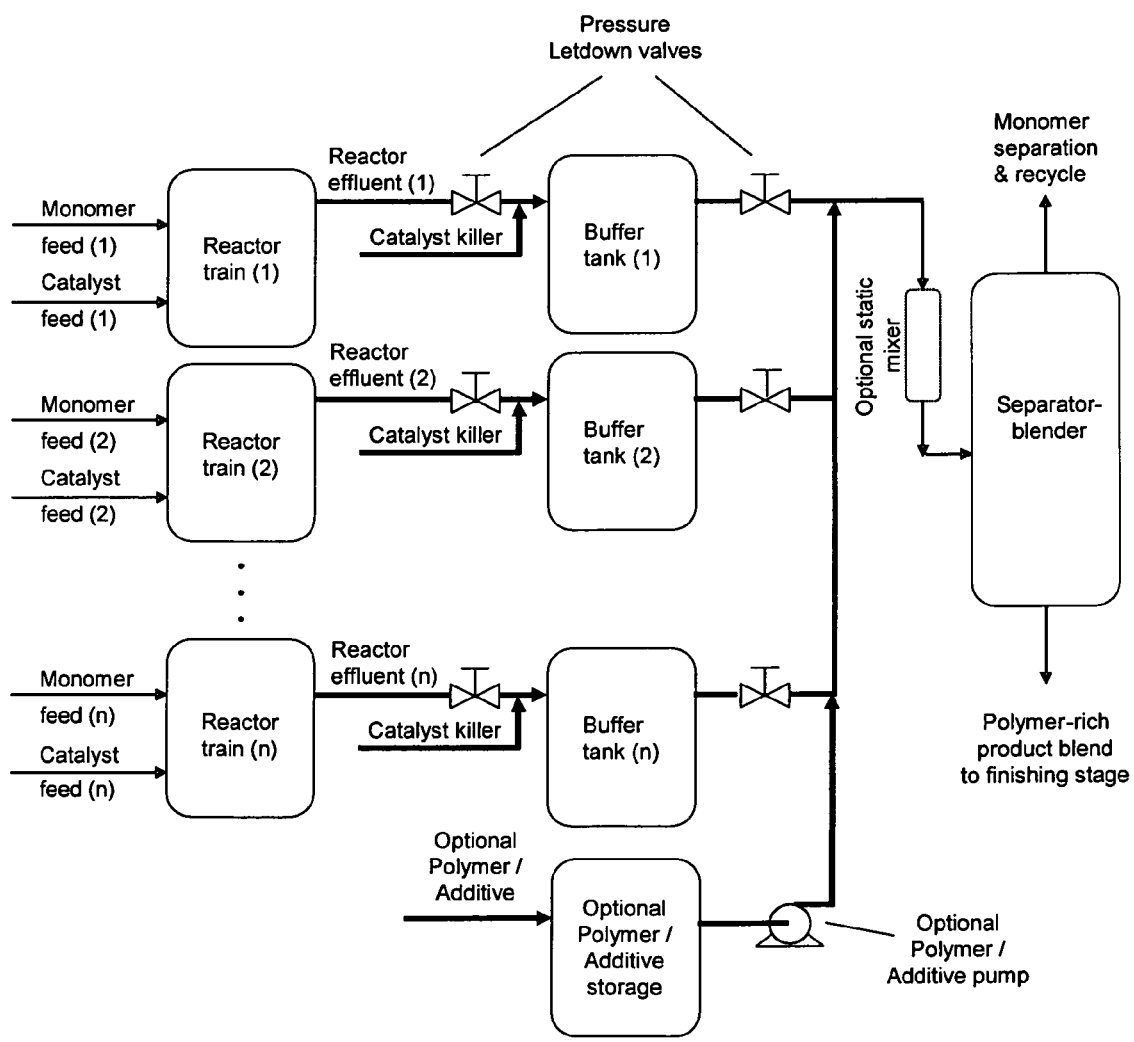
FIG. 7 presents an exemplary in-line polymer blending process schematic for producing pellet-stable polyolefin blends with buffer tanks for improved blend ratio control and with the option for additive/polymer blending component.

The pellet-stable polyolefins blends disclosed herein may be also be blended with other polymers and additives using the in-line blending process for other polymers and additives depicted in FIG. 7, in an extrusion process downstream of in-line polymerization/separation/blending processes disclosed herein, or blended in an off-line compounding process.

Tackifiers may also be blended either in-line by the processes subsequently disclosed herein (see FIG. 7), in-line via an extrusion process downstream of in-line polymerization/separation/blending processes disclosed herein, or in an off-line compounding process. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is nonpolar. Non-polar tackifiers are substantially free of monomers having polar groups. The polar groups are generally not present; however, if present, they are not present at more that 5 wt %, or not more that 2 wt %, or no more than 0.5 wt %. In some embodiments, the tackifier has a softening point (Ring and Ball, as measured by ASTM E-28) of 80° C. to 140° C., or 100° C. to 130° C. In some embodiments the tackifier is functionalized. By functionalized is meant that the hydrocarbon resin has been contacted with an unsaturated acid or anhydride. Useful unsaturated acids or anhydrides include any unsaturated organic compound containing at least one double bond and at least one carbonyl group. Representative acids include carboxylic acids, anhydrides, esters and their salts, both metallic and non-metallic. The organic compound may contain an ethylenic unsaturation conjugated with a carbonyl group (—C=O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is particularly useful. The unsaturated acid or anhydride may be present in the tackifier at about 0.1 wt % to 10 wt %, or at 0.5 wt % to 7 wt %, or at 1 to 4 wt %, based upon the weight of the hydrocarbon resin and the unsaturated acid or anhydride.

The tackifier, if present, is typically present at 1 wt % to 50 wt %, based upon the weight of the blend, or 10 wt % to 40 wt %, or 20 wt % to 40 wt %. Generally however, tackifier is not present, or if present, is present at less than 10 wt %, or less than 5 wt %, or at less than 1 wt %.

In another form, the pellet-stable polyolefin blends may further comprise a crosslinking agent. The crosslinking agent may be blended either either in-line by the processes subsequently disclosed herein, in-line via an extrusion process downstream of in-line polymerization/separation/blending processes disclosed herein, or in an off-line compounding process. Useful crosslinking agents include those having functional groups that can react with the acid or anhydride group and include alcohols, multiols, amines, diamines and/or triamines. Non-limiting examples of crosslinking agents useful include polyamines such as ethylenediamine, diethylenetriamine, hexamethylenediamine, diethylaniinopropylamine, and/or menthanediamine.

In another form, the pellet-stable polyolefin blends disclosed herein, may further comprise typical additives known in the art such as fillers, cavitating agents, antioxidants, surfactants, adjuvants, plasticizers, block, antiblock, color masterbatches, pigments, dyes, processing aids, UV stabilizers, neutralizers, lubricants, waxes, nucleating agents and/or clarifying agents. These additives may be present in the typically effective amounts well known in the art, such as 0.001 wt % to 10 wt %. These additive may be blended either either in-line by the processes subsequently disclosed herein, in-line via an extrusion process downstream of in-line polymerization/separation/blending processes disclosed herein, or in an off-line compounding process.

Useful fillers, cavitating agents and/or nucleating agents include titanium dioxide, calcium carbonate, barium sulfate, silica, silicon dioxide, carbon black, sand, glass beads, mineral aggregates, talc, clay and the like. Nucleating agents of the non-clarifying type include, but are not limited to, sodium benzoate, Amfine NA 11, Amfine NA 21, and Milliken HPN 68.

Useful antioxidants and UV stablilizers include phenolic antioxidants, such as Irganox 1010, Irganox 1076 both available from Ciba-Geigy. Oils may include paraffinic or naphthenic oils such as Primol 352, or Primol 876 available from ExxonMobil Chemical France, S.A. in Paris, France. The oils may include aliphatic naphthenic oils, white oils or the like.

Plasticizers and/or adjuvants may include mineral oils, polybutenes, phthalates and the like. The plasticizers may include phthalates such as diisoundecyl phthalate (DIUP), diisononylphthalate (DINP), dioctylphthalates (DOP) and polybutenes, such as Parapol 950 and Parapol 1300 available from ExxonMobil Chemical Company in Houston Tex. Additional plasticizers include those disclosed in WO 0118109A1, U.S. patent application Ser. No. 10/640,435, and U.S. patent application Ser. No. 11/177,004, which are incorporated by reference herein with regard to plasticizer compositions and blending thereof.

Useful processing aids, lubricants, waxes, and/or oils include low molecular weight products such as wax, oil or low $M_n$ polymer, (low meaning below $M_n$ of 5000, or below 4000, or below 3000, or below 2500). Useful waxes include polar or non-polar waxes, functionalized waxes, polypropylene waxes, polyethylene waxes, and wax modifiers.

Useful functionalized waxes include those modified with an alcohol, an acid, or a ketone. Functionalized means that the polymer has been contacted with an unsaturated acid or anhydride. Useful unsaturated acids or anhydrides include any unsaturated organic compound containing at least one double bond and at least one carbonyl group. Representative acids include carboxylic acids, anhydrides, esters and their salts, both metallic and non-metallic. The organic compound may contain an ethylenic unsaturation conjugated with a carbonyl group (—C=O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is particularly useful. The unsaturated acid or anhydride may be present at 0.1 wt % to 10 wt %, or at 0.5 wt % to 7 wt %, or at 1 to 4 wt %, based upon the weight of the hydrocarbon resin and the unsaturated acid or anhydride. Examples include waxes modified by methyl ketone, maleic anhydride or maleic acid. Low Mn polymers include polymers of lower alpha olefins such as propylene, butene, pentene, hexene and the like. A useful polymer includes polybutene having an Mn of less than 1000 g/mol. An example of such a polymer is available under the trade name PARAPOL™ 950 from ExxonMobil Chemical Company. PARAPOL™ 950 is a liquid polybutene polymer having an Mn of 950 g/mol and a kinematic viscosity of 220 cSt at 100° C., as measured by ASTM D 445.

Useful clarifying agents include, but are not limited to, the benzalsorbitol family of clarifiers, and more particularly dibenzalsorbitol (Millad 3905), di-p-methylbenzalsorbitol (Milliad 3940), and bis-3,4-dimethylbenzalsorbitol (Milliad 3988).

Dusting Blend Pellets

Pellets produced from the pellet-stable polyolefin blends described herein may be optionally "dusted" with an anti-stick agent to further help reduce agglomeration. An anti-stick agent is typically a powder. Exemplary anti-stick agents of are selected from waxes, polyethylenes, polypropylenes, talc, calcium stearate, and mixtures thereof. The anti-stick agent level will generally range from about 100 parts per million ("ppm") to about 8,000 ppm, based on the weight of the polymer blend. In certain embodiments, the anti-stick agent will be present in the range of about 500 ppm to about 7,000 ppm. In other embodiments, the anti-stick agent will be present in the range of from about 1,000 ppm to about 5,000 ppm. In still other embodiments, the range is from about 1,000 ppm to about 4,000 ppm.

Blend Applications

The pellet-stable polymer blends made by the fluid phase in-line blending process disclosed herein provide for improved properties, and hence use in a wide array of applications. One such exemplary, but non-limiting application, is in medical applications requiring improved resistance to sterilizing doses of high-energy radiation. Another exemplary, but non-limiting application of where the polymer blends made by the fluid phase in-line blending process disclosed herein find application is in various conversion processes. In particular, by combining high and low molecular weight propylene polymers in either similar or different proportion, the molecular weight distribution of the blend may be significantly broader than of either individual component. The ratio for blending the high and low molecular weight propylene polymers depends upon the desired final melt flow rate and molecular weight distribution. Such broader molecular weight distribution polymers are easier to extrusion blow mold, blow into film, thermoform, orient into film, and stretch blow mold than narrower molecular weight distribution polymers. Optionally, one of the polymer components can have long chain branching introduced through addition of a small quantity of alpha-omega-diene.

Still another exemplary, but non-limiting application of where the pellet-stable polymer polymer blends made by the fluid phase in-line blending process disclosed herein find application is in devices and packaging materials requiring good impact resistance, and particularly in low temperature environments.

Still yet another exemplary, but non-limiting application of where the pellet-stable polymer blends made by the fluid phase in-line blending process disclosed herein find application are those where materials requiring a combination of stiffness and impact resistance and/or a combination of heat resistance and impact resistance. A polymer blend useful for these applications are similar in composition to the blends specified for impact resistant devices and packages.

Still yet another exemplary, but non-limiting application of where the pellet-stable polymer blends made by the fluid phase in-line blending process disclosed herein find application are those where a device and/or package must be sterilized by high temperature and also must be soft and able to withstand impact abuse even at low temperatures. Where increasing softness of packages and device is desired, one may use a greater fraction of the one or more LCPC components in the blend and smaller fraction of the one or more stiff HCPC components in the blend. Polymer blends useful for this particular application may include a major fraction of the soft LCPC components and minor fraction of the stiff HCPC components.

Still yet another exemplary, but non-limiting application of where the pellet-stable polymer blends made by the fluid phase in-line blending process disclosed herein find application are films which are required to melt and form a seal at relatively low elevated temperature yet still maintain integrity at much higher temperature. The range of blend compositions previously specified for soft, elevated temperature resistant devices and/or packages would apply for this particular type of film application. Similar relationships between competing properties and the relative usages of the relative components would also apply for this application. More particularly, a greater fraction of the stiff HCPC polymer component may increase the seal integrity at higher temperatures, whereas a greater fraction of the soft LCPC polymer component may improve seal formation at lower temperatures and seal strength at normal temperatures.

The pellet-stable polymer blends produced by the processes disclosed herein are typically used in any known thermoplastic or elastomer application. Non-limiting examples include uses in molded parts, films, tapes, sheets, tubing, hose, sheeting, wire and cable coating, adhesives, shoe soles, bumpers, gaskets, bellows, films, fibers, elastic fibers, nonwovens, spunbonds, sealants, surgical gowns and medical devices.

As will be appreciated by one skilled in the art of polymer engineering, variations to the aforementioned polymer blends and their advantageous applications may be made without deviating from the spirit of the polymer blends provided by fluid phase in-line blending process disclosed herein. Set forth below are further details of the methods of making the HCPC and LCPC blend components previously described utilizing the novel in-line blend processes disclosed herein.

In-Line Blending Process Overview

Disclosed herein are advantageous processes for direct in-line pellet-stable polyolefin blend production in an integrated multi-reactor polymerization wherein the blending step is achieved downstream of the reactors in a separator-blending vessel (also referred to as the high-pressure separator, or as separator-blender). The production of polymer blends in the polymerization plant is facilitated when the polymer blend components are dissolved in the polymerization system forming a homogeneous polymerization system since the small-molecule component(s), such as monomer(s) and optional solvent(s)/diluent(s) of the polymerization system reduce(s) viscosity thus allowing molecular level blending in a low shear process. Hence, using the reactor effluents wherein the polymer blending components are present in a dissolved fluid state may be advantageous to downstream blending operations. The polymerization reactors advantageously may be of the homogeneous supercritical process, the solution process type, or a combination thereof in order to provide the precursor polymer for blending in a dissolved fluid state in the direct reactor effluents suitable for in-line blending without further processing. Bulk homogeneous supercritical and bulk solution polymerization processes are particularly useful for producing blend components due to the simplicity of the monomer recycle loop and due to the enhancements in reactor productivity and product properties, such as molecular weight and melting behavior, as will become apparent from the following discussions.

For producing iPP HCPC in-line blend components, homogeneous propylene polymerization processes operating in a dense fluid state with elevated monomer concentrations (more than 2.5, or more than 3.0, or more than 3.5, or more than 4.0, or more than 5.0, or more than 10.0 mol/L in the reactor effluent) and reduced solvent concentrations (70 wt % or less, or 65 wt % or less, or 60 wt % or less, or 50 wt % or less, or 40 wt % or less in the reactor effluent) at temperatures above 90° C., or above 95° C., or above 100° C., or above 105° C., or above 110° C. and above 11 MPa, or above 13.8 MPa, or above 34.5 MPa using 2,4-substituted bridged bisindenyl metallocene catalysts activated with non-coordinating anion activators are particularly advantageous due to the combination of good reactor stability and the ability to deliver highly crystalline high MW isotactic polypropylenes.

The LCPC in-line blend components can be advantageously produced in a solution or in a homogeneous supercritical polymerization process. Increased monomer concentrations are generally advantageous because they afford higher MW/lower MFR products, or alternatively afford the same MW at higher operating temperatures, and reduce the inert loads in the recycle loop thus can reduce the recycle and cooling costs. Using bulk homogeneous polymerization processes, such as bulk solution or bulk supercritical polymerization is particularly advantageous.

The processes disclosed herein can also utilize certain other polymerization processes making in-line blend components, for example, in the form of a slurry, wherein the HCPC blend components (e.g., iPP) form solid pellets in a dense fluid polymerization system. In such instances, a dissolution stage is added between the polymerization reactor train and the separator-blending vessel. This dissolution stage typically consists of a pump followed by a heater to bring the reactor effluent above the solid-fluid phase transition conditions affording a stream that contains the polymer blending component homogeneously dissolved in the dense fluid polymerization system. In order to facilitate the dissolution of the polymer pellets, increased shearing may be applied, which typically is provided by stirring or by pumping. Because of the added processing and investment costs of such reactor operations, homogeneous polymerization processes, such as homogeneous supercritical or solution polymerization, are typically cost-advantaged and thus advantageous to produce the in-line polymer blending components.

The in-line blending process for pellet-stable polyolefin blends disclosed herein requires an upstream polymerization process that provides the two blend components (one or more LCPC (ethylene-based, propylene-based or a combination thereof) and one or more HCPC) in a homogeneous fluid state. Thus, in some embodiments, at least one of the blend components is made in a homogeneous supercritical polymerization process. In other embodiments, at least one of the blend components is made in a solution process. If the polymerization reaction for one component is carried out at conditions that form particles, such as, for example, slurry polymerization, an additional step is required to bring the in-line polymer blending component into a dissolved fluid state before feeding the polymer-containing stream to the separator-blender section of the invention process (see FIG. 6). This can be accomplished by, for example, heating the reactor effluent above the solid-liquid phase transition temperature. However, for simpler and thus lower cost operations, the polymerization reaction is typically carried out at conditions where the product polymer(s) is/are dissolved in the dense fluid polymerization system comprising one or more monomers, the polymeric product(s), and—optionally—one or more inert solvents, and—optionally—one or more scavengers. Fluid-phase operations have some further advantages from certain product quality and operation stability perspectives since they do not require supported catalysts that significantly increase the ash level of the products and can cause fouling and excessive wear of downstream process hardware. The fluid reaction medium may form one single fluid phase or two fluid phases in the reactor. For more robust and simpler reactor operations, conditions affording a single fluid phase in the reactor, i.e. operating above the cloud point conditions, are advantageous.

In one embodiment of the pellet-stable polyolefin blending processes disclosed herein, the blending of two or more reactor effluent streams containing the dissolved polymer blend components occurs simultaneously with product separation in a single downstream separator-blending vessel. The separator-blender operates at conditions that lead to the formation of two fluid phases: the upper one essentially consisting of the low-molecular weight components of the polymerization systems, predominantly the monomer(s) and the optional solvent(s), while the lower one is a polymer-rich phase. In order to create the conditions that lead to the formation of two fluid phases in the separator-blender, the temperatures of the reactor effluents are often first increased to provide the heat for staying above the solid-fluid phase transition temperature of the to-be-formed polymer-rich fluid phase. After adjusting the heat contents of the reactor effluents, their pressures are typically reduced to bring the temperature and pressure of the combined effluent stream to a condition that corresponds to two fluid (liquid-liquid or supercritical fluid-supercritical fluid) phases in the phase diagram. The blending process may be aided by optional static mixer(s) downstream of the mixing point of the polymer-containing effluents but upstream of the separator-blending vessel. The homogeneous fluid blending of the individual LCPC and HCPC components and the separation of the monomer- and polymer-rich phases are accomplished in the same vessel eliminating the need for a separate blending vessel and blending process step. The bulk of the monomer(s) and the optional solvent(s) separated from the polymer is/are then recycled back into the polymerization reactor bank of the plant.

In another embodiment of the pellet-stable polyolefin blending processes disclosed herein, one or more reactor effluent streams containing the dissolved polymer blend components are fed to independent separators or separation vessels (also referred to as single-stream high-pressure separators) upstream of the separator-blending vessel for separation of a polymer-enriched stream from some fraction of the monomer and the optional solvent/diluent content of the said streams. Such single-stream high-pressure separators deployed upstream of the separator-blending vessel (high-pressure separator) in essence afford a partial recovery of the monomer and the optional solvent present in the reactor effluent thus allowing their recovery and recycle before being mixed with monomers and optional solvents used in other reactor trains. Such processes may be advantageous by eliminating the need for separating mixed monomer and optional solvent streams before recycling them to the appropriate reactor trains of the reactor bank. The polymer-enriched streams from each of these single-stream separators are blended in a separator vessel that serves both as a separator for one of the reactor trains and as a blender for the entire reactor bank (separator-blending vessel). In this embodiment, the operation conditions of the single-stream separator(s) upstream of the separator-blending vessel may be adjusted to yield polymer-enriched stream(s) that still contain(s) enough low molecular weight component(s), such as monomer(s) and optional inert solvent(s) to keep the viscosity of these streams much below that of the essentially pure molten polymer(s) thus facilitating the mixing of the blending polymer components in the separator-blender. The separator(s) feeding the separator-blending vessel may also serve as buffer vessel(s) affording an improved control of the blend ratio by compensating for the small but inevitable fluctuations in the production of the individual in-line blend components. The buffer capacity of these vessels is defined by the volume between the maximum and minimum levels of the separated polymer-enriched lower phase.

As opposed to using a cascade of series reactors for the in-line blending of LCPC and HCPC, the blending processes disclosed herein provide for the individual LCPC and HCPC components of the polymer blend to be made in a bank of parallel reactors. Such direct blend production may be advantageously achieved in polymerization processes that operate in a homogeneous dense fluid phase, i.e. above the fluid-solid phase transition limits. In some embodiments, the invention process has at least one reactor train that operates in the homogeneous dense fluid phase in its supercritical state. In other embodiments, the invention process has at least one solution polymerization train. In yet another embodiment, the invention process has a combination of solution and supercritical polymerization trains. In certain advantageous embodiments, at least one of the polymerization trains operates at elevated monomer concentrations characterized by monomer concentrations higher than 2.5, or more than 3.0, or more than 3.5, or more than 4.0, or more than 5.0, or more than 10.0 mol/L in the reactor effluent.

Polymerization processes that operate in a homogenous dense fluid phase use either inert solvent(s) or monomer(s) or their mixtures as a solvent/diluent in their liquid or supercritical state. Hence, such parallel reactors operate with polymerization systems in their homogeneous supercritical or in their liquid state. In both the supercritical and liquid operation modes, the process advantageously is a bulk polymerization process operating with less than 40 wt %, or less than 30 wt %, or less than 20 wt %, or less than 10 wt %, or less than 5 wt % of inert solvent present in the reactor, and in some embodiments, essentially free (less than 1 wt %) of inert solvents. In one embodiment of the disclosed process, the reactors operate at bulk homogeneous supercritical conditions as has been disclosed in U.S. patent application Ser. Nos. 11/433,889 and 11/177,004, herein incorporated by reference in their entirety.

In another embodiment, one or more of the reactors included in the parallel bank of reactors operate in the homogeneous supercritical state and one or more of the reactors included in the parallel bank of reactors operate in the bulk solution state (combination of bulk solution process and homogeneous supercritical process reactors). Both solution and homogeneous supercritical polymerization processes provide polymers dissolved in a fluid state, which is required for the downstream in-line blending of polymers. Both solution and homogeneous supercritical polymerization processes providing polymers in a homogeneous fluid state may be performed in a bulk monomer phase using essentially pure monomer(s) as solvent. The solution process provides for a polymer-containing liquid phase either in an inert solvent or in the essentially neat monomer or in their mixture in their liquid state. The homogeneous supercritical process provides for the polymeric fluid state by dissolving the polymeric product either in an inert solvent or in the essentially neat monomer or in their mixture in their supercritical state.

In another embodiment, one or more reactors included in the parallel reactor bank operate in homogeneous supercritical mode and one or more reactor trains operate in the slurry mode (combination of slurry and homogeneous supercritical or combination of slurry and solution processes). The dense fluid phase(s) of the slurry polymerization process(es) deployed in one or more trains of the invention in-line blending process can be either in its/their liquid or in its/their supercritical state. Before bringing the effluent(s) of the slurry train(s) to the separator-blending vessel (high-pressure separator) of the in-line blending process of the invention, the effluents are treated to fully dissolve the slurried polymer blend component. Aside this dissolution step, the other aspects of the in-line blending process disclosed herein are not affected by having particle-forming polymerization reactors in the reactor bank. This embodiment may provide product advantages in certain applications due to the ability of the slurry process to produce certain HCPP blend components, such as isotactic polypropylene made with Ziegler-Natta catalysts. It is, however, typically more expensive due to the added processing and investment cost. The optimal choice between the different reactor configurations of the invention process depends on the target product slate or even on some production site-specific issues, like, for example, the utilization of existing polymerization facilities. The optimal configuration can be determined by standard techniques well known in the art of chemical engineering.

The parallel reactor configuration disclosed herein permits for flexibility in independently controlling for each reactor the residence time, monomer composition and conversion, catalyst choice, and catalyst concentration not available in a series reactor configuration for blending LCPC and HCPC blend components. It also makes the independent control of reaction temperature and pressure easier thus enhancing the control of the polymerization processes yielding the individual LCPC and HCPC blend components.

U.S. patent application Ser. Nos. 11/433,889 and 11/177, 004 disclose a flexible homogeneous polymerization platform for the homogeneous supercritical propylene polymerization process (also referred to herein as the "supercritical process"). In the referred supercritical propylene polymerization process, polymerization is carried out in a substantially supercritical monomer medium, thus it is a bulk homogeneous supercritical polymerization process. The polymer is in a homogeneously dissolved state in the reactor and in the reactor effluent thus making the reactor effluent suitable for a direct downstream blending operation prior to recovering the polymeric products in their solid pelletized or baled form. U.S. patent application Ser. Nos. 11/433,889 and 11/177,004 also teach that the supercritical polymerization process provides an advantageous means to the so-called solution processes, particularly to the conventional solution processes operating with low monomer concentrations (less than 3.0 or less than 2.5 mol/L) in the reactor effluent, in its ability to produce highly crystalline, high molecular weight (i.e. low melt-flow rate) isotactic iPP blend components. Unlike gas phase and slurry polymerization processes, the supercritical process may also produce ethylene-propylene copolymers and iPP blend components with reduced tacticity, and thus reduced polymer melting point without fouling. As previously referenced, U.S. patent application Ser. Nos. 11/433, 889 and 11/177,004 are incorporated by reference in their entirety herein.

Advantageous pellet-stable polyolefin blends are composed of a blend of (a) one or more highly crystalline polymer component(s) and (b) one or more low crystallinity polymer component(s). Slurry and gas phase polymerization processes may provide for high molecular weight, highly crystalline polymers, but not for low crystallinity products because the polymer pellets stick together causing fouling of the reactor. Fouling often makes the production of soft materials, such as, for example, ethylene propylene copolymers commercially impractical, particularly when the ethylene content exceeds approximately 9-10 wt %. In contrast, solution polymerization processes has no such limitation and may provide for low crystallinity products because the polymer is present in solution in the reactor, and therefore cannot foul it. However, the solution process has limitations in producing highly crystalline, high molecular weight products with higher melting point. One particularly relevant limitation of the solution process is that it typically cannot produce high MW products that also have high melting point, and if it could, such products tend to crystallize in the reactor and cause fouling. In contrast, the homogeneous supercritical process may provide for both high crystallinity/high melting point and low crystallinity/low melting point polymers without fouling. It also generates the polymer blend components in a dissolved state in the polymerization system allowing direct blending without the need for a dissolution step. These attributes make it a particularly advantageous polymerization process for the pellet-stable polyolefin blending processes disclosed herein. Notwithstanding, any combination of polymerization processes operating with dense polymerization systems may be deployed in the in-line blending processes disclosed herein as long as at least one of the reactor trains operates with a homogeneous polymerization system and in its supercritical condition. Homogeneous operation is ensured by operating above the solid-fluid phase transition point, advantageously not lower than 10 MPa below the cloud point of the polymerization system.

The monomers for use in the bank of parallel reactors disclosed herein are propylene, ethylene, and optionally one or more comonomers comprising four or more carbon atoms. Non-limiting exemplary optional one or more comonomers comprising four or more carbon atoms include butene-1, pentene-1, hexene-1, octene-1, decene-1, dodecene-1, and combinations thereof. Exemplary, but not limiting, non-polymerizing (inert) fluid components serving as diluents/solvents include light paraffinic and aromatic hydrocarbons and their blends, such as butanes, pentanes, hexanes, heptanes, octanes, toluene, xylenes, cyclopentane, cyclohexane, fluorocarbons, hydrofluorocarbons, etc.

The conditions in the polymerization reactors of the aforementioned olefin polymerization process may be established such that the entire reactor content, including the monomer(s), optional non-polymerizing fluid, catalyst system(s), optional scavenger(s) and polymeric products, is in a homogeneous fluid, and advantageously in a single homogeneous fluid state. In one form, the conditions in at least one of the reactors of the aforementioned process are set such that the contents are in their supercritical fluid state, and advantageously in a single homogeneous supercritical fluid state.

The upper limit for temperature is determined by the product properties that are strongly influenced by the reaction temperature. Since often polymers with higher molecular weights and/or higher melting points are desired, high polymerization temperatures (>250° C.) are generally not advantageous. Increased temperatures can also degrade most known catalytic systems, providing another reason for avoiding excessive polymerization temperatures. At the current state of the art of polymerization, polymerization temperatures above 350° C. are not recommended. For the slurry polymerization processes, the upper temperature limits of polymerization are also influenced by the solid-fluid phase transition conditions since running near the solid-fluid phase transition line leads to fouling. For that reason, slurry operations not higher than 5° C. below the solid-fluid phase transition are advantageous, not higher than 10° C. below the solid-fluid phase transition are particularly advantageous.

The lower limits of reaction temperature are determined by the desired polymer properties. Lower temperatures generally favor higher crystallinity and higher molecular weight. For homogeneous polymerization processes, the lower limits of reaction temperature are also determined by the solid-fluid phase transition temperature. Running the reactors below the solid-fluid phase transition temperature of the reaction mixture may lead to operation problems due to fouling. For the production of highly crystalline polypropylenes (melting peak temperatures >150° C.) in bulk homogeneous supercritical polymerization processes, the minimum operating temperature is about 95-100° C. In the production of lower melting copolymers, such as ethylene-propylene copolymers, significantly lower reactor temperatures, e.g., 90° C., or 80° C., 70° C., or 65° C., or 60° C., or even lower, may be readily used without fouling. The application of certain inert solvents may further reduce the minimum operation temperature of the fouling-free operation regime, although, as discussed earlier, the substantial presence of inert solvents also tends to limit the product molecular weight and often the melting peak temperature. It also increases production cost due to the need for solvent handling.

The critical temperature and pressure of the polymerization systems are different from the critical values of pure components, and thus supercritical operations at temperatures lower than the critical temperature of pure propylene and $C_4$ plus monomers (e.g., 92° C. for propylene) are possible and disclosed herein. Additionally, near-amorphous and amorphous materials with low melting points may be produced without fouling even below the critical temperature of the reactor blends, i.e., at temperatures that correspond to the condensed liquid state of the polymerization system in the reactor. In these instances, the operation temperature may be below the bubble point of the reaction mixture and thus the reactor operates at what is often referred to as liquid-filled conditions. In some instances, such operation mode could be desired to achieve high molecular weight (MW) and thus low melt flow rate (MFR), particularly in the manufacture of copolymers, such as propylene-ethylene copolymers. Thus, reactor operations under conditions at which the polymeric products are dissolved in the monomer or monomer blend present in its liquid state, also known as bulk solution polymerization, are also disclosed herein.

Polymerization Temperature for Homogeneous Fluid Phase Polymerizations:

The polymerization process temperature should be above the solid-fluid phase transition temperature of the polymer-containing fluid polymerization system at the reactor pressure, or at least 2° C. above the solid-fluid phase transition temperature of the polymer-containing fluid polymerization system at the reactor pressure, or at least 5° C. above the solid-fluid phase transition temperature of the polymer-containing fluid polymerization at the reactor pressure, or at least 10° C. above the solid-fluid phase transformation point of the polymer-containing fluid polymerization system at the reactor pressure. In another embodiment, the polymerization process temperature should be above the cloud point of the single-phase fluid polymerization system at the reactor pressure, or 2° C. or more above the cloud point of the fluid polymerization system at the reactor pressure. In still another embodiment, the polymerization process temperature should be between 50 and 350° C., or between 60 and 250° C., or between 70 and 250° C., or between 80 and 250° C. Exemplary lower polymerization temperature limits are 50, or 60, or 70, or 80, or 90, or 95, or 100, or 110, or 120° C. Exemplary upper polymerization temperature limits are 350, or 250, or 240, or 230, or 220, or 210, or 200, or 180, or 160, or 150° C.

In certain embodiments, polymerization is performed in a supercritical polymerization system. In such embodiments, the reaction temperature is above the critical or pseudo-critical temperature of the polymerization system. In some embodiments, some or all reactors operate at homogeneous supercritical polymerization conditions Said homogeneous supercritical polymerizations of the in-line blending processes disclosed herein may be carried out at the following temperatures. In one embodiment, the temperature is above the solid-fluid phase transition temperature of the polymer-containing fluid reaction medium at the reactor pressure or at least 5° C. above the solid-fluid phase transition temperature of the polymer-containing fluid reaction medium at the reactor pressure, or at least 10° C. above the solid-fluid phase transformation point of the polymer-containing fluid reaction medium at the reactor pressure. In another embodiment, the temperature is above the cloud point of the single-phase fluid reaction medium at the reactor pressure, or 2° C. or more above the cloud point of the fluid reaction medium at the reactor pressure. In yet another embodiment, the temperature is between 50 and 350° C., between 60 and 250° C., between 70 and 250° C., or between 80 and 250° C. In one form, the temperature is above 50, 60, 70, 80, 90, 95, 100, 110, or 120° C. In another form, the temperature is below 350, 250, 240, 230, 220, 210, or 200, or 180, or 160, or 150° C.

Polymerization Pressure for Homogeneous Fluid Phase Polymerizations:

The maximum reactor pressure may be determined by process economics, since both the investment and operating expenses increase with increasing pressure. The minimum pressure limit for the production of the individual blend components disclosed herein is set by the desired product properties, such as molecular weight (MW) and melt flow rate (MFR).

Reducing process pressures in homogeneous polymerizations may lead to phase separation creating a polymer-rich and a polymer-lean fluid phase. In well-stirred reactors, where mass transport is sufficiently high due to efficient mixing of the two phases, product qualities may not be impacted by such fluid-fluid phase separation. Therefore, polymerization process conditions under which there is a polymer-rich and a polymer-lean phase are provided herein as long as both phases are above the solid-fluid phase separation limit thus preventing fouling and are well mixed thus preventing substantial mass transfer limitation leading to poorly controlled increases in molecular weight and/or compositional distributions.

Exemplary, but not limiting, process pressures, are between 1 MPa (0.15 kpsi) to 1500 MPa (217 kpsi), and more particularly between 1 and 500 MPa (0.15 and 72.5 kpsi). In one embodiment, the polymerization process pressure should be no lower than the solid-fluid phase transition pressure of the polymer-containing fluid polymerization system at the reactor temperature. In another embodiment, the polymerization process pressure should be no lower than 10 MPa below the cloud point of the fluid polymerization system at the reactor temperature and less than 1500 MPa. In still another embodiment, the polymerization process pressure should be between 10 and 500 MPa, or between 10 and 300 MPa, or between 20 and 250 MPa. Exemplary lower pressure limits are 1, 10, 20, and 30 MPa (0.15, 1.45, 2.9, 4.35 kpsi, respectively). Exemplary upper pressure limits are 1500, 1000, 500, 300, 250, and 200 MPa (217, 145, 72.5, 43.5, 36.3, and 29 kpsi, respectively).

In certain embodiments, the polymerization is performed in a supercritical polymerization system. In such embodiments, the reaction pressure is above the critical the pressure of the polymerization system. In some embodiments, some or all reactors operate at homogeneous supercritical polymerization conditions. The supercritical polymerization process of the in-line blending processes disclosed herein may be carried out at the following pressures. In one embodiment, the pressure is no lower than the crystallization phase transition pressure of the polymer-containing fluid reaction medium at the reactor temperature or no lower than 10 MPa below the cloud point of the fluid reaction medium at the reactor temperature. In another embodiment, the pressure is between 20 and 500 MPa, between 20 and 300 MPa, or between 20 and 250 MPa. In one form, the pressure is above 20, 30, or 34.5 MPa. In another form, the pressure is below 1500, 500, 300, 250, or 200, or 100 MPa.

Total Monomer Conversion for Homogeneous Fluid Phase Polymerizations:

Increasing the conversion of the total monomer feed in a single-pass in the individual reactor trains of the parallel reactor bank can reduce the monomer recycle ratio thus can reduce the cost of monomer recycle. Increasing monomer recycle ratios (i.e., the ratio of recycled/total monomer feed to the reactor train) require the treatment and recycle of larger monomer volumes per unit polymer production, which increases production cost. Therefore, higher monomer conversion (lower recycle ratios) often provides for improved process economics. However, because high polymer content in the polymerization system, particularly in homogeneous polymerization systems, yields high viscosities, which correspondingly may make reactor mixing, heat transfer, and downstream product handling difficult, the monomer conversion in a single pass has practical operation limits. The viscosity of monomer-polymer blends and thus the practical conversion limits can be readily established by standard engineering methods known in the art (M. Kinzl, G. Luft, R. Horst, B. A. Wolf, J. Rheol. 47 (2003) 869). Single-pass conversions also depend on operating conditions and product properties. Therefore, monomer conversion may also be constrained by the desire to increase the molecular weight of the blend component made in the given reactor train. Exemplary, but not limiting, total monomer single pass conversions are below 90%, more particularly below 80% or below 60%, or below 50%, or below 40%, or below 30%. Total monomer conversion is defined as the weight of polymer made in a reactor or in a reactor train divided by the combined weight of monomers and comonomers in the feed to the reactor or reactor train. It should be understood that while high total monomer conversion is often limited by product viscosity or by product property targets, the conversion of some highly reactive monomer components present in some monomer feed blends may be higher than 90%. For example, the single-pass conversion of ethylene in ethylene-propylene or in ethylene-higher olefin feed blends may be nearly complete (approaching 100%) and is disclosed herein.

As mentioned above, another factor limiting the total monomer conversion is the MW-decreasing effect of conversion. Therefore, the production of polymer blend components with high MW requires the moderation of monomer conversion in a single pass beyond that of what viscosity and other practical operation considerations would dictate. Hence, for the production of blend components with high molecular weight (particularly those with higher than >200 kg/mol weight-averaged molecular weight—$M_w$), the total monomer conversion may need to be below 30%. Again, the conversion of some highly reactive components in a monomer feed blend may be higher, and may even approach 100%.

The single-pass conversion in the polymerization reactors disclosed herein may be adjusted by the combination of catalyst concentration and total feed flow rate. The total feed rate determines the average residence time (in a back-mixed reactor equal to the reactor volume divided by the total volumetric flow rate of the effluent). The same conversion may be achieved at lower residence time by increasing the catalyst concentration in the feed and vice versa. Lower catalyst concentration may reduce catalyst cost, but may also reduce volumetric productivity thus requiring higher residence times, and ultimately a larger reactor and thus higher investment cost for the same polymer production capacity. The optimum balance between residence time/reactor volumes and catalyst concentration may be determined by standard engineering methods known in the art. A wide-range of pellet stable polyolefin blend components may be produced in the reactors disclosed herein at reactor residence times ranging from 1 sec to 120 min, particularly from 1 sec to 60 min, more particularly from 5 sec to 30 min, still more particularly from 30 sec to 30 min, and yet still more particularly from 1 min to 30 min. In yet another form of the in-line blending process embodiments disclosed herein, the residence time in the reactors disclosed herein may be less than 120, or less than 60, or less than 30, or less than 20, or less than 10, or less than 5, or less than 1 minute(s).

In certain embodiments, at least one of the reactor trains of the disclosed process operates at supercritical conditions advantageously at homogeneous supercritical conditions, or bulk homogeneous supercritical conditions. The residence times in the supercritical polymerization reactors, particularly in the bulk homogeneous supercritical reactors disclosed herein are generally lower than the residence times in solution, gas phase, and slurry processes due to the high reaction rates achieved at the conditions of the supercritical polymerization process. In-line blending processes disclosed herein applying bulk homogeneous supercritical polymerizaton often choose residence times between 1 and 60 min, and more particularly between 1 and 30 min.

The polymerization reactors of the in-line blending processes disclosed herein may be grouped into reactor(s) making a single blending component, called the reactor train. The reactors of the parallel reactor trains producing all the polymer blend components are referred to as reactor bank. The reactors in the individual trains and in the entire bank can be of any type useful for making polymers (for a review of different polymerization reactors see Reactor Technology by B. L. Tanny in the Encyclopedia of Polymer Sci. and Eng., Vol. 14, H. F. Mark et al., Eds., Wiley, New York, 1988, and J B P Soares, L C Simon in the HANDBOOK OF POLYMER REACTION ENGINEERING, T. Meyer and J. Keurentjes, Eds., Wiley-VCH, Weinheim, 2005, p. 365-430.) and can be constructed the same way or can be different. The optimal reactor type and configuration can be determined by standard techniques well known in the art of polymer reactor engineering.

It should be recognized that the catalytic activity and thus the volumetric productivity in the individual reactors may be different. If the reactor effluents for in-line blending are directly blended, the catalytic activity and the volumetric productivity may determine the reactor sizes required for the production of the individual polymer blend components. In order to reduce cost, a single plant may need to produce several polymer blends with different polymer components blended over a range of blend ratios. Consequently, a parallel reactor bank will often have reactors of different sizes allowing for a flexible and thus more cost effective configuration for the production of different polymer blend grades. The optimal reactor volumes may be determined from the combination of the composition of the target polymer blends and the volumetric reactor productivity data using optimization methods known in the art of chemical engineering.

In commercial practice, reactor productivity tends to vary to some degree, which in turn may lead to the corresponding level of variability in polymer blend ratios. In one embodiment, buffer tanks may be added to the process downstream of the reactors comprising the bank of parallel reactors, but before the polymer mixing or blending point to compensate for the fluctuations of the volumetric productivity in each reactor train producing the individual blend components (see for example FIG. 4). The buffer tanks may improve the compositional control of the final product blends by homogenizing the individual reactor effluents and by allowing a more independent metering of the polymer blend components. When an individual reactor train effluent is stored in the buffer tank in its liquid state at a pressure below its bubble point, essentially the entire volume of the buffer tank is available for compensating for the differences in the blending and production rates. However, when the individual reactor effluent is stored in the buffer tank in its supercritical state or in its liquid state but at pressures above its bubble point, the dense liquid or supercritical fluid fills the entire tank. In such operation modes, the buffering capacity, i.e. the capacity to deviate from the instant reactor flow rate, is more limited and is associated with the pressure/density changes allowed in the buffer tank and with the size of the buffer tank. In the latter case, the process streams may be driven by a gradual pressure drop downstream of the reactor to avoid the cost of installing and operating booster pumps. However, booster pumps may be alternatively installed and operated within the process to increase the pressure range and thus the buffering capacity of the system. When no booster pumps are deployed, the pressure of the buffer tank should be lower than that of the reactor, but higher than that of the lines downstream of the blending point.

Apparently, while feasible, controlling this kind of buffer system is difficult and it is not very efficient. Thus, in another embodiment, when the individual reactor effluent is stored in the buffer tank in its supercritical state or in its liquid state but at pressures above its bubble point, the conditions in the buffer tanks may be set to achieve fluid-fluid phase separation (separator-buffer tank operation). Buffering in this mode can be achieved by allowing the fluid level of the denser polymer-rich phase to move up and down between the minimum and maximum levels allowed for the desired level of separation while taking the monomer-rich upper phase out of the separator buffer via a pressure control valve. One skilled in the art can see that this operation mode is analogous to the operation of a buffer tank filled with a liquid phase containing the polymeric product and a vapor phase containing the more volatile components, such as monomer(s) and solvent(s). In the supercritical regime, the upper phase is a polymer-lean supercritical fluid, while the lower phase is a polymer-rich supercritical fluid, the latter of which can be withdrawn for blending at a controlled rate required for making a constant blend ratio, independent of the short-term fluctuations in the production ratios of the individual blend components. A similar analogy may be derived for liquid-filled operations. The polymer content, and thus the viscosity of the polymer-rich phase can be controlled by properly adjusting the temperature at constant pressure or by adjusting the pressure at constant temperature in the separator-buffer tank(s). In this embodiment, the polymer-rich effluent(s) of the separator-buffer tank(s) are combined with the direct, unseparated effluent of one of the reactor trains upstream of the separator-blending vessel that recovers the monomer of the direct reactor effluent as a supernatant and the in-line polymer blend as the bottom phase. In this particular embodiment, one of the separators serves as a separator-blender, while the rest of the separators serve as separator-buffers.

In another embodiment of the processes disclosed herein, polymer additives may be added to the pellet-stable polyolefin blends at ratios of up to 40 wt %, or up to 30 wt %, or up to 20 wt %, or up to 10 wt %, or up to 5 wt % to further improve product quality and product properties. Exemplary, but not limiting polymer additives, include specialty polymers including polar polymers, waxes, polyalfaolefins, antioxidants, plasticizers, clarifiers, slip agents, flame retardants, heat and uv stabilizers, antiblocking agents, fillers, reinforcing fibers, antistatic agents, lubricating agents, coloring agents, foaming agents, tackifiers, organically modified clays such as are available from Southern Clay, and masterbatches containing above components. Hence, one or more polymer additive storage tanks containing liquid, molten, or dissolved polymer components and polymer additives may be added to the processes disclosed herein. If solvent(s) is used in these polymer additive storage tanks, it may be advantageously the same as used in the polymerization reactors previously described in order to avoid an increase in separation costs in the solvent recovery and recycle section of the process. For example, when the polymer synthesis process is performed in supercritical propylene, the off-line produced polymer additives may also be advantageously dissolved in supercritical propylene. However, other solvent(s) or solvent-free introduction may be used with the polymer additives. Solvent-free introduction of the polymer additive components may be used when the additive component is brought into its molten state or when the additive component is a liquid at ambient temperatures.

The homogeneous supercritical polymerization and the solution polymerization processes are particularly suitable for providing the product polymer in a dissolved fluid state. In one particular embodiment, the supercritical polymerization process is performed in the substantial absence of an inert solvent/diluent (bulk homogeneous supercritical polymerization) and provides the product in a dissolved supercritical state for the downstream in-line separation-blending process. More particularly, the supercritical polymerization of propylene is performed in the substantial absence of an inert solvent/diluent (bulk homogeneous supercritical propylene polymerization) and provides the product in a dissolved supercritical state for the downstream in-line separation-blending process.

The total amount of inert solvents is generally not more than 40 wt % in the reactor feeds of the invention process. In some embodiments, where the feed essentially comprises the monomer or monomer blend, like for example, bulk slurry, or bulk supercritical, or bulk solution polymerizations, the minimization of solvent use is desired to reduce the cost of monomer recycling. In these cases, the typical solvent concentration in the reactor feed is often below 40 wt %, or below 30 wt %, or below 20 wt %, or below 10 wt %, or below 5 wt %, or even below 1 wt %. In one form disclosed herein, the polymerization system comprises less than 20 wt % aromatic hydrocarbons and advantageously less than 20 wt % toluene. In another form disclosed herein, the polymerization system comprises less than 40 wt %, or less than 30 wt %, or less than 20 wt % saturated aliphatic hydrocarbons and advantageously less than 40 wt %, or less than 30 wt %, or less than 20 wt % of decanes, or nonanes, or octanes, or heptanes, or hexanes, or pentanes, or butanes, or propane, or their mixtures.

In-Line Blending Process Configuration

The fluid phase in-line blending process disclosed herein may have different detailed process configurations. For example, the number of parallel reactor trains and their configurations in the parallel reactor bank may be varied. Typically, each reactor train serves to produce either an LCPC or a HCPC blend component. A given train of the parallel reactor bank may be configured as a single reactor or two or more reactors in series. From a practical commercial plant design standpoint, however, there should be a minimum number of reactors for a given train of the parallel reactor bank in order to make a given polymer blend component. Generally, not more than ten series reactors are utilized and more particularly not more than three series reactors are generally utilized in a given reactor train. The number of parallel trains in the parallel reactor bank may be two, three, four or five or more. The number of reactors in the parallel reactor bank may be any number, although for economic reasons the number of reactors should be maintained as low as the desired product grade slate and plant capacity allows. The optimum number of parallel reactor trains (also referred to as legs of the reactor bank) may be determined by standard chemical engineering optimization methods well known in the art. Most typically, the polymerization-blending plant will have two or three parallel polymerization reactor trains or legs in the reactor bank producing product blends with the corresponding number of in-line polymer blend components. However, more than three parallel reactors/legs may be employed if the production of the target product blends so requires. Besides the in-line polymer blend components, the final polymer blends often contain additives and modifiers that are not produced within the same polymerization process. Therefore, it should be understood that the number of components in the final product blend typically is higher than the number of reactor trains or the number of in-line polymer blend components.

The fluid phase in-line pellet-stable polyolefin blending process disclosed herein may also optionally incorporate other polymers, and polymer additives that were produced outside the reactor bank of the processes disclosed herein. The optional other polymer and polymer additive components may first be transferred into solution or molten fluid state before being blended with the in-line produced polymer blend components. These other polymer and polymer additive components may be stored in polymer additive storage tanks containing liquid, molten, or dissolved polymer components and polymer additives prior to being transferred and metered to the separation-blending vessel or to a mixing point upstream or downstream of the separation-blending vessel. Polymer and polymer additive components may be accurately metered to the blending vessel or to another mixing point by one or more pumps or if the downstream pressure is lower, through the use of one or more pressure letdown valves. The optional additives and modifiers can be mixed into the product upstream of or directly in the separator-blending vessel or downstream of the separator-blending vessel of the processes disclosed herein. In order to simplify monomer treatment in the monomer recycle train and thus to reduce the cost of monomer recycle, it is often advantageous to add the additives and modifiers downstream of the separator-blending vessel. In such embodiments, the additives and modifiers may be mixed with the in-line produced polymer blend in dedicated pieces of equipment or in the hardware of the product finishing section of the processes disclosed herein, for example, in the devolatizer extruders.

Figure 2:
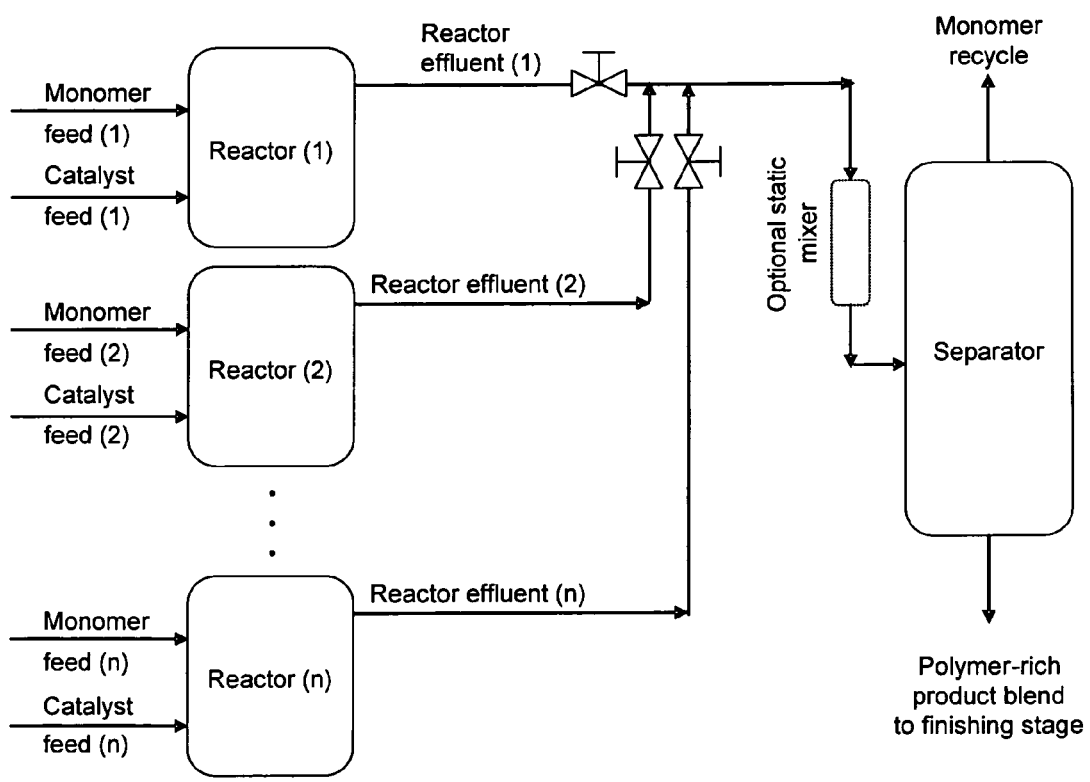
FIG. 2 presents an exemplary in-line polymer blending process schematic for producing pellet-stable polyolefin blends with a single separation vessel.

Referring to FIG. 2, in one exemplary embodiment of the fluid phase in-line pellet-stable polyolefin blending process disclosed herein, the effluents of all parallel reactor trains in the reactor bank are brought into a single separator-blending vessel (also referred to as a high-pressure separator). The separator-blender separates some or most of the low molecular weight components, such as monomer(s), optional solvent(s), and product lights (monomer-rich phase) from the polymer-rich phase, but also blends the LCPC and HCPC blend components made in different reactor trains of the invention process forming a polymer-rich blend effluent. This mode is also referred to as single separation vessel operation. The number of reactor trains in the parallel bank may be 2, 3, 4, and up to n. The effluents of the different reactor trains and thus the individual polymer components are combined upstream of the separation vessel after individual pressure let down valves, which function to bring the reactor train effluents to the common pressure of the separator-blending vessel. Catalyst killing agent(s) may be optionally introduced prior to or into the separator-blending vessel to minimize further polymerization outside the polymerization reactors. Optionally, one or more static mixers positioned before the separator-blending vessel, but downstream of the mixing point, may also be utilized to enhance mixing between the reactor train effluents. Optionally, some or all reactor train effluents may be heated before the pressure letdown (not shown in FIG. 2) in order to maintain the temperature in the downstream lines and in the separation-blending vessel at the desired value, i.e., above the solid-fluid phase transition temperature of the polymer-rich phase of the separator-blender, but below the cloud point of the combined effluents entering the separator-blending vessel to allow the formation of a polymer-rich denser fluid phase and a monomer-rich lighter fluid phase.

After the combined reactor train effluent streams enter the separator-blending vessel, monomer recycle (monomer-rich phase) emerges from the top of the separator-blending vessel and a polymer-rich blend emerges from the bottom of the vessel. The polymer-rich blend may then be conveyed to a downstream finishing stage for further monomer stripping, drying and/or pelletizing. As described earlier, modifiers and additives may also be introduced either before or into the separator-blending vessel or downstream of it. A downstream introduction of these modifiers and additives typically simplifies monomer recycle, and is thus advantageous. In this embodiment, the single separator-blending vessel serves as both a separator and a blender. One advantage of this exemplary embodiment is the utilization of a single separator-blending vessel, which provides for process simplicity because it functions for both separation and blending purposes. One disadvantage of this exemplary embodiment is that because all reactor train effluent streams are combined, the recovered monomer stream from the separator-blending vessel may need to be separated prior to recycle to the individual reactor trains in the parallel bank of reactors. In summary, this embodiment may be simpler and thus lower cost in the separator section, but may be more costly in the monomer separation and recycling loop section of the process.

Figure 3:
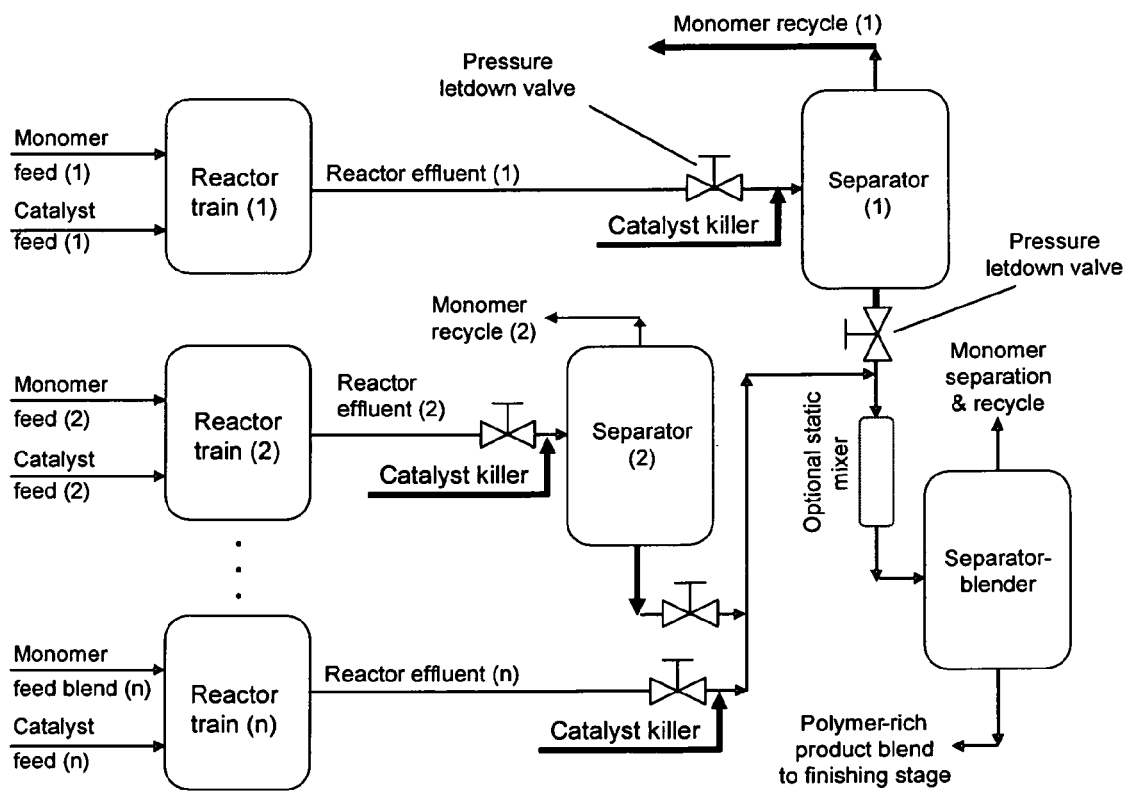
FIG. 3 presents an exemplary in-line polymer blending process schematic for producing pellet-stable polyolefin blends with multiple separation vessels.

FIG. 3 depicts an alternative exemplary embodiment of the fluid phase in-line pellet-stable polyolefin blending process disclosed herein in which each reactor train has a dedicated separator vessel with the exception of one reactor effluent train where all polymer-rich phases from the other reactors are combined in a high-pressure separator that also serves as a blending vessel (also referred to as multiple separation vessel operation). In this embodiment, for all but one of the reactor trains (all but train n in FIG. 3), the single-stream high-pressure separator serves as a separator to separate a polymer-enriched phase from a monomer-rich phase in the reactor effluent stream. In order to keep the content of low molecular weight components higher and thus to keep the viscosity of the polymer-enriched phase lower, the single-stream high-pressure separators dedicated to the individual reactor trains often operate at a somewhat higher pressure than the one downstream high-pressure separator that serves both as a separator and as a blender (separator-blender). Therefore, there is an optional pressure letdown between these separators and the separator-blender. For the one high-pressure separator (separator-blender) where the other polymer-rich phases are combined and the reactor train effluent from one of the reactor trains is introduced (reactor train n in FIG. 3), the separator serves both LCPC-HCPC blending and product-feed separating functions. Catalyst killing agent may be optionally introduced prior to or into each separator vessel, including the separator-blender to minimize further polymerization outside the polymerization reactors. Optionally, one or more static mixers positioned before the separator-blending vessel, but downstream of the mixing point may be utilized to enhance mixing between the polymer-rich phases of the reactor trains and the reactor train effluent of the reactor train associated with the separator-blender. Optionally, some or all reactor train effluents may be heated before the first pressure letdown (not shown in FIG. 3) in order to maintain the temperature in the downstream lines and in the separators, including the separation-blending vessel, at the desired value, i.e., above the solid-fluid phase transition temperatures of the polymer-rich phases but below the cloud point of the streams entering the separators, including the separator-blender, to allow the formation of polymer-enriched or polymer-rich denser fluid phases and monomer-rich lighter fluid phases. The process of this embodiment may be advantageous in the production of polymer blends that include different homopolymers or homopolymer(s) and copolymer(s) as blend components. In this embodiment, the homopolymerization train(s) has/have its (their) own separator(s) and the copolymerization train (or one of the copolymerization trains in case of more than one copolymer trains used) serves as a blender. The monomer(s) recovered in the separator(s) dedicated to individual reactor train(s) may be recycled to the corresponding reactor train(s) without the complex separation from other monomers as was associated with single separation-blending vessel operation previously described. Hence, one advantage of this embodiment is that monomer recycle is simplified and thus affords lower cost in the monomer recycle loop. While multiple separation vessel operation increases cost in the separator section, it adds flexibility in the monomer recycle loops. In summary, this embodiment may be more complicated and higher cost in the separator section, but may be simpler in the monomer recycle loops.

Since both embodiments of FIGS. 2 and 3 serve the same function of polymer blending and separation of the polymer-rich from the monomer-rich phases, the choice between them is driven by the economics of a given plant producing a given product slate and may be determined by standard engineering optimization techniques known in the art.

Figure 4:
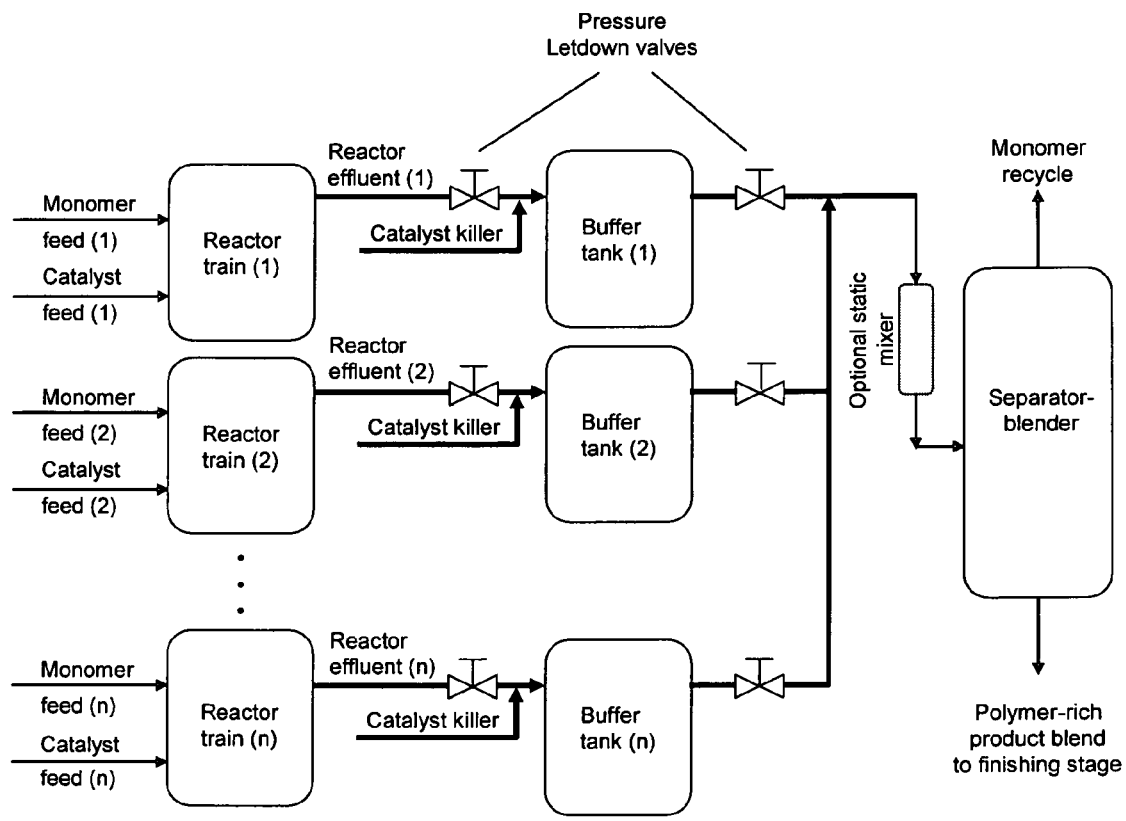
FIG. 4 presents an exemplary in-line polymer blending process schematic for producing pellet-stable polyolefin blends with product effluent buffer tanks for improved blend ratio control.

FIG. 4 presents another alternative exemplary embodiment of the fluid phase in-line pellet-stable polyolefin blending process disclosed herein in which is provided a dedicated buffer tank in which no phase separation occurs for each reactor train and in which the reactor train effluents are combined in a single separator-blending vessel (also referred to as single separation vessel operation with buffer tanks). Each of the n parallel polymerization reactor trains in the reactor bank is provided with its own buffer tank to enable the fine-tuning of the mixing ratio of the blend components. Pressure let down valves may be positioned on the inlet and outlet side of each buffer tank to control the in-line polymer blend component flow. Optionally, the reactor effluents may be heated to maintain the desired temperature in the downstream separator-blender as described above. Catalyst killing agent may be optionally introduced prior to or into each buffer tank to minimize further polymerization outside the polymerization reactors. Optionally, one or more static mixers positioned after the mixing point but before the separation vessel for blending may be utilized to enhance mixing between the reactor effluents being fed from the buffer tanks. In comparison to the single separation vessel operation of FIG. 2, this alternative exemplary embodiment allows for more precise control of the blend ratio and quality but without the benefit of dedicated monomer recovery provided by the configuration depicted in FIG. 3. As previously discussed, this embodiment may improve the control of product blend ratio and hence product quality, but its buffer capacity may be limited.

Figure 5:
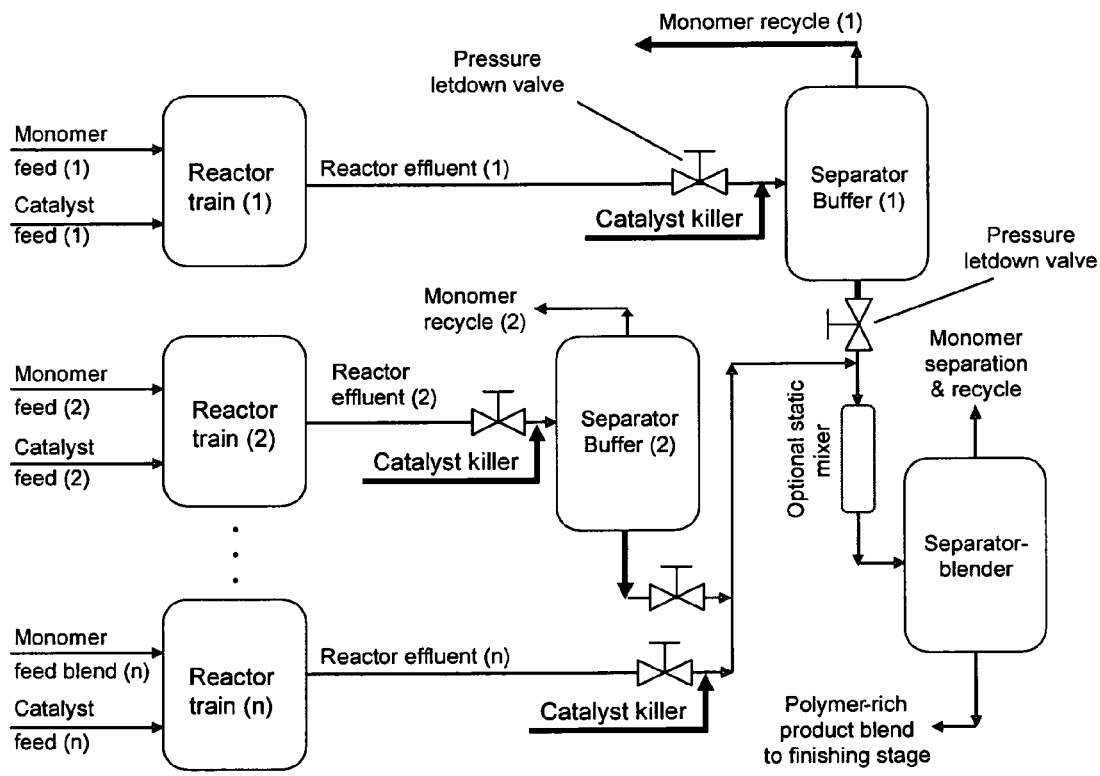
FIG. 5 presents an exemplary in-line polymer blending process schematic with product effluent buffer tanks that also serve as monomer/product separators for improved blend ratio control.

An alternative design employing buffering capability is depicted in FIG. 5. FIG. 5, a variation of the multiple separation vessel operation depicted in FIG. 3, and presents yet another alternative exemplary embodiment of the fluid phase in-line pellet-stable polyolefin blending process disclosed herein. In this exemplary embodiment the single-stream high-pressure separators dedicated to the individual reactor trains also serve as buffer tanks. Referring to FIG. 5, for all reactor trains but n, the reactor train effluent is fed to a dual-purpose separator-buffer for both separation of the polymer-rich phase from the supernatant monomer-rich phase and storage of polymer-rich phase prior to conveyance to a downstream blending separator. These single-stream separators dedicated to individual reactor trains afford buffering by allowing the level of the denser polymer-rich phase to move between an upper and a lower limit. This buffer capacity allows for the correction in the potential fluctuations in the production rates of the individual in-line blend components and thus provides a means for a more precise control of the polymer blend ratio. For reactor train n, the high-pressure separator (separator-blender) functions to separate the polymer-rich phase from the monomer-rich phase for the reactor effluent from reactor n and also to blend the polymer-rich phases from all reactors reactors (1, 2, through n in FIG. 5). From a blend control point of view, there is no buffering for the in-line component n, and thus all other blend component flows to the separator-blending vessel, and ultimately their production rates, are controlled by the production rate in reactor train n in order to maintain the desired blend ratios. Catalyst killing agent may be optionally introduced prior to or into each separator vessel to minimize further polymerization within the separator. Optionally, one or more static mixers positioned before the separation vessel for blending may be utilized to enhance mixing between polymer-rich phases of the reactors and the reactor effluent of the reactor associated with the blending separator. For heat and pressure management, the same considerations, configurations, and controls may be applied as described for the previous embodiments. As in all process configurations, optional modifiers and additives may be introduced either prior or into the separator-blending vessel or downstream of it.

Figure 6:
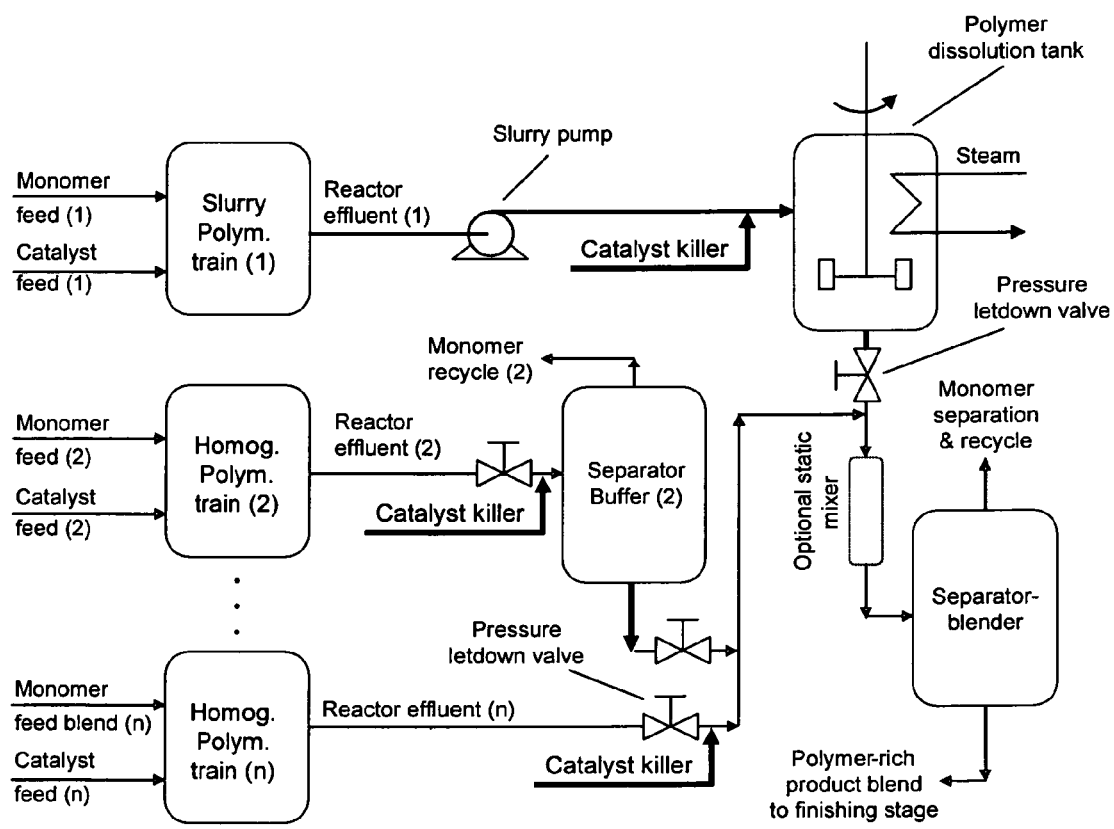
FIG. 6 presents an exemplary in-line polymer blending process schematic for producing pellet-stable polyolefin blends with one slurry reactor train.

FIG. 6 presents yet another exemplary embodiment of the fluid-phase in-line pellet-stable polyolefin blending process disclosed herein in which one of the parallel polymerization trains (train 1 in FIG. 6) produces the polymer blending component (HCPC or LCPC) in the form of solid pellets, i.e. operates in the slurry polymerization regime. Thus in order to bring the polymer into a dissolved state before in-line blending, the reactor effluent is brought into a heated stirred vessel. In order to keep the entire reactor effluent in a dense fluid phase, the pressure of the reactor effluent is increased by a slurry pump. Slurry polymerization typically operates at lower temperatures than supercritical and solution polymerizations and thus may afford products with higher molecular weight and melting peak temperatures, which may provide advantages in certain polymer blend applications. However, the dissolution of polymer pellets adds cost and tends to be prone to fouling and other operational issues. Other aspects of the in-line blending process disclosed herein, such as catalyst killing, additive blending, heat and pressure management, as described in the previously described embodiments, apply hereto as well.

FIG. 7 presents still yet another exemplary embodiment of the fluid phase in-line pellet-stable polyolefin blending process disclosed herein in which one or more optional polymer and/or more polymer additive storage tanks may be added to the process for the storage and metering of other fluid polymers and polymer additives to the blending vessel. Optional pump(s) may be used to convey the polymer(s) or polymer additive(s) to the separator vessel for blending. Note that FIG. 7 presents the particular embodiment wherein the one or more optional polymer and/or more polymer additive storage tanks are added to the single separation-blending vessel operation with buffer tanks configuration of FIG. 4. However, the one or more optional polymer and/or one or more polymer additive storage tanks may be added to the processes depicted in FIG. 2, FIG. 3, and FIG. 5 without deviating from the spirit of the fluid phase in-line blending process disclosed herein. Similarly, optional off-line produced polymers, modifiers and additives may be introduced in any part of the polymer finishing section or in a dedicated section prior to the product finishing section of the process disclosed herein. Other aspects of the in-line blending process disclosed herein, such as catalyst killing, additive blending, heat and pressure management, as described in the previously described embodiments, apply hereto as well.

As will be appreciated by one skilled in the art of chemical engineering, the process schematic details of the design of the fluid phase in-line blending process in terms of reactor configuration, separator configuration, valving, heat management, etc. may be set differently without deviating from the spirit of the fluid-phase in-line blending process disclosed herein. The choice between different embodiments of the processes disclosed herein will be driven by product performance requirements and process economics, which can be readily determined by standard engineering techniques. However, the in-line blending processes disclosed herein are advantageous relative to the prior art by the virtue of reduced blending cost due to savings in investment and operation costs, and enabling well-controlled and cost-effective molecular-level blending to yield enhanced polymer blend performance.

The processes disclosed herein provide an effective recycle pathway for homogeneous supercritical olefin polymerization, an example of which is bulk homogeneous supercritical propylene polymerization (SCPP). As will be discussed in more detail below, the efficient separation of monomer and polymer is achieved by advantageously utilizing the cloud point pressure and temperature relationships for the relevant (polymer/olefinic monomer) or (copolymer/olefinic monomer blend); e.g. (polypropylene/propylene monomer), (ethylene-propylene copolymer/ethylene-propylene monomer blend), etc. mixtures.

Monomer Recycle to Parallel Reactor Trains:

As disclosed in U.S. Patent Application No. 60/905,247, filed on Mar. 6, 2007, incorporated herein in its entirety by reference, some forms of the the present disclosure also provide for simplified recycle methods for the monomers emerge unconverted from the parallel reactor trains. In particular, the simplified monomer recycle methods are applicable for use with said fluid-phase in-line polymer blending processes in which each monomer component fed to a first group of one or more reactor trains of the said in-line blending processes (G1) is also present in the feed of a second group of one or more trains of the said in-line blending processes (G2) so that when the monomer pool of the said first group of trains (G1) is combined with the monomer pool of the second group of trains (G2), the said combined monomer pool and the monomer pool of the second group of trains (G2) are the same. Stating it differently, when the effluents (or reduced effluent streams derived from the effluents) of the said first group of reactor trains (G1) are combined with the effluents of the said second group of reactor trains (G2), the combined effluent stream essentially contains only monomers that are present in the feed of the said second group of reactor trains (G2). Stating it yet another way, the effluents (or reduced effluent streams derived from the effluents) of the said first group of reactor trains (G1) essentially do not introduce new monomer components into the recycled effluents of said second group of reactor trains (G2) when the effluent streams of G1 and G2 are combined. In a mathematical form, these conditions can be described as follows:

$$N(G1+G2)=N(G2) \text{ and } N(G1) \leq N(G2)$$

Where $N(G1+G2)$ is the number of monomers in the combined monomer pool of the first and second group of reactor trains of the in-line fluid phase polymer blending process; $N(G1)$ and $N(G2)$ are the number of monomers in the monomer pool of the first (G1) and second (G2) group of reactor trains of the in-line fluid phase polymer blending process, respectively. The monomer pools present in the individual reactor trains of G1 can be the same or different. However, the monomer pools present in the individual reactor trains of G2 are always the same, although the monomer concentrations or monomer ratios may be different (but may also be the same). The number of reactor trains both in the first and in the second groups of reactor trains (G1 and G2) can be one or more than one. In practice, the number of reactor trains belonging to the first group of reactor trains of the in-line fluid phase polymer blending process (G1) can be one, two, three, four, five, or more. Similarly, the number of reactor trains belonging to the second group of reactor trains of the in-line fluid phase polymer blending processes (G2) can also be one, two, three, four, five, or more. It should be understood that as all reactor trains of the in-line fluid phase polymer blending processes disclosed herein, the one or more reactor trains of G1 are configured in parallel relative to the one or more reactor trains of G2. The G1 and G2 reactor trains are also fluidly connected to one another. When the above-stated conditions for the monomer pools are met in the in-line fluid phase polymer blending processes disclosed herein, the simplified monomer recycle methods disclosed in U.S. Patent Application No. 60/905,247 are applicable to the present disclosure. In all embodiments of the simplified recycle processes, the monomer recycle streams recovered from the product streams of G1 before mixing them with any of the effluents of G2 are recycled to G1 while the monomer recycle streams recovered from the mixed polymer-containing streams of G1 and G2 are recycled to G2. Since the mixed streams that contain monomers originated both from G1 and G2 are recycled to G2, the simplified monomer recycle methods also ensure that the monomer component recycle rates in the recycle stream originated from the combined G1 and G2 product-containing streams and sent to G2 are not higher than the desired monomer component flow rates in the composite feed of G2.

The simplified recycle methods described above and in U.S. Patent Application No. 60/905,247 are particularly advantageous to the in-line blending processes for producing pellet-stable polyolefin blends disclosed herein because either propylene monomer, ethylene monomer, or both may be present in each of the two or more parallel reactor trains. For example, if one parallel reactor train polymerizes isotactic polypropylene as the HCPC, and a second parallel reactor train polymerizes ethylene-propylene copolymer with an ethylene content of 15 wt %, the unreacted propylene monomer from the first reactor train may be combined with the unreacted propylene and ethylene monomers from the second parallel reactor train and recycled back to the second parallel reactor train using the simplified monomer recycle methods disclosed herein.

Catalyst System Overview

The in-line process for polymerizing and blending LCPC and HCPC blend components disclosed herein may utilize any number of catalyst systems (also referred to as catalysts) in any of the reactors of the polymerization reactor section of the process. The catalyst system for polymerizing the one or more LCPCs will generally result in a relatively lower level of stereospecificity to result in low cystallinity. In contrast, the catalyst system for polymerizing the one or more HCPCs will generally result in a high level of stereospecificity to result in high cystallinity.

An exemplary family of suitable catalysts for producing both the LCPC and HCPC blend components is known in the art as bridged bisindenyl metallocenes. As described by many papers (see for example, W. Spaleck et al., Organometallics, 13 (1994) 954, W. Spaleck et al., "New Isotactic Polypropylenes via Metallocene Catalysts" in Ziegler Catalysts, Fink/Mulhaupt/Brintzinger, Eds., Springer, Berlin, 1995, and L. Resconi et al., J. Am Chem. Soc. 120 (1998) 2308). This family of metallocene catalysts can provide both high and low stereo regularity for propylene incorporation depending on the substitution on the bisindenyl scaffold. For example, the unsubstituted parent (such as for example, the Hf version, dimethyl (μ-dimethylsilyl)bis(indenyl)hafnium activated by MAO or borate non-coordinating anion activators) may provide for low stereoregularity, and thus reduced crystallinity, while some substituted derivatives, particularly the 2,4-substituted versions (such as, for example, the Zr version, dimethyl (μ-dimethylsilyl)bis(2-methyl-4-naphthylindenyl)zirconium), afford high stereoregularity. The latter thus is particularly useful for producing high-crystallinity iPP HCPC blend components.

The in-line process for blending polymers disclosed herein may also utilize the same or different catalysts or catalyst mixtures in the different individual reactors of the reactor bank of the present invention. It should be understood that by using different catalyst systems we mean that any part of the catalyst system can vary and any combination is allowed. For example, the invention process may use unsupported catalyst systems in some trains while using supported catalyst systems in other trains. In other embodiments, the catalyst systems in some reactor trains may comprise aluminoxane (for example, MAO) activator, while comprising non-coordinating anion activators in some other trains. In another embodiments, the catalyst systems in some reactor trains may comprise Ziegler-Natta catalysts, while the catalyst systems in other reactor trains of the invention process may comprise metallocenes or nonmetallocene metal-centered, heteroaryl ligand catalyst compounds (where the metal is chosen from the Group 4, 5, 6, the lanthanide series, or the actinide series of the Periodic Table of the Elements) activated by aluminoxane or non-coordinating anion activators or any combinations thereof. While the number of different catalyst systems deployed in the invention processes can be any number, the use of no more than five different catalysts and more particularly, no more than three different catalysts in any given reactor is advantageous for economic reasons. The deployment of no more than ten catalysts or the deployment of no more than six catalysts in the reactor bank of the polymerization process is advantageous for economic reasons. The one or more catalysts deployed in the reactors may be homogeneously dissolved in the fluid reaction medium or may form a heterogeneous solid phase in the reactor. In one particular embodiment, the catalyst(s) is (are) homogeneously dissolved in the fluid reaction medium. When the catalyst is present as a solid phase in the polymerization reactor, it may be supported or unsupported.

The process disclosed herein may use any combination of homogeneous and heterogeneous catalyst systems simultaneously present in one or more of the individual reactors of the polymerization reactor section, i.e., any reactor of the polymerization section of the present invention may contain one or more homogeneous catalyst systems and one or more heterogeneous catalyst systems simultaneously. The process disclosed herein may also use any combination of homogeneous and heterogeneous catalyst systems deployed in the polymerization reactor section. These combinations comprise scenarios when some or all reactors use a single catalyst and scenarios when some or all reactors use more than one catalyst. The one or more catalysts deployed in the process disclosed herein may be supported on particles, which either can be dispersed in the fluid polymerization medium or may be contained in a stationary catalyst bed. When the supported catalyst particles are dispersed in the fluid reaction medium, they may be left in the polymeric product or may be separated from the product prior to its crystallization from the fluid reactor effluent in a separation step that is downstream of the polymerization reactor section. If the catalyst particles are recovered, they may be either discarded or may be recycled with or without regeneration.

The catalyst may also be supported on structured supports, such as for example, monoliths comprising straight or tortuous channels, reactor walls, and internal tubing. When the catalysts are supported, operation may take place on dispersed particles. When the catalyst is supported on dispersed particles, operations may take place without catalyst recovery i.e., the catalyst is left in the polymeric product. In another embodiment, unsupported catalysts may be dissolved in the fluid reaction medium.

Catalyst systems may be introduced into the reactor by any number of methods. For example, the catalyst may be introduced with the monomer-containing feed or separately. Also, the catalyst(s) may be introduced through one or multiple ports to the reactor. If multiple ports are used for introducing the catalyst, those ports may be placed at essentially the same or at different positions along the length of the reactor. If multiple ports are used for introducing the catalyst, the composition and the amount of catalyst feed through the individual ports may be the same or different. Adjustment in the amounts and types of catalyst through the different ports enables the modulation of polymer properties, such as for example, molecular weight distribution, composition, composition distribution, and crystallinity.

Catalyst Compounds and Mixtures:

The in-line process for blending LCPC and HCPC blend components disclosed herein may utilize any number of catalyst systems (also referred to as catalysts) in any of the reactors of the polymerization reactor section of the process. The in-line process for blending polymers disclosed herein may also utilize the same or different catalysts or catalyst mixtures in the different individual reactors of the reactor bank of the present disclosure. It should be understood that by using different catalyst systems we mean that any part of the catalyst system can vary and any combination is allowed. For example, the invention process may use unsupported catalyst systems in some trains while using supported catalyst systems in other trains. In other embodiments, the catalyst systems in some reactor trains may comprise aluminoxane (for example, MAO) activator, while comprising non-coordinating anion activators in some other trains. In another embodiments, the catalyst systems in some reactor trains may comprise Ziegler-Natta catalysts, while the catalyst systems in other reactor trains of the invention process may comprise metallocenes or nonmetallocene catalysts used for the production of Versify™ family of polymers activated by aluminoxane or non-coordinating anion activators or any combinations thereof. While the number of different catalyst systems deployed in the invention processes can be any number, the use of no more than five different catalysts and more particularly, no more than three different catalysts in any given reactor is advantageous for economic reasons. The deployment of no more than ten catalysts or the deployment of no more than six catalysts in the reactor bank of the polymerization process is advantageous for economic reasons. The one or more catalysts deployed in the reactors may be homogeneously dissolved in the fluid reaction medium or may form a heterogeneous solid phase in the reactor. In one particular embodiment, the catalyst(s) is (are) homogeneously dissolved in the fluid reaction medium. When the catalyst is present as a solid phase in the polymerization reactor, it may be supported or unsupported.

The process disclosed herein may use any combination of homogeneous and heterogeneous catalyst systems simultaneously present in one or more of the individual reactors of the polymerization reactor section, i.e., any reactor of the polymerization section of the present invention may contain one or more homogeneous catalyst systems and one or more heterogeneous catalyst systems simultaneously. The process disclosed herein may also use any combination of homogeneous and heterogeneous catalyst systems deployed in the polymerization reactor section. These combinations comprise scenarios when some or all reactors use a single catalyst and scenarios when some or all reactors use more than one catalyst. The one or more catalysts deployed in the process disclosed herein may be supported on particles, which either can be dispersed in the fluid polymerization medium or may be contained in a stationary catalyst bed. When the supported catalyst particles are dispersed in the fluid reaction medium, they may be left in the polymeric product or may be separated from the product prior to its crystallization from the fluid reactor effluent in a separation step that is downstream of the polymerization reactor section. If the catalyst particles are recovered, they may be either discarded or may be recycled with or without regeneration.

The catalyst may also be supported on structured supports, such as for example, monoliths comprising straight or tortuous channels, reactor walls, and internal tubing. When the catalysts are supported, operation may take place on dispersed particles. When the catalyst is supported on dispersed particles, operations may take place without catalyst recovery; i.e., the catalyst is left in the polymeric product. In another embodiment, unsupported catalysts may be dissolved in the fluid reaction medium.

Catalyst systems may be introduced into the reactor by any number of methods. For example, the catalyst may be introduced with the monomer-containing feed or separately. Also, the catalyst(s) may be introduced through one or multiple ports to the reactor. If multiple ports are used for introducing the catalyst, those ports may be placed at essentially the same or at different positions along the length of the reactor. If multiple ports are used for introducing the catalyst, the composition and the amount of catalyst feed through the individual ports may be the same or different. Adjustment in the amounts and types of catalyst through the different ports enables the modulation of polymer properties, such as for example, molecular weight distribution, composition, composition distribution, and crystallinity.

Catalyst Compounds and Mixtures:

The processes described herein may use any polymerization catalyst capable of polymerizing the monomers disclosed herein if that catalyst is sufficiently active under the polymerization conditions disclosed herein. Thus, Group-3-10 transition metals may form suitable polymerization catalysts. A suitable olefin polymerization catalyst will be able to coordinate to, or otherwise associate with, an alkenyl unsaturation. Illustrative, but not limiting, olefin polymerization catalysts include Ziegler-Natta catalyst compounds, metallocene catalyst compounds, late transition metal catalyst compounds, and other non-metallocene catalyst compounds.

Distinction should made between active catalysts, also referred to as catalyst systems herein, and catalyst precursor compounds. Catalyst systems are active catalysts comprising one or more catalyst precursor compounds, one or more catalyst activators, and optionally, one or more supports. Catalytic activity is often expressed based on the concentration of the catalyst precursor compounds without implying that the active catalyst is the precursor compound alone. It should be understood that the catalyst precursor is inactive without being contacted or being treated with a proper amount of activator. Similarly, the catalyst activator is inactive without combining it with a proper amount of precursor compound. As will become clear from the following description, some activators are very efficient and can be used stoichiometrically, while some others are used in excess, and in sometimes large excess, to achieve high catalytic activity as expressed based on the concentration of the catalyst precursor compounds. Since some of these activators, for example methylaluminoxane (MAO), increase catalytic activity as expressed based on the concentration of the catalyst precursor compounds, they are sometimes referred to as "cocatalysts" in the technical literature of polymerization.

As disclosed herein, Ziegler-Natta catalysts are those referred to as first, second, third, fourth, and fifth generation catalysts in the PROPYLENE HANDBOOK, E. P. Moore, Jr., Ed., Hanser, New York, 1996. Metallocene catalysts in the same reference are described as sixth generation catalysts. One exemplary non-metallocene catalyst compound comprises nonmetallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these nonmetallocene metal-centered, heteroaryl ligand catalyst compounds are typically made fresh by mixing a catalyst precursor compound with one or more activators. Nonmetallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. patent application Ser. No. 11/714,546, each of which is herein incorporated by reference.

Particularly useful metallocene catalyst and non-metallocene catalyst compounds are those disclosed in paragraphs [0081] to [0111] of U.S. Ser. No. 10/667,585 and paragraphs [0173] to [0293] of U.S. Ser. No. 11/177,004, the paragraphs of which are herein incorporated by reference.

The processes disclosed herein can employ mixtures of catalyst compounds to tailor the properties that are desired from the polymer. Mixed catalyst systems prepared from more than one catalyst precursor compounds can be employed in the in-line blending processes to alter or select desired physical or molecular properties. For example, mixed catalyst systems can control the molecular weight distribution of isotactic polypropylene when used with the invention processes or for the invention polymers. In one embodiment of the processes disclosed herein, the polymerization reaction(s) may be conducted with two or more catalyst precursor compounds at the same time or in series. In particular, two different catalyst precursor compounds can be activated with the same or different activators and introduced into the polymerization system at the same or different times. These systems can also, optionally, be used with diene incorporation to facilitate long chain branching using mixed catalyst systems and high levels of vinyl terminated polymers.

As disclosed herein, two or more of the above catalyst precursor compounds can be used together.

Activators and Activation Methods for Catalyst Compounds:

The catalyst precursor compounds described herein are combined with activators for use as active catalysts herein.

An activator is defined as any combination of reagents that increases the rate at which a metal complex polymerizes unsaturated monomers, such as olefins. An activator may also affect the molecular weight, degree of branching, comonomer content, or other properties of the polymer.

A. Aluminoxane and Aluminum Alkyl Activators:

In one form, one or more aluminoxanes are utilized as an activator in the in-line blending processes disclosed herein. Alkyl aluminoxanes, sometimes called aluminoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and European and PCT Patent Publication Nos. EP 0 561 476 A1, EP 0 279 586 B1, EP 0 516 476 A, EP 0 594 218 A1 and WO 94/10180, all of which are herein incorporated by reference in their entirety.

When the activator is an aluminoxane (modified or unmodified), some embodiments select the maximum amount of activator at a 5000-fold molar excess Al/M over the catalyst compound (per metal catalytic site). The minimum activator-to-catalyst-compound is typically a 1:1 molar ratio.

B. Ionizing Activators:

It is contemplated to use an ionizing or stoichiometric activator, neutral or ionic, such as tri(n-butyl)ammonium tetrakis (pentafluorophenyl)boron, a trisperfluorophenyl borone metalloid precursor or a trisperfluoronaphtyl borone metalloid precursor, polyhalogenated heteroborane anions (PCT patent publication no. WO 98/43983), boric acid (U.S. Pat. No. 5,942,459) or combination thereof as an activator herein.

Also contemplated for use herein are neutral or ionic activators alone or in combination with aluminoxane or modified aluminoxane activators.

Examples of neutral stoichiometric activators include tri-substituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, particularly advantageous are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, napthyl or mixtures thereof. Alternately, the three groups are halogenated, advantageously fluorinated, aryl groups. Alternately, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European patent publication Nos. EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

C. Non-Ionizing Activators:

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, aluminoxane, CuCl, Ni(1,5-cyclooctadiene)$_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Suitable non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene.

Other non-ionizing activators include $B(R^{12})_3$, where $R^{12}$ is an arene or a perfluorinated arene. Alternately, non-ionizing activators include $B(C_6H_5)_3$ and $B(C_6F_5)_3$. Another non-ionizing activator is $B(C_6F_5)_3$. Alternately, activators include ionizing and non-ionizing activators based on perfluoroaryl borane and perfluoroaryl borates such as $PhNMe_2H^+B(C_6F_5)_4^-$, $(C_6H_5)_3C^+B(C_6F_5)_4^-$, and $B(C_6F_5)_3$.

Additional activators that may be used with the catalyst compounds disclosed herein include those described in PCT patent publication No. WO 03/064433A1, which is incorporated by reference herein in its entirety.

Additional useful activators for use in the processes disclosed herein include clays that have been treated with acids (such as $H_2SO_4$) and then combined with metal alkyls (such as triethylaluminum) as described in U.S. Pat. No. 6,531,552 and EP Patent No. 1 160 261 A1, which are incorporated by reference herein.

Activators also may be supports and include ion-exchange layered silicate having an acid site of at most −8.2 pKa, the amount of the acid site is equivalent to at least 0.05 mmol/g of 2,6-dimethylpyridine consumed for neutralization. Non-limiting examples include chemically treated smectite group silicates, acid-treated smectite group silicates. Additional examples of the ion-exchange layered silicate include layered silicates having a 1:1 type structure or a 2:1 type structure as described in "Clay Minerals (Nendo Kobutsu Gaku)" written by Haruo Shiramizu (published by Asakura Shoten in 1995).

Examples of an ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizaldite, antigorite or the like. Additional non-limiting examples of the ion-exchange layered silicate include ion-exchange layered silicates comprising the 2:2 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. The clays are contacted with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called as a guest compound. Among these treatments, acid treatment or salt treatment is particularly advantageous. The treated clay may then be contacted with an activator compound, such as TEAL, and the catalyst compound to polymerize olefins.

In another form, the polymerization systems comprise less than 5 wt % polar species, or less than 4 wt %, or less than 3 wt %, or less than 2 wt %, or less than 1 wt %, or less than 1000 ppm, or less than 750 ppm, or less than 500 ppm, or less than 250 ppm, or less than 100 ppm, or less than 50 ppm, or less than 10 ppm. Polar species include oxygen containing compounds (except for alumoxanes) such as alcohols, oxygen, ketones, aldehydes, acids, esters and ethers.

In yet another form, the polymerization systems comprise less than 5 wt % trimethylaluminum and/or triethylaluminum, or less than 4 wt %, or less than 3 wt %, or less than 2 wt %, or less than 1 wt %, or less than 1000 ppm, or less than 750 ppm, or less than 500 ppm, or less than 250 ppm, or less than 100 ppm, or less than 50 ppm, or less than 10 ppm.

In still yet another form, the polymerization systems comprise methylaluminoxane and less than 5 wt % trimethylaluminum and or triethylaluminum, or less than 4 wt %, or less than 3 wt %, or less than 2 wt %, or less than 1 wt %, or less than 1000 ppm, or less than 750 ppm, or less than 500 ppm, or less than 250 ppm, or less than 100 ppm, or less than 50 ppm, or less than 10 ppm.

The in-line blending processes disclosed herein may use finely divided, supported catalysts to prepare propylene/1-hexene copolymers with greater than 1.0 mole % 1-hexene. In addition to finely divided supports, in-line blending processes disclosed herein may use fumed silica supports in which the support particle diameter may range from 200 angstroms to 1500 angstroms, small enough to form a colloid with reaction media.

Catalyst Supports:

In another form, the catalyst compositions of fluid phase in-line blending processes disclosed herein may include a support material or carrier. For example, the one or more catalyst components and/or one or more activators may be deposited on, contacted with, vaporized with, bonded to, or incorporated within, adsorbed or absorbed in, or on, one or more supports or carriers.

The support material may be any of the conventional support materials. In one form, the supported material may be a porous support material, for example, talc, inorganic oxides and inorganic chlorides. Other support materials may include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Useful support materials are inorganic oxides that include those Group 2, 3, 4, 5, 13 or 14 metal oxides. In one form, the supports include silica, which may or may not be dehydrated, fumed silica, alumina (PCT patent publication No. WO 99/60033), silica-alumina and mixtures thereof. Other useful supports include magnesia, titania, zirconia, magnesium chloride (U.S. Pat. No. 5,965,477), montmorillonite (European Patent No. EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in European Patent No. EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

The support material, for example an inorganic oxide, has a surface area in the range of from about 10 to about 700 m$^2$/g, pore volume in the range of from about 0 to about 4.0 cc/g and average particle size in the range of from about 0.02 to about 50 μm. Alternatively, the surface area of the support material is in the range of from about 50 to about 500 m$^2$/g, pore volume of from about 0 to about 3.5 cc/g and average particle size of from about 0.02 to about 20 μm. In another form, the surface area of the support material is in the range is from about 100 to about 400 m$^2$/g, pore volume from about 0 to about 3.0 cc/g and average particle size is from about 0.02 to about 10 μm.

Non-porous supports may also be used as supports in the processes described herein. For example, in a one embodiment the nonporous, fumed silica supports described in U.S. Pat. No. 6,590,055 may be used and is incorporated by reference herein.

Polymerization Scavangers

Compounds that destroy impurities are referred to as scavengers by one skilled in the art of polymerization. Impurities may harm catalysts by reducing their activity. Scavengers may be optionally fed to the reactor(s) of the in-line blending process disclosed herein. Catalytic activity may be defined many different ways. For example, catalytic activity can be expressed as turnover frequency, i.e., the number of moles of monomers converted to the product in a unit time by one mole of catalyst precursor employed in preparing the active catalyst system. For a given reactor operating at the same residence time, catalytic activity may also be measured in terms of catalyst productivity, customarily expressed as the weight of polymer made by a unit weight of catalyst precursor with or without the weight of the activator.

The scavengers for use in the processes disclosed herein may be different chemical compound(s) from the catalyst activator. Non-limiting exemplary scavengers include diethyl zinc, and alkyl aluminum compounds, such as trimethyl aluminum, triethyl aluminum, tri-isobutyl aluminum, and trioctyl aluminum. The scavenger may also be the same as the catalyst activator and is generally applied in excess of what is needed to fully activate the catalyst. These scavengers include, but are not limited to, aluminoxanes, such as methyl aluminoxane. The scavenger may also be introduced to the reactor with the monomer feed or with any other feed stream. In one particular embodiment, the scavenger is introduced with the monomer-containing feed. The scavenger may be homogeneously dissolved in the polymerization reaction medium or may form a separate solid phase. In one particular embodiment, scavengers are dissolved in the polymerization medium.

Polymerization Solvents

One or more solvents may be present in the polymerization system. Any hydrocarbon, fluorocarbon, or fluorohydrocarbon inert solvent or their mixtures may be used at concentrations, advanatageously not more than 80 wt % in the feeds to any individual polymerization reactor of the in-line blending process disclosed herein. The concentration of the inert solvent in the reactor feed and thus in the polymerization system in certain embodiments utilizing bulk polymerization processes is not more than 40 wt %, or not more than 30 wt %, or not more than 20 wt %, alternatively not more than 10 wt %, alternatively not more than 5 wt %, and alternatively not more than 1 wt %.

Other solvents may also include $C_4$ to $C_{150}$ isoparaffins, or $C_4$ to $C_{100}$ isoparaffins, or $C_4$ to $C_{25}$ isoparaffins, or $C_4$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and advantageously wherein the total number of carbon atoms per molecule is in the range between 6 to 50, and between 10 and 24 in another embodiment, and from 10 to 15 in yet another embodiment. Various isomers of each carbon number will typically be present. The isoparaffins may also include cycloparaffins with branched side chains, generally as a minor component of the isoparaffin. The density (ASTM 4052, 15.6/15.6° C.) of these isoparaffins may range from 0.70 to 0.83 g/mL; the pour point is −40° C. or less, alternatively −50° C. or less, the viscosity (ASTM 445, 25° C.) is from 0.5 to 20 cSt at 25° C.; and the average molecular weights in the range of 100 to 300 g/mol. Some suitable isoparaffins are commercially available under the tradename ISOPAR (ExxonMobil Chemical Company, Houston Tex.), and are described in, for example in U.S. Pat. Nos. 6,197,285, 3,818,105 and 3,439,088, and sold commercially as ISOPAR series of isoparaffins. Other suitable isoparaffins are also commercial available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment of the in-line blending process disclosed herein, solvents may include $C_4$ to $C_{25}$ n-paraffins, or $C_4$ to $C_{20}$ n-paraffins, or $C_4$ to $C_{15}$ n-paraffins having less than 0.1%, or less than 0.01% aromatics. Some suitable n-paraffins are commercially available under the tradename NORPAR (ExxonMobil Chemical Company, Houston Tex.), and are sold commercially as NORPAR series of n-paraffins. In another embodiment, solvents may include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, or $C_5$ to $C_{18}$, or $C_5$ to $C_{12}$. They contain very low levels of aromatic hydrocarbons, or less than 0.1, or less than 0.01 aromatics. Suitable dearomatized aliphatic hydrocarbons are commercially available under the tradename EXXSOL (ExxonMobil Chemical Company, Houston Tex.), and are sold commercially as EXXSOL series of dearomaticized aliphatic hydrocarbons.

In another embodiment of the in-line blending process disclosed herein, the inert solvent comprises up to 20 wt % of oligomers of $C_6$ to $C_{14}$ olefins and/or oligomers of linear olefins having 6 to 14 carbon atoms, or 8 to 12 carbon atoms, or 10 carbon atoms having a Kinematic viscosity of 10 or more (as measured by ASTM D 445); and having a viscosity index ("VI"), as determined by ASTM D-2270 of 100 or more.

In another embodiment of the fluid phase in-line process for blending disclosed herein, the inert solvent comprises up to 20 wt % of oligomers of $C_{20}$ to $C_{1500}$ paraffins, alternately $C_{40}$ to $C_{1000}$ paraffins, alternately $C_{50}$ to $C_{750}$ paraffins, alternately $C_{50}$ to $C_{500}$ paraffins. In another embodiment of the fluid phase in-line process for blending disclosed herein, the solvent comprises up to 20 wt % of oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the tradenames Synfluid™ available from ChevronPhillips Chemical Co. in Pasedena Tex., Durasyn™ available from BP Amoco Chemicals in London, England, Nexbase™ available from Fortum Oil and Gas in Finland, Synton™ available from Chemtura Corporation in Middlebury Conn., USA, EMERY™ available from Cognis Corporation in Ohio, USA.

With regard to the polymerization media, suitable solvents are those that are soluble in and inert to the monomer and any other polymerization components at the polymerization temperatures and pressures.

Polymerization Reactor Configuration

The polymerization processes of the fluid phase in-line process for pellet-stable polyolefin blending disclosed herein may be carried out in two or more reactors making the one or more LCPC and one or more HCPC blend components for downstream blending. In one embodiment, an LCPC and an HCPC are made by using two reactor trains in a parallel configuration. In another form, one or more LCPCs and one or more HCPC are made by using three, or four, or five, or six reactor trains in a parallel configuration.

As previously described, the in-line blending LCPC and HCPC blend components are produced in a reactor bank composed of at least two parallel reactor trains. A reactor train of the parallel reactor bank may include one or more reactors that may be configured in series configuration. The number of parallel reactors trains or branches in a parallel bank may be any number, but for practical reasons, is generally limited to less than ten, alternatively not more than six parallel reactor trains, alternatively not more than five or not more than four reactor trains, alternatively not more than three parallel reactor trains, and alternatively not more than two parallel reactor trains. The number of series cascade reactors constituting a given reactor train or branch of a parallel configuration may be any number, but for practical reasons, is generally limited to not more than ten reactors in series, alternatively not more than six reactors in series, alternatively not more than three reactors in series, and alternatively not more than two reactors in series.

In one embodiment, the polymer-containing effluents from two or more reactor trains configured in a parallel configuration are combined yielding a polymer blend comprising the polymeric products of the individual reactors without first recovering the polymeric products of the individual reactors in solid forms. The two or more reactor trains constituting the parallel configuration generally include a single reactor, or alternatively, two or more reactors in series.

The reactors of the polymerization system for the fluid phase in-line process for pellet-stable polyolefin blending disclosed herein may be stirred or unstirred. When a reactor train comprises two or more reactors, the members of the reactor train are not necessarily constructed the same way, for example, the individual members of a reactor train may be stirred, unstirred, or a combination thereof. The individual reactors may also be of equal or different size. The same is true for the reactors in the entire reactor bank. The optimal reactor configuration and sizes may be determined by standard engineering techniques known to those skilled in the art of chemical engineering.

Any type of polymerization reactor may be deployed in the fluid phase in-line process for blending disclosed herein. The optimal reactor design may be determined by standard engineering techniques known to those skilled in the art of chemical engineering. Non-limiting exemplary reactor designs include stirred tank with or without an external loop, tubular reactor, and loop reactor. The reactors may operate adiabatically or may be cooled. The cooling may be achieved within the reactor, or through the reactor jacket, or dedicated heat exchange loops may be applied.

Polymerization Reactors

The fluid phase in-line process for pellet-stable polyolefin blending disclosed herein relates to processes to polymerize one or more LCPC and one or more HCPC comprising contacting propylene, ethylene and/or one or more $C_4$ or higher olefins with suitable catalyst compounds and activators in a fluid reaction medium comprising one or two fluid phases in each parallel reactor. The polymerization system for at least one parallel reactor train producing either the LCPC or HCPC is in its supercritical state. Catalyst compound and activator may be delivered as a solution or slurry, either separately to the reactor, mixed in-line just prior to the reactor, or mixed and pumped as an activated solution or slurry to the reactor. For a given reactor train of the parallel configuration, polymerizations may be carried out in either single reactor operation, in which monomer, comonomers, catalyst(s)/activator(s), scavenger(s), and optional solvent(s) are added continuously to a single reactor or in series reactor operation, in which the above components are added to two or more reactors connected in series. The catalyst components may be added to the first reactor in the series. The catalyst component may also be added to each reactor in the series reactor train. The fresh catalyst feed if added to more than one reactor in the series train may be the same or different to each reactor and their feed rates may be the same or different.

Polymerization processes of the fluid phase in-line process for blending disclosed herein also comprehend high-pressure reactors where the reactor is substantially unreactive with the polymerization reaction components and is able to withstand the high pressures and temperatures that occur during the polymerization reaction. Withstanding these high pressures and temperatures may allow the reactor to maintain the fluid reaction medium in its supercritical condition. Suitable reaction vessel designs include those necessary to maintain supercritical or other high-pressure ethylene polymerization reactions. Non-limiting exemplary reactors include autoclave, pump-around loop or autoclave, tubular, and autoclave/tubular reactors.

The polymerization processes of the fluid phase in-line process for blending disclosed herein may operate efficiently in autoclave (also referred to as stirred tank) and tubular reactors. Autoclave reactors may be operated in either a batch or continuous mode, although the continuous mode is advantageous. Tubular reactors always operate in continuous mode. Typically, autoclave reactors have length-to-diameter ratios of 1:1 to 20:1 and are fitted with a high-speed (up to 2000 RPM) multiblade stirrer and baffles arranged for optimal mixing. Commercial autoclave pressures are typically greater than 5 MPa with a maximum of typically less than 260 MPa. The maximum pressure of commercial autoclaves, however, may become higher with advances in mechanical and material science technologies.

When the autoclave has a low length-to-diameter ratio (such as less than four), the feed streams may be injected at one position along the length of the reactor. Reactors with large diameters may have multiple injection ports at nearly the same or different positions along the length of the reactor. When they are positioned at the same length of the reactor, the injection ports are radially distributed to allow for faster intermixing of the feed components with the reactor content. In the case of stirred tank reactors, the separate introduction of the catalyst and monomer(s) may be advantageous in preventing the possible formation of hot spots in the unstirred feed zone between the mixing point and the stirred zone of the reactor. Injections at two or more positions along the length of the reactor is also possible and may be advantageous. In one exemplary embodiment, in reactors where the length-to-diameter ratio is from 4 to 20, the reactor may contain up to six different injection positions along the reactor length with multiple ports at some or each of the lengths.

Additionally, in the larger autoclaves, one or more lateral mixing devices may support the high-speed stirrer. These mixing devices can also divide the autoclave into two or more zones. Mixing blades on the stirrer may differ from zone to zone to allow for a different degree of plug flow and back mixing, largely independently, in the separate zones. Two or more autoclaves with one or more zones may connect in a series reactor cascade to increase residence time or to tailor polymer structure in a reactor train producing a polymer blending component. As previously described, a series reactor cascade or configuration consists of two or more reactors connected in series, in which the effluent of at least one upstream reactor is fed to the next reactor downstream in the cascade. Besides the effluent of the upstream reactor(s), the feed of any reactor in the series reactor cascade of a reactor train can be augmented with any combination of additional monomer, catalyst, or solvent fresh or recycled feed streams. Therefore, it should be understood that the iPP or EP copolymer blending component leaving a reactor train of the process disclosed herein may itself be a blend of the same polymer with increased molecular weight and/or compositional dispersion.

Tubular reactors may also be used in the fluid phase in-line process for blending disclosed herein and more particularly tubular reactors capable of operating up to about 350 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm. Typically, tubular reactors have length-to-diameter ratios of 10:1 to 50,000:1 and include up to 10 different injection positions along its length.

Reactor trains that pair autoclaves with tubular reactors are also contemplated within the scope of the fluid phase in-line process for blending disclosed herein. In this reactor system, the autoclave typically precedes the tubular reactor or the two types of reactors form separate trains of a parallel reactor configuration. Such reactor systems may have injection of additional catalyst and/or feed components at several points in the autoclave, and more particularly along the tube length. In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst feed selection allows polymer design tailoring within a given reactor or reactor train and/or maintaining the desired productivity profile along the reactor length.

At the reactor outlet valve, the pressure drops to begin the separation of polymer and unreacted monomer, co-monomers, solvents and inerts, such as for example ethane, propane, hexane, and toluene. More particularly, at the reactor outlet valve, the pressure drops to levels below that which critical phase separation allowing for a polymer-rich phase and a polymer-lean phase in the downstream separation vessel. Typically, conditions remain above the polymer product's crystallization temperature. The autoclave or tubular reactor effluent may be depressurized on entering the downstream high-pressure separator (HPS or also referred to as a separator, separator vessel, separation vessel, separator/blender vessel, or separation/blending vessel).

As will be subsequently described in detail, the temperature in the separation vessel is maintained above the solid-fluid phase separation temperature, but the pressure may be below the critical point. The pressure need only be high enough such that the monomer may condense upon contacting standard cooling water. The liquid recycle stream may then be recycled to the reactor with a liquid pumping system instead of the hyper-compressors required for polyethylene units. The relatively low pressure in separator reduces the monomer concentration in the liquid polymer phase which results in a lower polymerization rate. The polymerization rate may be low enough to operate the system without adding a catalyst poison or "killer". If a catalyst killer is required (e.g., to prevent reactions in the high pressure recycle) then provision must be made to remove any potential catalyst poisons from the recycled polymer rich monomer stream for example, by the use of fixed bed adsorbents or by scavenging with an aluminum alkyl.

In an alternative embodiment, the HPS may be operated over the critical pressure of the monomer or monomer blend but within the dense fluid-fluid two phase region, which may be advantageous if the polymer is to be produced with a revamped high-pressure polyethylene (HPPE) plant. The recycled HPS overhead is cooled and dewaxed before being returned to the suction of the secondary compressor, which is typical of HPPE plant operation. The polymer from this intermediate or high-pressure vessel then passes through another pressure reduction step to a low pressure separator. The temperature of this vessel is maintained above the polymer melting point so that the polymer from this vessel can be fed as a liquid directly to an extruder or static mixer. The pressure in this vessel is kept low by using a compressor to recover the unreacted monomers, etc. to the condenser and pumping system referenced above.

In addition to autoclave reactors, tubular reactors, or a combination of these reactors, loop-type reactors may be utilized in the fluid phase in-line process for blending disclosed herein. In this reactor type, monomer enters and polymer exits continuously at different points along the loop, while an in-line pump continuously circulates the contents (reaction liquid). The feed/product takeoff rates control the total average residence time. A cooling jacket removes reaction heat from the loop. Typically feed inlet temperatures are near to or below ambient temperatures to provide cooling to the exothermic reaction in the reactor operating above the crystallization temperature of the polymer product. The loop reactor may have a diameter of 41 to 61 cm and a length of 100 to 200 meters and may operate at pressures of 25 to 30 MPa. In addition, an in-line pump may continuously circulate the polymerization system through the loop reactor.

The polymerization processes of the fluid phase in-line process for blending one or more LCPC and one or more HCPC components disclosed herein may have residence times in the reactors as short as 0.5 seconds and as long as several hours, alternatively from 1 sec to 120 min, alternatively from 1 second to 60 minutes, alternatively from 5 seconds to 30 minutes, alternatively from 30 seconds to 30 minutes, alternatively from 1 minute to 60 minutes, and alternatively from 1 minute to 30 minutes. More particularly, the residence time may be selected from 10, or 30, or 45, or 50, seconds, or 1, or 5, or 10, or 15, or 20, or 25, or 30 or 60 or 120 minutes. Maximum residence times may be selected from 1, or 5, or 10, or 15, or 30, or 45, or 60, or 120 minutes.

The monomer-to-polymer conversion rate (also referred to as the conversion rate) is calculated by dividing the total quantity of polymer that is collected during the reaction time by the amount of monomer added to the reaction. Lower conversions may be advantageous to limit viscosity although increase the cost of monomer recycle. The optimum total monomer conversion thus will depend on reactor design, product slate, process configuration, etc., and can be determined by standard engineering techniques. Total monomer conversion during a single pass through any individual reactor of the fluid phase in-line process for blending disclosed herein may be up to 90%, or below 80%, or below 60% or 3 to 80%, or 5 to 80%, or 10 to 80%, or 15 to 80%, or 20 to 80%, or 25 to 60%, or 3 to 60%, or 5 to 60%, or 10 to 60%, or 15 to 60%, or 20 to 60%, or 10 to 50%, or 5 to 40%, or 10 to 40%, or 40 to 50%, or 15 to 40%, or 20 to 40%, or 30 to 40% or greater than 5%, or greater than 10%. In one embodiment, when producing isotactic polypropylene and long-chain branching (LCB) of the polypropylene is desired ($g'\leq 0.97$ based on GPC-3D and using an isotactic polypropylene standard), single pass conversions may be above 30% and alternatively single-pass conversions may be above 40%. In another embodiment, when isotactic polypropylene essentially free of LCB is desired ($0.97<g'<1.05$), single-pass conversions may be not higher than 30% and alternatively single-pass-conversions may be not higher than 25%. To limit the cost of monomer separation and recycling, single-pass conversions may be above 3%, or above 5%, or above 10%. It should be understood that the above exemplary conversion values reflect total monomer conversion, i.e., the conversion obtained by dividing the combined conversion rate of all monomers by the total monomer feed rate. When monomer blends are used, the conversion of the more reactive monomer component(s) will always be higher than that of the less reactive monomer(s). Therefore, the conversion of the more reactive monomer component(s) can be substantially higher than the total conversion values given above, and can be essentially complete, approaching 100%.

Product Seperation and Downstream Processing

The LCPC and HCPC reactor effluents of the processes disclosed herein are depressurized to a pressure significantly below the cloud point pressure. This allows separation of a polymer-rich phase for further purification and a monomer-rich phase for optional separation and recycle compression back to the reactor(s). The reactor effluents may be optionally heated before pressure let down to avoid the separation of a solid polymer phase, which causes fouling of the separators and associated reduced-pressure lines. The separation of the polymer-rich phase and the monomer-rich phase in the processes disclosed herein is carried out in a vessel known as a high-pressure separator (also referred to as an HPS, separator, separator vessel, or separation vessel). The high-pressure separator located after the mixing point of the polymer-containing product streams of all reactor trains of the parallel reactor bank is also referred to as, separator-blender, separator-blender vessel, or separation-blending vessel recognizing its dual function of blending the said polymer-containing product streams while also separating a monomer-rich phase from a polymer-rich phase, the latter of which comprises the polymer blend of the in-line blending processes disclosed herein.

In certain embodiments, single-stream high-pressure separators employed to partially recover the monomer(s) and optional solvent(s) from the effluent of a single reactor train before sending the polymer-enriched stream to the downstream separator-blender. In such embodiments, the separator-blender blends one or more polymer-enriched stream with one or more unreduced reactor train effluent to yield a monomer-rich phase and a polymer-rich phase, the latter of which comprises the polymer blend of the in-line blending process disclosed herein. In another embodiment, the single-stream high-pressure separator placed upstream of the separator-blender also functions as a buffer vessel (separator-buffer vessel) by allowing the fluid level of the polymer-enriched phase vary in the separator-buffer vessel. Such buffering enables a more precise control of the blend ratios by compensating for the momentary fluctuations in the production rates in the individual reactor trains of the in-line blending process disclosed herein.

The polymer rich phase of the separator-blender may then be transferred to one or more low-pressure separators (LPS also referred to as a low-pressure separation vessel) running at just above atmospheric pressure for a simple flash of light components, reactants and oligomers thereof, for producing a low volatile-containing polymer melt entering the finishing extruder or optional static mixer. The one or more low-pressure separators are distinguished from the one or more high-pressure separators in generally operating at lower pressures relative to the high-pressure separators. The one or more low-pressure separators also are located downstream of the one or more high-pressure separators including the separator-blender. Moreover, the one or more low-pressure separators may function to separate light from heavy components comprising the polymer blend of the in-line blending process disclosed herein, whereas the one or more high-pressure separators may function to separate light from heavy components upstream of the low-pressure separator (i.e. monomer-rich phase from polymer-rich phase) and may function to blend the polymer-rich phases from two or more parallel reactor trains or may function as buffers. As previously stated, a high-pressure separator may be alternatively referred to herein as an HPS, separator, separator vessel, separation vessel, separator-blender vessel, or separation-blending vessel, or separator-blender. The use of the term "pressure" in conjunction with low-pressure separator and high-pressure separator is not meant to identify the absolute pressure levels at which these separators operate at, but is merely intended to given the relative difference in pressure at which these separators operate. Generally, separators located downstream in the in-line blending processes disclosed herein operate at lower pressure relative to separators located upstream.

In one embodiment of the fluid phase in-line process for blending LCPC and HCPC blend components disclosed herein, polymerization is conducted in two or more reactors of a type described herein above under agitation and above the cloud point for the polymerization system. Then, the polymer-monomer mixtures are transferred into a high-pressure separation-blending vessel, where the pressure is allowed to drop below the cloud point. This advantageously results in the denser, polymer-rich phase separating from the lighter monomer-rich phase. As may be appreciated by those skilled in the art, it may optionally be necessary to increase the temperature before or in the high-pressure separation vessel to prevent the formation of a solid polymer phase as the polymer becomes more concentrated. The monomer-rich phase is then separated and recycled to the reactors while the polymer-rich phase is fed to a coupled devolatilizer—such as a LIST dryer (DTB) or devolatizing extruder.

The recycle runs through a separator, where the pressure depends on the pressure-temperature relationship existing within the reactor. For example, supercritical propylene polymerization can be carried out under agitation in the single-phase region in the reactor at 40 to 200 MPa and 95 to 180° C. The product mixture can be discharged into a separator vessel, where the pressure is dropped to a level of 25 MPa or lower, in which case, the mixture is below its cloud point, while the monomer has not yet flashed off. Under such conditions, it would be expected from Radosz et al., Ind. Eng.

Chem. Res. 1997, 36, 5520-5525 and Loos et al., Fluid Phase Equil. 158-160, 1999, 835-846 that the monomer-rich phase would comprise less than about 0.1 wt % of low molecular weight polymer and have a density of approximately 0.3-0.6 g/mL. The polymer-rich phase would be expected to have a density of approximately 0.5-0.8 g/mL.

Assuming that the pressure is dropped rapidly enough, for example, greater than or equal to about 6 MPa/sec, the phases will separate rapidly, permitting the recycle of the monomer-rich phase as a liquid, without the issue of having the monomer-rich phase return to the gas phase. As may be appreciated by those skilled in the art, this eliminates the need for the energy-intensive compression and condensation steps.

The polymer-rich phase is sent directly to a coupled devolatilizer. Suitable devolatilizers may be obtained, for example, from LIST USA Inc., of Charlotte, N.C. The devolatilization is a separation process to separate remaining volatiles from the final polymer, eliminating the need for steam stripping. Working under low vacuum, the polymer solution flashes into the devolatilizer, exits the unit and is then transferred on for further processing, such as pelletization.

Any low or very low molecular weight polymer present in the monomer-rich phase to be recycled may optionally be removed through "knock-out" pots, standard hardware in reactors systems, or left in the return stream depending upon product requirements and the steady-state concentration of the low molecular weight polymer fraction in the product.

In solution reactor processes, present practices employed by those skilled in the art typically effect separation by flashing monomer and solvent or accessing the high-temperature cloud point.

In another form, polymerization is conducted at conditions below the cloud point, with the polymer-monomer mixture transported to a gravimetric separation vessel, where the pressure could be further lowered if desired to enhance phase separation of the polymer-rich and monomer-rich phases. In either of the forms herein described, the monomer, for example, propylene, is recycled while staying in a relatively high density, liquid-like (supercritical or bulk liquid) state. Once again, one or more knock-out pots may be employed to aid in the removal of low molecular weight polymer from the recycle stream.

Figure 8:
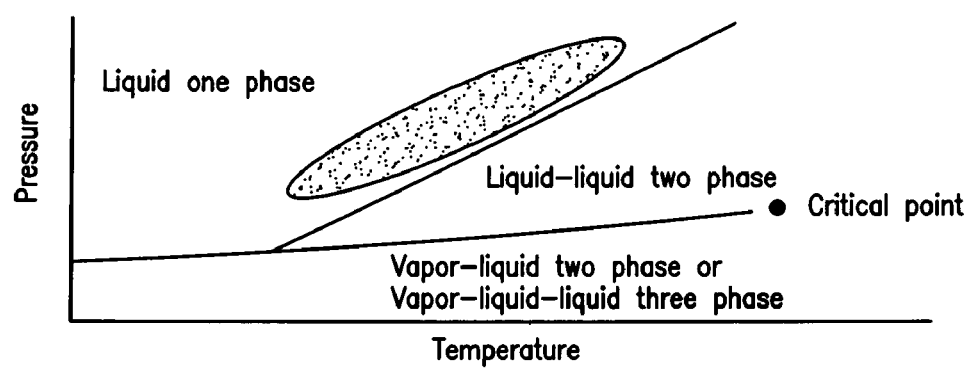
FIG. 8 presents an operating regime in accordance with the process disclosed herein for a reactor operating in a single liquid phase.

As may be appreciated, there are possible and optimal operating regimes for reactors and for the gravity (lower critical solution temperature (LCST)) separator. Referring now to FIG. 8, for reactors operating in a single liquid phase regime, a possible region for operation is just above the LCST and vapor pressure (VP) curves. The optimal region (shown within the shaded oval) for operation occurs at temperatures just above the lower critical end point (LCEP) and at pressures slightly above the LCST curve.

Figure 9:
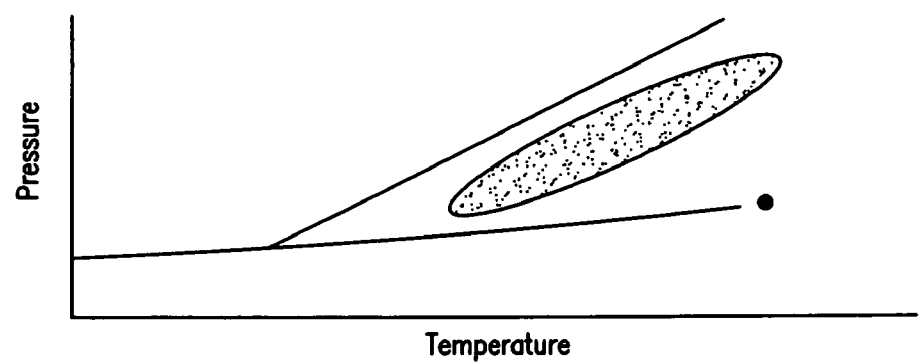
FIG. 9 presents an operating regime in accordance with the process disclosed herein for a reactor operating in a liquid-liquid phase.

Referring now to FIG. 9, for reactors operating within a two-phase fluid-fluid regime, the possible region for operation occurs basically anywhere below the LCST curve. The optimal region (again, shown within the shaded oval) occurs just below the LCST and above the VP curve, although, as may be appreciated, many factors could have a bearing on what actually is optimal, such as the final properties of the desired product. As recognized by those skilled in the art, the two-phase liquid-liquid regime is the economically advantageous method if polypropylene is to be produced with a revamped HPPE plant.

Figure 10:
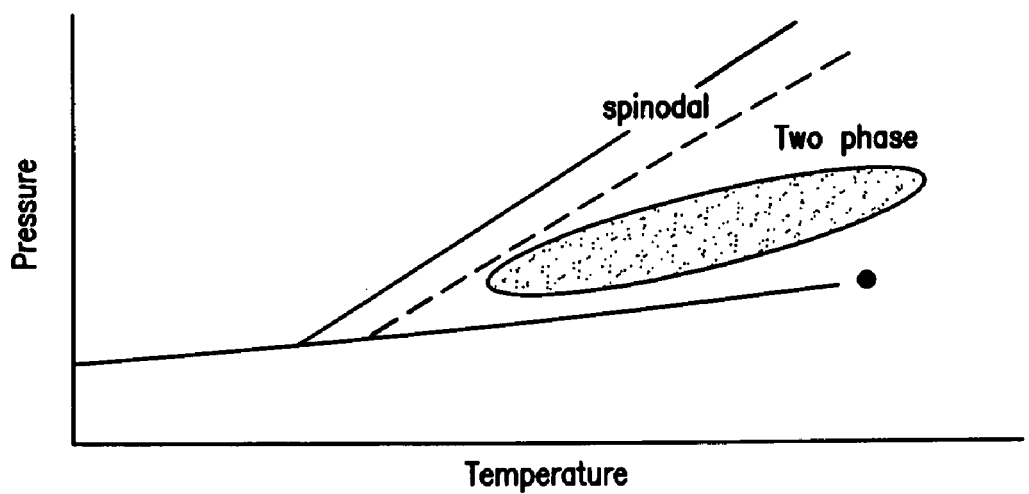
FIG. 10 presents an operating regime in accordance with the process disclosed herein for a gravity separator.

Referring now to FIG. 10, for the case where polymerization is conducted at conditions below the cloud point and the polymer-monomer mixture transported to a gravimetric LCST separator, the possible region of operation is anywhere below the LCST curve and above the VP curve. The optimal region (again, shown within the shaded oval) occurs within that portion that is below the spinodal, but not too low in pressure, as shown. Operating in this regime assures that the energy use is optimized. It is also desirable to avoid operation in the region between the LCST and spinodal curves in order to obtain good gravity settling performance. Moreover, it is desirable that the separation is effected at sufficiently high temperatures, so that crystallization does not occur in the polymer-rich phase. This may require that the temperature of the mixture in the separator be higher than the temperature in the reactor(s).

Advantageously, the liquid monomer-rich recycle stream can be recycled to the reactor using a liquid pumping system instead of a hyper-compressor, required for conventional polyethylene units.

Polymerization Catalyst Killing

The use of the processes disclosed herein and the relatively low pressure in the separator vessel greatly reduces the monomer concentration in the liquid polymer-rich phase, which, in turn, results in a much lower polymerization rate. This polymerization rate may be low enough to operate this system without adding a catalyst poison or "killer". If no killing compounds are added then the killer removal step may be eliminated.

If a catalyst killer is required, then provision must be made to remove any potential catalyst poisons from the recycled monomer-rich stream (e.g. by the use of fixed bed adsorbents or by scavenging with an aluminum alkyl). The catalyst activity may be killed by addition of a polar species. Non-limiting exemplary catalyst killing agents include water, alcohols (such as methanol and ethanol), sodium/calcium stearate, CO, and combinations thereof. The choice and quantity of killing agent will depend on the requirements for clean up of the recycle propylene and comonomers as well as the product properties, if the killing agent has low volatility. The catalyst killing agent may be introduced into the reactor effluent stream after the pressure letdown valve, but before the HPS. The choice and quantity of killing agent may depend on the requirements for clean up of the recycle propylene and comonomers as well as the product properties, if the killing agent has low volatility.

Pellet Formation

Pellets of the pellet-stable polyolefin blends described herein may be produced by any suitable technique for producing polymer pellets. In one form of the in-line fluid phase blending process disclosed herein, the LCPC-HCPC blend is directed from a low pressure separator to an extruder, and advantageously, a twin screw extruder. In the twin screw extruder, one or more additives described above may be added to the blend. The extruder forces the melt through a die multihole die with or without the use of a gear pump to form a multiplicity of LCPC-HCPC polyolefin strands. A pelletizer utilitizing rotating knives is then used to cut the LCPC-HCPC polyolefin strands into pellets. Chilled water (temperature of 0° C. to 10° C.) is supplied to the pelletizer to instantly chill the molten polyolefin strands as they exit the die face. The water may contain a suitable anti-coagulant such as calcium stearate, to prevent the pellets from adhering as they pass through a pipe to a spin drier while being quench-cooled. In one form, the polyolefin pellets are cooled in the water maintained at a temperature of 0° C. to 10° C. from 2 minutes to 60 minutes to promote sufficient crystallization of the LCPC-HCPC polyolefin blend of the pellets to provide Shore A hardness values sufficient to reduce or prevent agglomeration in subsequent handling and storage as discussed above. In a second form, the pellets are cooled in the water maintained at a temperature of 0° C. to 10° C. from 2 minutes to 30 minutes to promote sufficient crystallization of the LCPC-HCPC polyolefin blend of the pellets to provide Shore A hardness values sufficient to reduce or prevent agglomeration in subsequent handling and storage as discussed above. In yet a third form, the pellets are cooled in the water maintained at a temperature of 0° C. to 10° C. from 2 minutes to 10 minutes to promote sufficient crystallization of the LCPC-HCPC polyolefin blend of the pellets to provide Shore A hardness values sufficient to reduce or prevent agglomeration in subsequent handling and storage as discussed above.

The chilling accelerates the hardening so that Shore A hardness values of at least 50, or 60, or 65 may be achieved in the above three forms, in the time before the pellets are collected for bagging or bailing in the continuous process. The surface water may removed from the pellets by the use of a spin drier. The dried pellets may then be conveyed to a vibrating fluidized bed drier where warm, dry air dries the pellets and removes surface water. The pellets may be then conveyed, if necessary, to a duster to be dusted with an anti-agglomeration agent, as described above. Finally the finished pellets are conveyed to a packaging station for bagging or to a silo for storage.

The size of the polyolefin pellets disclosed herein may have a first dimension that ranges from 2 mm to 10 mm and a second dimension that ranges from 2 mm to 10 mm. In one form, the pellets may be spherical with diameters ranging from 2 mm to 10 mm. In another form, the pellets may be disk-shaped with diameters ranging from 2 mm to 10 mm and thickness ranging from about 2 mm to about 10 mm. In still another form, the pellets may be cylindrical with diameters from about 2 mm to about 10 mm with lengths of about 2 mm to about 10 mm. In other forms, the first and second dimensions of the polyolefin pellets may range from about 2 mm to about 8 mm. In still other forms, the first and second dimensions of the polymer pellets may range from about 2 mm to about 5 mm. The pellet weight for the LCPC-HCPC blends described herein may range from 1.0 to 3.0 g/50 pellets, or alternatively from 1.2 to 1.8 g/50 pellets.

Examples

Ethylene-Propylene Copolymerization

Propylene Grade 2.5 (Airgas, Piscataway, N.J.) was obtained in #100 low pressure cylinders equipped with dip leg for liquid delivery to the monomer blending station. Ethylene Grade 4.5 (Airgas, Piscataway, N.J.) was obtained in high-pressure cylinders.

Custom blends containing ethylene and propylene were prepared in house. The monomer blend was fed to the reactor from the monomer blend vessel.

Gas samples were analyzed using a HP6890N (Agilent Technologies) gas chromatograph (GC) equipped with flame ionization detector (FID), gas sampling valve, and pressure control compensation. The analysis was performed with a 30 m 0.53 mm ID HP AL/M megabore capillary column (film thickness 15 micron). The carrier gas was helium. The temperature program started at 70° C., held initially for 3 min, ramped to 150° C. at 20° C./min. Total analysis time was 7 minutes. The data were acquired and processed by ChromPerfect software (Justice Laboratory Software). Calibration standards containing ethylene, propane and propylene were purchased from DCG Partnership, Pearland, Tex. The FID response factors were based on these calibration standards and were also checked against the results published by J. T. Scanlon, D. E. Willis in *J. Chrom. Sci.* 23 (1985) 333 and by W. A. Dietz in *J. Gas Chrom.* (1967) 68. For our mass balance calculations, propane, a trace impurity in the propylene feed (Air Gas), served as internal standard.

The monomer blend feed was purified using two separate beds in series: activated copper (reduced in flowing $H_2$ at 225° C. and 1 bar) for $O_2$ removal, and molecular sieve (5 Å, activated in flowing $N_2$ at 270° C.) for water removal. The flow rate and density of the feed were measured by a Coriolis mass flow meter (Model PROline promass 80, Endress and Hauser) that was located downstream of the purification traps on the low-pressure side of the feed pump. The purified monomer blend was fed by a diaphragm pump (Model MhS 600/11, ProMinent Orlita, Germany).

For effluent gas sampling, a laboratory gas pump (Senior Metal Bellows, Model MB-21) was used to continually remove a gas stream from the product collection vessel. This stream of reactor effluent was sent to the GC gas sampling port and through the GC sampling loop. The GC was programmed to acquire a new sample every 10 minutes during the run. The off-line feed and on-line effluent analysis results provided the compositional input for the mass balance calculations. The total feed mass flow was generated by summing the monomer feed flow rate measured by the mass-flow meter and the catalyst flow rate measured by the weight drop in the catalyst feed vessel.

Catalyst solutions were prepared in an Ar-filled glove box by using toluene stock solutions of the catalyst precursor and the activator, and were delivered to the reactor by a continuous high-pressure syringe pump (PDC Machines, Inc., Warminster, Pa.). The pump rate directly afforded the catalyst solution feed rate for the mass balances.

Material balances were calculated from two independent composition data sets. One of them relied on effluent gas analysis and propane internal standard. The other one was based on product yield and $^{13}C$ NMR and IR compositional analyses of the product polymer. The on-line analysis provided conversion, yield, and product composition data, therefore allowed to monitor and control those process parameters.

The polymerization results for representative samples are listed in Table EP1 and EP2 below.

TABLE EP1

Reactor conditions for the synthesis of ethylene-propylene copolymers using dimethyl (μ-dimethylsilyl)bis(indenyl)hafnium catalyst precursor activated with methylaniliniumtetrakis(heptafluoronaphthyl)borate

| | | Reactor conditions | | | | |
|---|---|---|---|---|---|---|
| Batch # | Temp ° C. | Pressure psig | Pressure MPa | C3 = conv. % | C2 = conv. % | Res. time min |
| 1 | 96 | 10805 | 74.52 | 17.9 | 43.2 | 5.1 |
| 2 | 89 | 10217 | 70.46 | 10.6 | 19.4 | 4.9 |
| 3 | 97 | 30364 | 209.4 | 17.8 | 30.7 | 4.6 |
| 4 | 105 | 10278 | 70.9 | 18.9 | 40.8 | 5.0 |
| 5 | 105.7 | 10467 | 72.2 | 19.2 | 48.5 | 5.5 |
| 6 | 106 | 10436 | 72.0 | 19.6 | 45.6 | 5.0 |
| 7 | 104 | 10190 | 70.3 | 19.0 | 47.4 | 5.4 |

TABLE EP2

Characterization results for ethylene-propylene copolymers prepared by using dimethyl (μ-dimethylsilyl)bis(indenyl)hafnium catalyst precursor activated with dimethylaniliniumtetrakis(heptafluoronaphthyl)borate

| Batch # | MFR g/10 min | Melting (first) Peak temp. °C. | Melting (first) ΔHf J/g | Melting (first) Cryst. % | Glass trans. Tg at ½ ΔCp, °C. | DRI Mw kg/mol | DRI Mw/Mn | DRI Mz/Mw | Ethylene content by IR mol % | Ethylene content by IR wt % | Ethylene content by 13C NMR mol % | Ethylene content by 13C NMR wt % |
|---|---|---|---|---|---|---|---|---|---|---|---|---|
| 1 | 8.9 | 49.9 | 20.5 | 9.9 | −26.3 | 167.4 | 2.01 | 1.64 | 15.8 | 11.1 | 15.5 | 10.9 |
| 2 | 8.8 | 49.2 | 21.9 | 10.6 | −26.5 | 201.8 | 2.01 | 1.63 | 16.7 | 11.8 | 16.3 | 11.5 |
| 3 | 23.6 | 49.9 | 5.1 | 2.5 | −30.7 | 111.5 | 2.02 | 1.57 | 22.4 | 16.1 | 20.5 | 14.7 |
| 4 | 21.8 | 48.4 | 5.8 | 2.8 | −30.1 | 129.7 | 2.03 | 1.64 | 20.0 | 14.3 | 20.9 | 15.0 |
| 5 | 20.5 | 47.3 | 12.5 | 6.0 | −28.7 | 125.6 | 2.03 | 1.62 | 21.1 | 15.1 | 18.6 | 13.2 |
| 6 | 19.3 | 48.6 | 3.8 | 1.8 | −29.8 | 123.3 | 2.02 | 1.62 | 21.0 | 15.1 | 20.8 | 14.9 |
| 7 | 18.1 | 46.6 | 7.5 | 3.6 | −30.0 | 131.3 | 2.00 | 1.62 | 20.2 | 14.4 | 19.5 | 13.9 |

Propylene Homopolymerization

The equipment and methods used for making polypropylene was the same as described for the ethylene-propylene copolymers, except that propylene was fed directly from the vendor-supplied cylinder equipped with a dip-leg.

The polymerization results for representative samples are listed in Table PP1 and PP2 below.

TABLE PP1

Reactor conditions for the synthesis of isotactic propylene homopolymers using dimethyl (μ-dimethylsilyl)bis(2-methyl-4-(3,'5'-di-tert-butylphenyl)indenyl)zirconium catalyst precursor activated with dimethylaniliniumtetrakis(pentafluorophenyl)borate

| Batch # | Temp °C. | Pressure psig | C3 = conv. % | Res. time min | MFR g/10 min |
|---|---|---|---|---|---|
| 1 | 118.0 | 8349 | 15.2 | 3.5 | 37 |
| 2 | 118.7 | 8255 | 18.3 | 3.5 | 34 |
| 3 | 118.2 | 8326 | 16.0 | 3.4 | 35 |
| 4 | 119.3 | 8316 | 15.2 | 3.4 | 35 |
| 5 | 118.6 | 8306 | 14.6 | 3.5 | 30 |
| 6 | 118.1 | 8065 | 14.3 | 3.3 | 36 |
| 7 | 118.1 | 8125 | 14.1 | 3.3 | 29 |
| 8 | 119.3 | 8076 | 15.4 | 3.4 | 37 |
| 9 | 119.2 | 8176 | 14.4 | 3.3 | 38 |
| 10 | 119.2 | 8149 | 15.2 | 3.4 | 34 |
| 11 | 119.2 | 8181 | 14.4 | 3.4 | 39 |
| 12 | 119.3 | 8153 | 14.3 | 3.4 | 37 |
| 13 | 120.0 | 8300 | 14.8 | 3.5 | 37 |
| 14 | 119.3 | 8154 | 14.3 | 3.4 | 34 |
| Average | 118.9 | 8209 | 15.0 | 3.4 | 35 |
| STDEV | 0.6 | 97 | 1.1 | 0.1 | 3 |

TABLE PP2

Characterization results for isotactic propylene homopolymers prepared by using dimethyl (μ-dimethylsilyl)bis(2-methyl-4-(3,'5'-di-tert-butylphenyl)indenyl)zirconium catalyst precursor activated with dimethylaniliniumtetrakis(pentafluorophenyl)borate

| Batch # | Crystallization Tc onset °C. | Crystallization Tc peak °C. | Melting (second) Tm peak °C. | Melting (second) ΔHf J/g | Melting (second) Cryst. % | DRI Mw kg/mol | DRI Mw/Mn | DRI Mz/Mw |
|---|---|---|---|---|---|---|---|---|
| 1 | 117.9 | 113.6 | 155.2 | 97.3 | 47.0 | 168.4 | 1.85 | 1.59 |
| 2 | 119.5 | 115.1 | 155.5 | 97.6 | 47.1 | 173.2 | 1.80 | 1.57 |
| 3 | 117.4 | 113.9 | 155.1 | 97.9 | 47.3 | 176.4 | 1.83 | 1.58 |
| 4 | 116.5 | 113.7 | 154.2 | 97.4 | 47.0 | 163.2 | 1.89 | 1.61 |
| 5 | 117.0 | 113.5 | 155.2 | 97.4 | 47.0 | 187.2 | 1.98 | 1.63 |
| 6 | 118.3 | 114.3 | 155.3 | 99.6 | 48.1 | 174.4 | 1.96 | 1.60 |
| 7 | 118.1 | 114.5 | 155.0 | 99.4 | 48.0 | 193.5 | 2.02 | 1.63 |
| 8 | 119.4 | 115.7 | 154.8 | 97.2 | 46.9 | 176.6 | 1.90 | 1.61 |
| 9 | 119.1 | 115.3 | 155.5 | 98.9 | 47.7 | 178.7 | 1.89 | 1.59 |
| 10 | 118.7 | 115.3 | 155.4 | 99.9 | 48.2 | 182.0 | 1.96 | 1.61 |
| 11 | 119.2 | 115.0 | 155.7 | 100.1 | 48.3 | 179.7 | 1.89 | 1.58 |
| 12 | 118.5 | 114.9 | 154.7 | 101.3 | 48.9 | 173.3 | 1.82 | 1.57 |

TABLE PP2-continued

Characterization results for isotactic propylene homopolymers prepared by using dimethyl (μ-dimethylsilyl)bis(2-methyl-4-(3,'5'-di-tert-butylphenyl)indenyl)zirconium catalyst precursor activated with dimethylaniliniumtetrakis(pentafluorophenyl)borate

| Batch # | Crystallization | | Melting (second) | | | DRI | | |
|---|---|---|---|---|---|---|---|---|
| | Tc onset °C. | Tc peak °C. | Tm peak °C. | ΔHf J/g | Cryst. % | Mw kg/mol | Mw/Mn | Mz/Mw |
| 13 | 119.5 | 115.5 | 156.0 | 97.7 | 47.2 | 182.3 | 1.97 | 1.63 |
| 14 | 118.1 | 114.3 | 155.3 | 100.2 | 48.4 | 176.1 | 2.00 | 1.63 |
| Average | 118.4 | 114.6 | 155.2 | 98.7 | 47.7 | 177.5 | 1.91 | 1.60 |
| STDEV | 0.9 | 0.7 | 0.4 | 1.4 | 0.7 | 7.5 | 0.07 | 0.02 |

Thermal Analysis of Polymers Using Differential Scanning Calorimetry (DSC)

Heat flows during phase transitions were measured on heating and cooling the sample from the solid state and melt, respectively, using Differential Scanning Calorimetry (DSC). Measurements were conducted using a TA Instrument MDSC 2920 or Q1000 Tzero-DSC and data analyzed using the standard analysis software by the vendor. Typically, 3 to 10 mg of polymer was encapsulated in an aluminum pan and loaded into the instrument at room temperature. Sample was cooled to either −130° C. or −70° C. and heated to 210° C. at a heating rate of 10° C./min to evaluate the glass transition and melting behavior for the as-received sample. The sample was held at 210° C. for 5 minutes to destroy its thermal history. Crystallization behavior was evaluated by cooling the sample from the melt to sub-ambient temperature at a cooling rate of 10° C./min. The sample was held at the low temperature for 10 minutes to fully equilibrate in the solid state and achieve a steady state. Second heating data was measured by heated this melt crystallized sample at 10° C./min. Second heating data thus provides phase behavior for samples crystallized under controlled thermal history conditions. The endothermic melting transition (first and second melt) and exothermic crystallization transition were analyzed for onset of transition and peak temperature. The melting temperatures reported in the tables are the peak melting temperatures from the second melt unless otherwise indicated. For polymers displaying multiple peaks, the higher melting peak temperature is reported. Glass transition reported is the temperature at which heat capacity change (ΔCp) is half its total value (step change between equilibrium liquid to equilibrium solid state) and at which half the sample has de-vitrified. Areas under the curve were used to determine the heat of fusion (Hf) which can be used to calculate the degree of crystallinity. A value of 8.7 kJ/mol was used as the equilibrium heat of fusion for 100% crystalline polypropylene (single crystal measurement) reported in B. Wunderlich, "Thermal Analysis", Academic Press, Page 418, 1990). The percent crystallinity is calculated using the formula, [area under the curve (Joules/gram)×42 (gram/mol)/8700 (Joules/mol]*100.

Melt-Flow Rate Measurements:

The Melt-Flow Rates (MFR) of polymers were determined by using Dynisco Kayeness Polymer Test Systems Series 4003 apparatus following the method described in the Series 4000 Melt Indexer Operation manual, Method B. The method follows ASTM D-1238, Condition L, 2.16 kg and 230° C. All samples were stabilized by using Irganox 1010.

Molecular Weights (Mw, Mn and Mz) by Gel-Permeation Chromatography (GPC):

Molecular weight distributions were characterized using Gel-Permeation Chromatography (GPC), also referred to as Size-Exclusion Chromatography (SEC). Molecular weight (weight average molecular weight, Mw, number average molecular weight Mn, Viscosity average molecular weight, Mv, and Z average molecular weight, Mz) were determined using High-Temperature Gel-Permeation Chromatography equipped with a differential refractive index detector (DRI) to measure polymer concentrations (either from Waters Corporation with on-line Wyatt DAWN "EOS" and Waters GPCV viscometer detectors, or Polymer Laboratories with on-line Wyatt mini-DAWN and Viscotek Corporation viscometer detectors. Experimental details on the measurement procedure are described in the literature by T. Sun, P. Brant, R. R. Chance, and W. W. Graessley, Macromolecules, Volume 34, Number 19, 6812-6820, (2001).

The analysis was performed using a Waters GPCV 2000 (Gel Permeation Chromatograph) with triple detection. The three detectors were in series with Wyatt DAWN "EOS" MALLS 18 angle laser light scattering detector first, followed by the DRI (Differential Refractive Index) then Differential Viscometer detector. The detector output signals are collected on Wyatt's ASTRA software and analyzed using a GPC analysis program. The detailed GPC conditions are listed in Table 1 below.

Standards and samples were prepared in inhibited TCB (1,2,4-trichlorobenzene) solvent. Four NBS polyethylene standards were used for calibrating the GPC. Standard identifications are listed in the table below. The samples were accurately weighed and diluted to a ~1.5 mg/mL concentration and recorded. The standards and samples were placed on a PL Labs 260 Heater/Shaker at 160° C. for two hours. These were filtered through a 0.45 micron steel filter cup then analyzed.

The concentration, c, at each point in the chromatogram is calculated from the baseline-subtracted DRI signal, IDRI, using the following equation:

$c = K_{DRI} I_{DRI}/(dn/dc)$ where KDRI is a constant determined by calibrating the DRI, and (dn/dc) is the same as described below for the LS analysis. Units on parameters throughout this description of the SEC method are such that concentration is expressed in $g/cm^3$, molecular weight is expressed in g/mole, and intrinsic viscosity is expressed in dL/g.

For the light-scattering detector used at high temperature, the polymer molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_c c$$

Here, $\Delta R(\theta)$ is the measured excess Rayleigh scattering intensity at scattering angle $\theta$, c is the polymer concentration determined from the DRI analysis, A2 is the second virial coefficient, $P(\theta)$ is the form factor for a monodisperse random coil (described in the above reference), and Ko is the optical constant for the system:

$$K_o = \frac{4\pi^2 n^2 (dn/dc)^2}{\lambda^4 N_A}$$

in which NA is Avogadro's number, and (dn/dc) is the refractive index increment for the system. The refractive index, n=1.500 for TCB at 135° C. and λ=690 nm. In addition, A2=0.0006 for propylene polymers and 0.0015 for butene polymers, and (dn/dc)=0.104 for propylene polymers and 0.098 for butene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]_i$, at each point in the chromatogram is calculated from the following equation:

$$[\eta]_i = \eta_{si}/C_i$$

where the concentration, $C_i$, was determined from the DRI output.

The branching index (g') is calculated using the output of the SEC-DRI-LS-VIS method as follows. The branching index g' is defined as: Sample measured [η]/calculated theoretical [η] of a linear polymer, where the calculated theoretical [η] of a linear=k $M^\alpha$ where k=0.0002288 and α=0.705 for propylene polymers.

Mv is the viscosity average molecular weight based on molecular weights determined by light-scattering (LS) analysis. The viscosity average molecular weight, Mv, of the sample is calculated by:

$$Mv = \{\Sigma h_i M_i^\alpha / \Sigma h_i\}^{1/\alpha}$$

$M_i$=molecular weight for each time slice, $h_i$, from the chromatogram, and the summations are carried out over all chromotographic slices, i.e., between the integration limits.

TABLE 1

Gel Permeation Chromatography (GPC) measurement conditions

| | | |
|---|---|---|
| INSTRUMENT | | WATERS 2000 V + Wyatt Dawn EOS |
| COLUMN | Type: | 3 × MIXED BED TYPE "B" 10 MICRON PD (high porosity col.'s) |
| | Length: | 300 mm |
| | ID: | 7.8 mm |
| | Supplier | POLYMER LABS A |
| SOLVENT PROGRAM | | 0.54 ml/min TCB inhibited GPC console setting was 0.5 mL/min to which 8% expansion factor (from Waters) makes actual flow 0.54 mL/min |

TABLE 1-continued

Gel Permeation Chromatography (GPC) measurement conditions

| | | |
|---|---|---|
| INSTRUMENT | | WATERS 2000 V + Wyatt Dawn EOS |
| DETECTOR | A: | Wyatt MALLS 17 angle's of laser light scattering detector |
| | B: | DIFFERENTIAL REFRACTIVE INDEX (DRI) in series |
| | C: | Viscometer IDvol. = +232.2 ul LS to DRI IDvol. = −91.8 ul Dp to DRI |
| TEMPERATURE | Injector: | 135° C. |
| | Detector: | 135° C. |
| | Column: | 135° C. |
| DISOLUTION CONDITIONS | | Shaken for 2 h on a PL SP260 heater Shaker @160° C. |
| SAMPLE FILTRATION | | Through a 0.45 µ SS Filter @ 135° C. |
| INJECTION VOLUME | | 329.5 µL |
| SAMPLE CONCENTRATION | | 0.15 w/v % (1.5 mg/ml) Target wt |
| SOLVENT DILUENT | | TCB inhibited |
| CALIBRATION NARROW PE STANDARDS | | NIST 1482a; NIST1483a; NIST1484a |
| BROAD PE STANDARD | | NIST 1475a |

Ethylene Content Analysis by Using Infrared (IR) Spectroscopy

Ethylene analyses of ethylene-propylene copolymers were performed using thin polymer films. For the 0 to 40 wt % ethylene concentration range, the calibration correlated the area ratio of the peaks at 1155 and 722 cm$^{-1}$, representing the methyl wag and —$(CH_2)_n$— rocking vibrations, respectively, and was fitted by the following expression:

Ethylene wt. %=72.698−86.495$X$+13.696$X^2$ where X=(peak area at 1155 cm$^{-1}$)/(peak area at 722 cm$^{-1}$). The calibration was incorporated into a spectral processing macro that ran within the OMNIC 7.1 operating software (driver version 7.2, firmware version 1.26) of our Nicolet 6700 FTIR (Thermo Electron Corp.).

Ethylene Content Analysis by Using Infrared $^{13}$C Nuclear Magnetic Resonance (NMR) Spectroscopy Carbon NMR spectroscopy was used to measure monomer sequence distribution, composition, and clustering, and region defect concentrations. Olefinic endgroup concentrations are typically too low for ready analysis by $^{13}$C NMR.

Carbon NMR spectra were acquired with the 10-mm broadband probe on the Varian UnityPlus 500. The samples were prepared in 1,1,2,2-tetrachloroethane-d$_2$ (TCE). Sample preparation (polymer dissolution) was performed at 140° C. In order to optimize chemical shift resolution, the samples were prepared without chromium acetylacetonate relaxation agent. Signal-to-noise was enhanced by acquiring the spectra with nuclear Overhauser enhancement for 10 seconds before the acquisition pulse. The 3.2 second acquisition period was followed by an additional delay of 4 seconds, for an aggregate pulse repetition delay of 17 seconds. Free induction decays of 3400-4400 coadded transients were acquired at a temperature of 120° C. After Fourier transformation (256K points and 0.3 Hz exponential line broadening), the spectrum is referenced by setting the upfield peak of the TCE to 74.054 ppm.

The Journal of Applied Polymer Science article by Di Martino and Kelchtermans (J. Applied Polymer Sci. 56 (1995) 1781) provides a very accessible tabulation of the chemical shift assignments for the peaks in the spectrum. The review article by Randall (Macromolecules 27(8) (1994) 2120) gives an overview of the procedure for converting the peak areas to the monomer sequence triads that define the chain microstructure. The nomenclature adopted for our analysis is tabulated below:

| Chemical shift range (ppm) | NMR region | Chain structure |
|---|---|---|
| 45-48 | A | PPP + ½PPE |
| 43-43.8 | 2,1-P | 2,1-Pt |
| 41-42 | 2,1-P | 2,1-Pe |
| 37-39 | B | PEP + (½)PEE + EPE + (½)PPE |
| 38.4-38.95 | 2,1-P | 2,1-Pe + 2,1-Pt |
| 35.2-36 | 2,1-P | 2,1-Pe + 2,1-Pt |
| 34-35.7 | 2,1-E + 2,1-P | 2,1-E + 2,1-EE + 2,1-Pt |
| 33.8, 33.9 | 2,1-E | 2,1-E |
| 33.4, 33.55 | 2,1-EE | 2,1-EE |
| 32.9-33.4 | C | EPE |
| 32-32.5 | 2,1-P | 2,1-Pt |
| 31.1-31.25 | 2,1E + 2,1-EE | 2,1-E, 2,1-EE |
| 30.5-31.05 | D | EPP + 2,1-Pt + 2,1-Pe |
| 30.6-30.7 | γγ | PEEP |
| 30.2-30.3 | γδ⁺ | PEEE + 2,1-Pe |
| 29.8-30 | δ⁺δ⁺ | (EEE)n |
| 27.8-29 | F | PPP |
| 27.5-27.9 | Bγ | 2,1-E-E |
| 27.25-27.45 | G1 | PEE |
| 26.9-27.25 | G2 | PEE |
| 24.2-24.9 | H | PEP |
| 21.2-22.3 | I1 | PPPmm |
| 20.5-21.2 | I2 | PPPmr + PPE |
| 19.76-20.3 | I3 | PPPrr + EPE |
| 15.0 | 2,1-P-t | 2,1-P-t |
| 15.4 | 2,1-P-t | 2,1-P-t |
| 17.2 | 2,1-P-e | 2,1-P-e |
| 17.5 | 2,1-P-e | 2,1-P-e |

The distribution of monomers in the chain can be modeled with a statistical model for the polymerization. The simplest, Bernoullian, model assumes that comonomers add to the growing chain without bias from the monomer currently at the chain terminus. The next-higher order model, the first-order Markovian, assumes that the monomer is sensitive to the current chain-end monomer during the addition reaction. This allows the mathematical description of a reaction system's propensity for making alternating, random, and block copolymers. The Markovian analysis of finite EP polymer chains by Randall and Rucker (Macromolecules 27(8) (1994) 2120) explains the mathematics behind the statistical modeling of the polymer microstructure, and is excerpted in part here.

There are four basic first-order Markov transition probabilites for the four possible adjoining pairs of monomer units (diads) in a copolymer chain. In a Markov diad, the first unit is called the initial state and the second unit is called the final state. With the exception of the end groups, a diad description requires that each unit in a copolymer chain serves as both an initial state and a final state. For a copolymer chain, there are only two possibilities for the initial state and, likewise, only two possibilites for the final state. The four transition probabilities are summarized in the table below:

Probability Designations for Ethylene-Propylene Copolymerization

| Initial State | Add | Final state | Transition probability |
|---|---|---|---|
| E | E | E | $P_{EE}$ |
| E | P | P | $P_{EP}$ |
| P | E | E | $P_{PE}$ |
| P | P | P | $P_{PP}$ |

The statistical treatment that follow will be derived for a poly(ethylene-co-propylene), but they apply to any copolymer chain. Accordingly, the above four transition probabilities must be related as follows:

$$P_{EE} + P_{EP} = 1$$

$$P_{PE} + P_{PP} = 1$$

Equations 9 and 10 describe the options for propagation only; as will be seen later, additional terms are required when the end groups represent a significant, observable fraction of the chain composition.

A first order Markovian system reduces to Bernoullian when $P_{EE} = P_{PE} = P_E$ = mole fraction of "E", and $P_{EP} = P_{PP} = P_P$ = mole fraction of "P", which demonstrates that chain propagation for Bernoullian copolymer systems is independent of the identity of the initial state. Consequently, Bernoullian statistical analyses are defined with only one independent variable and first order Markov analyses are defined with two independent variables. To describe a sequence of any length in a first order Markovian statistical scheme, it is necessary to define the probability for finding the first unit of the sequence. The subsequent units are defined by the appropriate transition probabilities. The following additional definitions are necessary:

$^1P_P$ = probability of finding a "P" unit at any location in a copolymer chain
$^1P_E$ = probability of finding a "E" unit at any location in a copolymer chain and, $$^1P_P + {}^1P_E = 1.$$

In terms of transition probabilities, the probability of finding either a "P" or "E" unit anywhere in a copolymer chain follows from the consideration that the preceding unit can only be an "E" or "P". Therefore, $$^1P_P = {}^1P_P P_{PP} + {}^1P_E P_{EP}$$

$$^1P_E = {}^1P_P P_{PE} + {}^1P_E P_{EE}$$

Solving gives:

$$1_{P_P} = \text{Mole Fraction of "P"} = \frac{P_{EP}}{(P_{EP} + P_{PE})}$$

$$1_{P_E} = \text{Mole Fraction of "E"} = \frac{P_{PE}}{(P_{EP} + P_{PE})}$$

A sequence of any length in a copolymer chain can now be defined in terms of only two transition probabilites. A summary of derivations for the concentration in terms of transition probabilities are given in the table below:

| Sequence | Concentration in terms of transition probabilities |
|---|---|
| PP | $^1P_P P_{PP} = \dfrac{P_{EP}(1-P_{PE})}{(P_{EP}+P_{PE})} = [PP]$ |
| EPE | $^1P_E P_{EP} P_{PE} = \dfrac{P_{PE}^2 P_{EP})}{(P_{EP}+P_{PE})} = [EPE]$ |
| PPE + EPP | $^1P_P P_{PP} P_{PE} +{}^1 P_E P_{EP} P_{PP} = \dfrac{2P_{EP}P_{PE}(1-P_{PE})}{(P_{EP}+P_{PE})} = [PPE + EPP]$ |
| EEEEE | $^1P_E (P_{EE})^4 = \dfrac{P_{PE}(1-P_{EP})^4}{(P_{EP}+P_{PE})} = [EEEEE]$ |

It has also been demonstrated in the above first order Markov triad description for an infinite chain that the probability of finding a PPE sequence is the same as the probability of finding an EPP sequence. The first order Markov description for a complete, normalized triad distribution is given below:

$$[EEE] = {}^1P_E P_{EE} P_{EE} = \frac{P_{PE}(1-P_{EP})^2}{P_{EP}+P_{PE}}$$

$$[EEP + PEE] = {}^1P_E P_{EE} P_{EP} + {}^1P_P P_{PE} P_{EE} = \frac{2P_{PE}P_{EP}(1-P_{EP})}{(P_{EP}+P_{PE})}$$

$$[PEP] = {}^1P_P P_{PE} P_{EP} = \frac{P_{PE} P_{EP}^2}{(P_{EP}+P_{PE})}$$

$$[EPE] = {}^1P_E P_{EP} P_{PE} = \frac{P_{PE}^2 P_{EP}}{(P_{EP}+P_{PE})}$$

$$[PPE + EPP] = {}^1P_P P_{PP} P_{PE} + {}^1P_E P_{EP} P_{PP}$$
$$= \frac{2P_{PE}P_{EP}(1-P_{PE})}{(P_{EP}+P_{PE})}$$

$$[PPP] = {}^1P_P P_{PP} P_{PP} = \frac{P_{EP}(1-P_{PE})^2}{(P_{EP}+P_{PE})}$$

Note that the E- and P-centered triads sum independently as follows:

$$[EEE] + [EEP + PEE] + [PEP] = \frac{P_{PE}}{(P_{EP}+P_{PE})} = [E]$$

$$[EPE] + [PPE + EPP] + [PPP] = \frac{P_{EP}}{(P_{EP}+P_{PE})} = [P]$$

and, of course, the six triads sum to unity. These latter relationships appear trivial, but can be helpful when testing experimental data for the best trial values for the transition probabilities. After substituting for the mole fractions, the triad equations become:

$[EEE]=(E)(1-P_{EP})^2$ $[EEP+PEE]=2(E)(1-P_{EP})P_{PE}$ $[PEP]=(E)(P_{EP})^2$ $[EPE]=(P)(P_{PE})^2$ $[PPE+EPP]=2(P)(1-P_{PE})P_{PE}$ $[PPP]=(P)(1-P_{PE})^2$

By performing a least-squares fit of the calculated triad areas to the experimental triad areas, we obtain the Markovian probabilities that allow us to predict the concentration of any arbitrary sequence. The molar composition of the polymer is simply the sum of the E-centered triads for ethylene content and P-centered triads for propylene content.

One method for characterizing the tendency of comonomers to polymerize in a non-random fashion is the cluster index developed by Randall ("A Review of High Resolution Liquid $^{13}$Carbon Nuclear Magnetic Resonance Characterizations of Ethylene-Based Polymers", JMS-Rev. Macromol. Chem. Phys. (1989), C29(2 & 3), pp 201-317). This measures the deviation in the concentration of isolated comonomer triads (EPE triads) from that predicted by a Bernoullian model:

$$\text{Cluster index} = 10 \cdot \left[ 1 - \frac{[EPE]_{observed} - [EPE]_{random}}{[P]_{observed} - [EPE]_{random}} \right]$$

which can be restated in terms of the monomer triads:

$$\text{Cluster index} = 10 \cdot \left[ 1 - \frac{[EPE]_{observed} - [EPE]_{random}}{[PPP]_{observed} + [PPE + EPP]_{observed} + [EPE]_{observed} - [EPE]_{random}} \right]$$

We can now consider some of the extreme cases for the copolymer microstructure for a 50/50 mole-% EP copolymer. An alternating copolymer will have all the P monomer in one-monomer blocks. Thus $[EPE]_{observed}=[P]_{observed}$, and the cluster index becomes 0. A random copolymer will have $[EPE]_{observed}=[EPE]_{random}$, giving a cluster index of 10. In the case of a block copolymer, the fraction in the brackets becomes −0.33, and the cluster index 13.3. This is summarized in the table below:

| Microstructure | Cluster index for 50/50 copolymer |
|---|---|
| Alternating | 0 |
| Random | 10 |
| Block | 13.3 |

The sensitivity of this index to composition can be illustrated by considering the case of blocky materials of various compositions. The table below shows the effect of composition on the cluster index of an AB block copolymer. As the propylene concentration increases, it becomes increasingly difficult to distinguish between Bernoullian and non-Bernoullian polymerization. The index will be most sensitive at low comonomer concentrations.

| Mole-% P | Cluster index for block copolymer |
|---|---|
| 1 | 50 |
| 33 | 18 |
| 50 | 13 |
| 99 | ~10 |

Another pair of common descriptors for the polymerization process are the reactivity ratios, RE and RP, which can be expressed as rate of homopolymerization divided by the rate of copolymerization, multiplied or divided by the ratio [E]/[P].

$$R_E = \frac{k_{EE}}{k_{EP}} = \frac{P_{EE}[P]}{P_{EP}[E]}$$

$$R_P = \frac{k_{PP}}{k_{PE}} = \frac{P_{PP}[E]}{P_{PE}[P]}$$

Calculating these reactivity ratios from the NMR data would require information about the monomer ratios in the reactor, [E]/[P], which often are not available. Multiplying these quantities RE and RP, we can remove the monomer ratio dependence:

$$R_E R_P = \frac{P_{EE} P_{PP}}{P_{EP} P_{PE}}$$

In principle, this product can be determined from any polymer analytical technique that yields a triad distribution and also from kinetics experiments. The important result of this calculation is that there are certain values for the transition probabilities that provide break points for describing blocky, alternating, or random polymers, and these are tabulated below.

| Transition probabilities | $R_E R_P$ | Polymer structure |
|---|---|---|
| $P_{EE} = 1$ $P_{EP} = 0$ $P_{PP} = 1$ $P_{PE} = 0$ | ∞ | blocky |
| $P_{EE} = .5$ $P_{EP} = .5$ $P_{PP} = .5$ $P_{PE} = .5$ | 1 | random |
| $P_{EE} = 0$ $P_{EP} = 1$ $P_{PP} = 0$ $P_{PE} = 1$ | 0 | perfectly alternating |

Several region defects were assigned and integrated in the NMR spectrum where observed. These results from reverse (2,1) addition of the propylene monomer, followed by either a propylene, one ethylene, or two ethylenes, and are designated 2,1-P, 2,1-E, and 2,1-EE, respectively. Peak assignments for these defects can be found in the work of Cheng ("$^{13}$C NMR Analysis of Ethylene-Propylene Rubbers", *Macromolecules*, 17, (1984), 1950-1955). The defects are illustrated below for a chain segment growing from left to right:

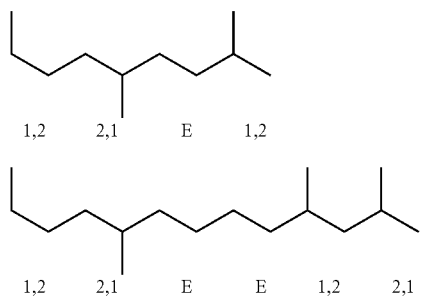

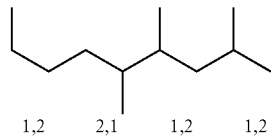

The quantification of the region defect concentrations can be done through the linear algebraic analysis of all the spectral integral regions. If the defect concentration is low, it may be advantageous to integrated representative regions for each defect, and compare that (average) integral against the total monomer triad concentration. This mitigates the possibility that slight errors in the larger integral measurements will skew the region defect concentrations.

For the materials considered here, we used the 33.8-33.9 ppm region to quantify 2,1-E defects, and the 33.4-33.55 ppm region to quantify the 2,1-EE defect. The 2,1-P defects when present give characteristic (and well-resolved) peaks in the 15-17.5 ppm region). These are further resolved into contributions from erythro (2,1-Pe) and threo (2,1-Pt) stereochemistry at the defect site.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are "about" or "approximately" the indicated value, and take into account experimental error and variations that would be expected by a person having ordinary skill in the art.

What is claimed is:
1. An in-line blending process for producing pellet-stable polyolefin blend pellets comprising:
(a) providing two or more reactor trains configured in parallel and a high-pressure separator downstream fluidly connected to the two or more reactor trains configured in parallel, wherein one or more of the reactor trains produce one or more low crystallinity polymer components (LCPCs) and one or more of the reactor trains produce one or more high crystallinity polymer components (HCPCs);
(b) contacting in the one or more of the reactor trains configured in parallel producing HCPCs: 1) propylene, 2) optional ethylene and/or $C_4$ to $C_{12}$ alpha olefins, 3) one or more catalyst systems, and 4) optional one or more diluents or solvents, wherein the polymerization system for at least one of the reactor trains is at a temperature above the solid-fluid phase transition tempera- ture and at a pressure no lower than 10 MPa below the cloud point pressure and less than 1500 MPa, contacting in the other one or more reactor trains configured in parallel producing LCPCs: 1) ethylene or propylene, 2) one or more $C_2$ to $C_{30}$ alpha olefins and/or non-conjugated dienes, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa, wherein the polymerization system for at least one of the reactor trains configured in parallel is above its critical temperature and critical pressure, wherein the polymerization system for each reactor train is in its dense fluid state and comprises any propylene present, any ethylene present, any $C_4$ to $C_{30}$ alpha olefin present, any non-conjugated diene present, any diluent or solvent present, and the polymer product, wherein the catalyst system for each reactor train comprises one or more catalyst precursors, one or more activators, and optionally, one or more catalyst supports;

wherein the polymerization system for each reactor train comprises less than 40 wt % of the optional solvent; and (c) forming a reactor effluent including a homogeneous fluid phase polymer-monomer mixture in each parallel reactor train;

(d) combining the reactor effluent comprising the homogeneous fluid phase polymer-monomer mixture from each parallel reactor train to form a combined reactor effluent;

(e) passing the combined reactor effluent through the high-pressure separator for product blending and product-feed separation;

(f) maintaining the temperature and pressure within the high-pressure separator above the solid-fluid phase transition point but below the cloud point pressure and temperature to form a fluid-fluid two-phase system comprising a polymer-rich phase and a monomer-rich phase;

(g) separating the monomer-rich phase from the polymer-rich phase to form a polymer-enriched stream comprising a blend of LCPCs and HCPCs and a separated monomer-rich stream, and (h) further processing the polymer enriched stream of (g) to further remove any solvent/diluent and/or monomer and then forming it into pellets to yield a pellet-stable product blend of LCPCs and HCPCs.

2. The process of claim 1, wherein the LCPCs are chosen from:
(a) one or more propylene-based copolymers comprising at least 75 wt % of propylene-derived units and 0 wt % to 25 wt % of ethylene, $C_4$ to $C_{30}$ alpha olefins, non-conjugated dienes and/or combinations thereof, and wherein the propylene-derived units have an isotactic triad fraction of 65% to 99% and a heat of fusion of less than 50 J/g;
(b) one or more ethylene-based copolymers comprising between 40 wt % and 85 wt % of ethylene-derived units and 60 wt % to 15 wt % $C_3$ to $C_{30}$ alpha olefins, non-conjugated dienes and/or combinations thereof, and wherein the ethlyene-derived units have a melting temperature of less than 100° C.; and
c) combinations of a) and b).

3. The process of claim 1, wherein the HCPCs are chosen from:
(a) one or more isotactic polypropylene homopolymers with a peak melting temperature greater than 100° C.;
(b) one or more propylene-based copolymers comprising less than or equal to 10 wt % of ethylene, $C_4$ to $C_{12}$ alpha olefins and/or combinations thereof, wherein the copolymers have a peak melting temperature greater than 100° C.; and
(c) combinations of a) and b).

4. The process of claim 1, wherein the pellet-stable blend of LCPCs and HCPCs includes from 45 to 98 wt % LCPCs and from 2 to 55 wt % HCPCs.

5. The process of claim 1, wherein the one or more catalyst systems are chosen from Ziegler-Natta catalysts, metallocene catalysts, nonmetallocene metal-centered, heteroaryl ligand catalysts, late transition metal catalysts, and combinations thereof.

6. The process of claim 1, wherein the polymerization systems of the two or more reactor trains configured in parallel comprise less than 20 wt % of the optional solvent.

7. The process of claim 1, wherein the two or more reactor trains configured in parallel operate above the critical or pseudo-critical temperature and critical or pseudo-critical pressure of their polymerization system.

8. The process of claim 1, wherein the combined propylene and ethylene concentration in the combined feed to each reactor train configured in parallel is 35 wt % or more.

9. The process of claim 1, wherein the combined LCPC and HCPC concentration in the effluent of each of the two or more reactor trains configured in parallel is greater than 2 mol/L.

10. The process of claim 1 further comprising removing low molecular weight oligomers, low molecular weight polymers, solvent/diluent or combinations thereof from the separated monomer-rich phase through the use of at least one knock-out pot, at least one separation tower, or a combination thereof.

11. The process of claim 1 further comprising providing one or more storage tanks, and feeding from the one or more storage tanks one or more polymers, one or more plasticizers, and/or one or more polymer additives to the process after (c).

12. The process of claim 1, wherein (h) includes feeding the polymer enriched stream of (g) to one or more low-pressure separators to further separate the monomers and other volatiles to form a further-enriched polymer stream comprising a blend of LCPCs and HCPCs.

13. The process of claim 12 further comprising feeding the further-enriched polymer stream to a coupled devolatilizer to further separate other volatiles to form the pellet-stable polyolefin product blend, wherein the coupled devolatilizer operates under vacuum enabling the further-enriched polymer stream to flash off the monomers and other volatiles, and wherein the coupled devolatilizer is a devolatilizing extruder.

14. The process of claim 12, wherein one or more polymers, one or more plasticizers and/or one or more polymer additives are added to the pellet-stable product blend (LCPCs and HCPCs) at the high-pressure separator, the low-pressure separator, the devolatilizing extruder or combinations thereof.

15. The process of claim 1, wherein the high-pressure separator is a gravimetric separation vessel, wherein the monomer-rich phase has a density of 0.3 to 0.7 grams/mL and the polymer-rich phase has a density of 0.4 to 0.8 grams/mL.

16. The process of claim 1, wherein the pellets have a Shore A hardness of at least 50.

17. The process of claim 1, wherein the forming into pellets step of (h) includes pelletizing and cooling in a water solution at a temperature between 0 and 10° C. the further enriched polymer stream of (h) to produce a Shore A hardness for the pellets of at least 50.

18. The process of claim 1 wherein the pellets have a diameter of 0.5 mm to 10 mm, and a length of 0.5 mm to 10 mm.

19. The process of claim 1 further comprising coating on the surface of the pellets a material chosen from a wax, a polyethylene, a polypropylene, talc, calcium stearate, and mixtures thereof, wherein the material in the coating is present in amount from about 100 parts per million to about 8000 parts per million based upon the weight of the pellet.

20. A in-line blending process for producing pellet-stable polyolefin blend pellets comprising:
(a) providing two or more reactor trains configured in parallel and two or more high-pressure separators fluidly connected to the two or more reactor trains configured in parallel, wherein one or more of the reactor trains produces one or more low crystallinity polymer components (LCPCs) and one or more of the reactor trains produces one or more high crystallinity polymer components (HCPCs);
(b) contacting in the one or more of the reactor trains configured in parallel producing HCPCs: 1) propylene, 2) optional ethylene and/or $C_4$ to $C_{12}$ alpha olefins, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa,
contacting in the other one or more reactor trains configured in parallel producing LCPCs: 1) ethylene or propylene, 2) one or more $C_2$ to $C_{30}$ alpha olefins and/or non-conjugated dienes, 3) one or more catalyst systems, and 4) optional one or more diluents or solvents, wherein the polymerization system for at least one of the reactor trains is at a temperature above the solid-fluid phase transition temperature and at a pressure no lower than 10 MPa below the cloud point pressure and less than 1500 MPa,
wherein the polymerization system for at least one of the reactor trains configured in parallel is above its critical temperature and critical pressure,
wherein the polymerization system for each reactor train is in its dense fluid state and comprises any propylene present, any ethylene present, any $C_4$ to $C_{30}$ alpha olefin present, any non-conjugated diene present, any diluent or solvent present, and the polymer product,
wherein the catalyst system for each reactor train comprises one or more catalyst precursors, one or more activators, and optionally, one or more catalyst supports;
wherein the polymerization system for each reactor train comprises less than 40 wt % of the optional solvent; and
(c) forming an unreduced reactor effluent including a homogeneous fluid phase polymer-monomer mixture in each parallel reactor train;
(d) passing the unreduced reactor effluents from one or more but not from all of the parallel reactor trains through one or more high-pressure separators, maintaining the temperature and pressure within the one or more high-pressure separators above the solid-fluid phase transition point but below the cloud point pressure and temperature to form one or more fluid-fluid two-phase systems with each two-phase system comprising a polymer-enriched phase and a monomer-rich phase, and separating the monomer-rich phase from the polymer-enriched phase in each of the one or more high-pressure separators to form one or more separated monomer-rich phases and one or more polymer-enriched phases;
(e) combining the one or more polymer-enriched phases from the one or more high-pressure separators of (d) with the one or more unreduced reactor effluents from one or more parallel reactor trains to form a mixture of one or more polymer-enriched phases and the one or more unreduced reactor effluents from the one or more parallel reactor trains to form a combined effluent stream that comprises the polymeric blend components from all parallel reactor trains;
(f) passing the combined effluent stream of (e) into another high-pressure separator for product blending and product-feed separation;
(g) maintaining the temperature and pressure within the another high pressure separator of (f) above the solid-fluid phase transition point but below the cloud point pressure and temperature to form a fluid-fluid two-phase system comprising a polymer-rich blend phase and a monomer-rich phase;
(h) separating the monomer-rich phase from the polymer-rich blend phase to form a polymer-enriched stream comprising a blend of LCPCs and HCPCs and a separated monomer-rich stream, and
(i) further processing the polymer-enriched stream of (h) to further remove any solvent/diluent and/or monomer and then forming it into pellets to yield a pellet-stable product blend of LCPCs and HCPCs.

21. The process of claim 20, wherein the LCPCs are chosen from:
(a) one or more propylene-based copolymers comprising at least 75 wt % of propylene-derived units and 0 wt % to 25 wt % of ethylene, $C_4$ to $C_{30}$ alpha olefins, non-conjugated dienes and/or combinations thereof, and wherein the propylene-derived units have an isotactic triad fraction of 65% to 99% and a heat of fusion of less than 75 J/g;
(b) one or more ethylene-based copolymers comprising between 40 wt % and 85 wt % of ethylene-derived units and 60 wt % to 15 wt % $C_3$ to $C_{30}$ alpha olefins, non-conjugated dienes and/or combinations thereof, and wherein the ethlyene-derived units have a melting temperature of less than 100° C.; and
(c) combinations of a) and b).

22. The process of claim 20, wherein the HCPCs are chosen from:
(a) one or more isotactic polypropylene homopolymers with a peak melting temperature greater than 100° C.;
(b) one or more propylene based copolymers comprising less than or equal to 10 wt % of ethylene, $C_4$ to $C_{12}$ alpha olefins and/or combinations thereof, wherein the copolymers have a peak melting temperature greater than 100° C.; and
(c) combinations of a) and b).

23. The process of claim 20, wherein the pellet-stable blend of LCPCs and HCPCs includes from 45 to 98 wt % LCPCs and from 2 to 55 wt % HCPCs.

24. The process of claim 20, wherein the forming into pellets step of (i) includes pelletizing and cooling in a water solution at a temperature between 0 and 10° C. the further enriched polymer stream of (h) to produce a Shore A hardness for the pellets of at least 50.

25. The process of claim 20 wherein the pellets have a diameter of mm to 10 mm and a length of 0.5 mm to 10 mm.

\* \* \* \* \*